United States Patent
El Mallawany

(10) Patent No.: US 12,448,866 B2
(45) Date of Patent: Oct. 21, 2025

(54) SUBSURFACE SAFETY VALVE INCLUDING TWO OR MORE OPPOSITELY POLED ELECTROMAGNETS AND TWO OR MORE OPPOSITELY POLED PERMANENT MAGNETS

(71) Applicant: Halliburton Energy Services, Inc., Houston, TX (US)

(72) Inventor: Ibrahim El Mallawany, Al-Khobar (SA)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/616,584

(22) Filed: Mar. 26, 2024

(65) Prior Publication Data

US 2025/0305387 A1   Oct. 2, 2025

(51) Int. Cl.
| | |
|---|---|
| *E21B 34/06* | (2006.01) |
| *E21B 41/00* | (2006.01) |
| *F16K 31/06* | (2006.01) |
| *F16K 31/08* | (2006.01) |

(52) U.S. Cl.
CPC ........ *E21B 34/066* (2013.01); *E21B 41/0007* (2013.01); *F16K 31/0675* (2013.01); *F16K 31/084* (2013.01); *E21B 2200/05* (2020.05)

(58) Field of Classification Search
CPC ............... E21B 34/066; E21B 41/0007; E21B 2200/05; F16K 31/0675; F16K 31/084
See application file for complete search history.

(56) References Cited

U.S. PATENT DOCUMENTS

| | | | | |
|---|---|---|---|---|
| 3,089,724 | A | * | 5/1963 | Crooks ................... E21B 31/06 |
| | | | | 175/308 |
| 8,646,327 | B2 | * | 2/2014 | Wootten ................... G01V 3/26 |
| | | | | 73/152.35 |
| 11,248,441 | B2 | | 2/2022 | Vick, Jr. et al. |
| 11,643,905 | B2 | | 5/2023 | Vick, Jr. et al. |
| 11,668,160 | B1 | | 6/2023 | Passmore et al. |
| 2008/0053662 | A1 | * | 3/2008 | Williamson .......... E21B 34/066 |
| | | | | 166/381 |
| 2009/0151790 | A1 | * | 6/2009 | Ranjan ................ F16K 31/0668 |
| | | | | 137/870 |
| 2011/0155381 | A1 | | 6/2011 | Reaux |
| 2012/0032099 | A1 | | 2/2012 | Vick, Jr. |
| 2016/0265309 | A1 | * | 9/2016 | Vick, Jr. ............. F16K 31/1221 |

* cited by examiner

*Primary Examiner* — Tara Schimpf
*Assistant Examiner* — Daniel T Craig
(74) *Attorney, Agent, or Firm* — Scott Richardson; Parker Justiss, P.C.

(57) ABSTRACT

Provided is an SSSV, a well system, and a method. The SSSV, in one aspect, includes two or more electromagnets fixedly coupled to a housing, a first of the two or more electromagnets having its north pole facing a first electromagnet direction and a second of the two or more electromagnets having is south pole facing first electromagnet direction. The SSSV, in accordance with this aspect, further includes two or more permanent magnets coupled to the flow tube, a first of the two or more permanent magnets having its south pole facing a first permanent magnet direction and a second of the two or more permanent magnets having its north pole facing the first permanent magnet direction, the two or more permanent magnets configured to axially move with a flow tube.

21 Claims, 49 Drawing Sheets

SUBSURFACE SAFETY VALVE INCLUDING TWO OR MORE OPPOSITELY POLED ELECTROMAGNETS AND TWO OR MORE OPPOSITELY POLED PERMANENT MAGNETS

BACKGROUND

Downhole devices, such as subsurface safety valves (SSSVs) are well known in the oil and gas industry and provide one of many failsafe mechanisms to prevent the uncontrolled release of subsurface production fluids, should a wellbore system experience a loss in containment. In certain instances, SSSVs comprise a portion of a tubing string, the entirety of the SSSVs being set in place during completion of a wellbore. In other instances, the all or a portion of the SSSVs are wireline deployed/retrieved. Although a number of design variations are possible for SSSVs, the vast majority are flapper-type valves that open and close in response to longitudinal movement of a flow tube.

Since SSSVs typically provide a failsafe mechanism, the default positioning of the flapper valve is usually closed in order to minimize the potential for inadvertent release of subsurface production fluids. The flapper valve can be opened through various means of control in order to provide a flow pathway for production to occur. What is needed in the art is an improved SSSV that does not encounter the problems of existing SSSVs.

BRIEF DESCRIPTION

Reference is now made to the following descriptions taken in conjunction with the accompanying drawings, in which:

FIGS. 1H and 1I illustrate an alternative embodiment of a switch system designed, manufactured and/or operated according to one or more embodiments of the disclosure, as might be used in the well system of FIG. 1A;

Figure 1A:
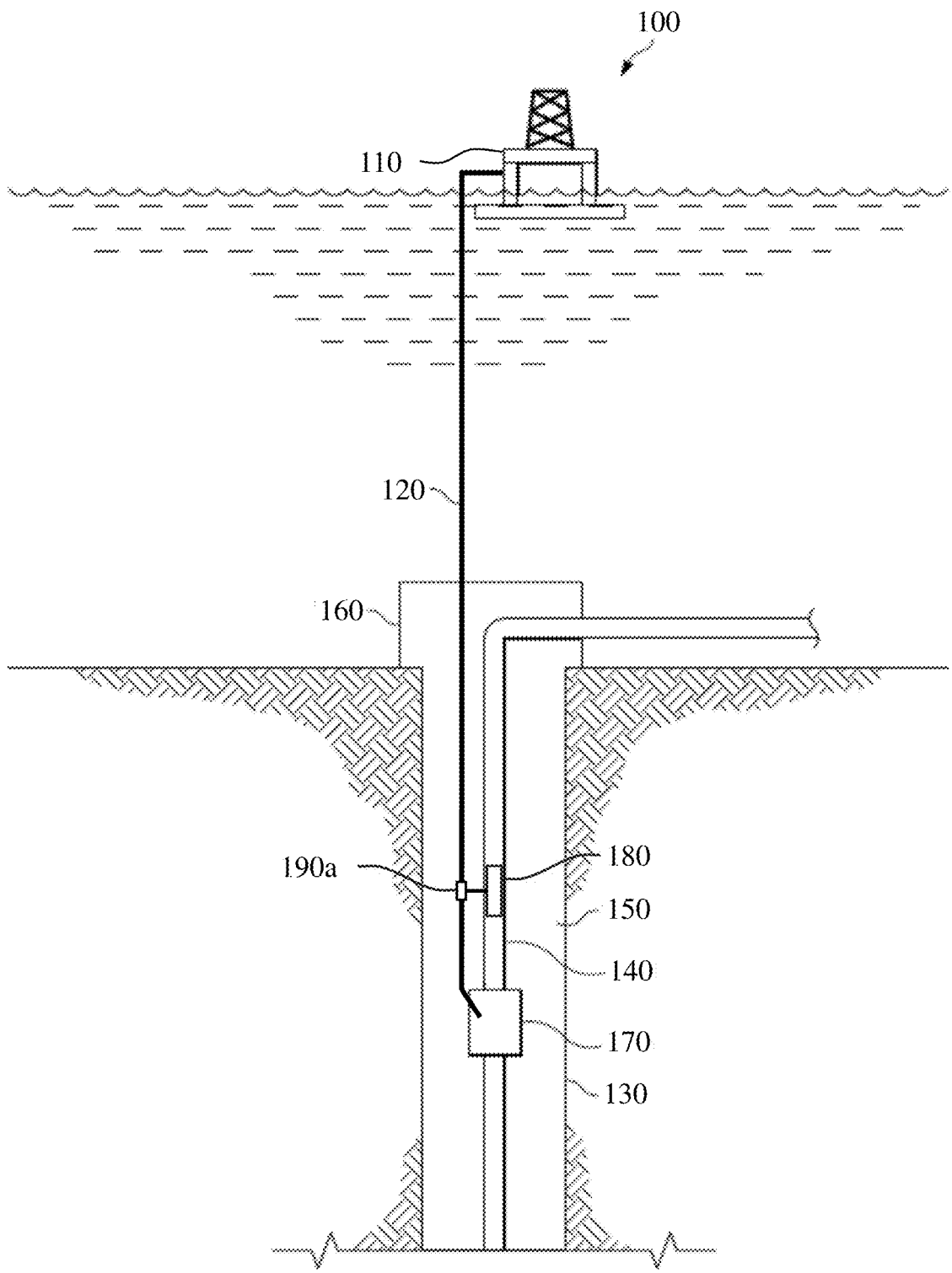
FIG. 1A illustrates a well system designed, manufactured and/or operated according to one or more embodiments of the disclosure.

FIGS. 3A through 3D illustrate different views of a subsurface safety valve designed, manufactured and/or operated according to one or more alternative embodiments of the disclosure; and FIGS. 4A through 9D illustrate various different installation and/or operational states, each with various different views, of a safety valve designed, manufactured and/or operated according to one or more alternative embodiments of the disclosure.

DETAILED DESCRIPTION

In the drawings and descriptions that follow, like parts are typically marked throughout the specification and drawings with the same reference numerals, respectively. The drawn figures are not necessarily, but may be, to scale. Certain features of the disclosure may be shown exaggerated in scale or in somewhat schematic form and some details of certain elements may not be shown in the interest of clarity and conciseness. The present disclosure may be implemented in embodiments of different forms. Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings of the embodiments discussed herein may be employed separately or in any suitable combination to produce desired results. Moreover, all statements herein reciting principles and aspects of the disclosure, as well as specific examples thereof, are intended to encompass equivalents thereof. Additionally, the term, "or," as used herein, refers to a non-exclusive or, unless otherwise indicated.

Unless otherwise specified, use of the terms "connect," "engage," "couple," "attach," or any other like term describing an interaction between elements is not meant to limit the interaction to direct interaction between the elements, and may also include indirect interaction between the elements described.

Unless otherwise specified, use of the terms "up," "upper," "upward," "uphole," "upstream," or other like terms shall be construed as generally away from the bottom, terminal end of a well, regardless of the wellbore orientation; likewise, use of the terms "down," "lower," "downward," "downhole," "downstream," or other like terms shall be construed as generally toward the bottom, terminal end of a well, regardless of the wellbore orientation. Use of any one or more of the foregoing terms shall not be construed as denoting positions along a perfectly vertical or horizontal axis. Unless otherwise specified, use of the term "subterranean formation" shall be construed as encompassing both areas below exposed earth and areas below earth covered by water, such as ocean or fresh water.

The present disclosure has acknowledged that offshore wells are being drilled at ever increasing water depths and in environmentally sensitive waters, and thus safety valves (e.g., including subsurface safety valves (SSSVs)) are necessary. The present disclosure has further acknowledged that there is a push for an all-electric completion system, for example one that includes the SSSV. To minimize the use of electronics downhole, it would be desirable to lock the SSSV in an open position using an electromagnet, so that when the SSSV is de-energized (e.g. powered off) the SSSV valve of the SSSV would immediately close (e.g., through the use of a return spring or other feature).

The present disclosure has recognized that one main challenge with electromagnets (or magnets in general) is that the force is inversely proportional to the square of the distance between the magnet and its target. Therefore, any debris introduced between the magnet and its target can significantly affect the holding force capability. The present disclosure has additionally recognized that the electromagnetic force is proportional to the square of the surface area of the magnet and the target faces. The present disclosure has further recognized that there is limited radial space in typical downhole tools.

Given the foregoing, the present disclosure had developed an SSSV to increase the contact area between the electromagnet and the target (e.g., in one embodiment a permanent magnet), for example in one embodiment using radial coupling as opposed to axial coupling. In accordance with one embodiment of the disclosure, the SSSV includes two or more electromagnets fixedly coupled to a housing (e.g., outer housing) of the SSSV. In this embodiment, a first of the two or more electromagnets has its north pole facing a first electromagnet direction (e.g., radially inward) and a second of the two or more electromagnets has is south pole facing the first electromagnet direction (e.g., radially inward). For example, oppositely wound electromagnets, and for example a single conductor, could be used to obtain the oppositely poled electromagnets. In at least one embodiment, four or more oppositely poled electromagnets are used. In yet another embodiment, six or more oppositely poled electromagnets are used, if not ten or more.

In at least one embodiment, adjacent ones of the two or more electromagnets would alternate their polarity. Thus, if the SSSV were to include three electromagnets, they could be staggered N/S/N, or alternatively S/N/S. Similarly, if the SSSV were to include four electromagnets, they could be staggered N/S/N/S, or alternatively S/N/S/N. In yet other embodiments, collections (e.g., pairs) of the two or more electromagnets could be staggered, such as NN/SS/NN or SS/NN/SS. Obviously, the electromagnets have no actual poles until energized, but those skilled in the art understand that their configuration would lead to an actual pole when energized, and thus are discussed as such whether energized or not.

An SSSV according to the present disclosure may additionally include two or more permanent magnets coupled to a flow tube of the SSSV. In at least one embodiment, a first of the two or more permanent magnets has its south pole facing a first permanent magnet direction (e.g., radially outward) and a second of the two or more permanent magnets has its north pole facing the first permanent magnet direction (e.g., radially outward). Much like the electromagnets discussed above, in at least one embodiment, adjacent ones of the two or more permanent magnets would alternate their polarity. Thus, if the SSSV were to include three permanent magnets, they could be staggered S/N/S, or alternatively N/S/N. Similarly, if the SSSV were to include four permanent magnets, they could be staggered S/N/S/N, or alternatively N/S/N/S. In yet other embodiments, collections (e.g., pairs) of the two or more permanent magnets could be staggered, such as SS/NN/SS or NN/SS/NN/SS.

In one or more embodiments, the number of electromagnets that the SSSV has is similar to the number of permanent magnets that the SSSV has. In yet another embodiment, an axial spacing between the electromagnets is similar (e.g., ±20 percent, ±10 percent, ±5 percent, ±2 percent, ±0.5 percent) to the axial spacing between the permanent magnets. In yet another embodiment, a width of the electromagnets is similar (e.g., ±20 percent, ±10 percent, ±5 percent, ±2 percent, ±0.5 percent) to a width of the permanent magnets.

In one or more embodiments, the two or more permanent magnets are configured to axially move with the flow tube such that: 1) when the flow tube is in its closed state the first of the two or more electromagnets is misaligned with the first of the two or more permanent magnets and the second of the two or more electromagnets is misaligned with the second of the two or more permanent magnets; and 2) when the flow tube is in its flow state the first of the two or more electromagnets is substantially aligned (e.g., axially or radially aligned) with the first of the two or more permanent magnets and the second of the two or more electromagnets is substantially aligned (e.g., axially or radially aligned) with the second of the two or more permanent magnets, such that when energized the two or more electromagnets engage with the two or more permanent magnets to hold the flow tube in the flow state. The term substantially aligned, as used herein, means that at least 50% of a width of the electromagnet overlaps with the permanent magnet. In yet another embodiment, they ideally align, which means that at least 80% of the width of the electromagnet overlaps with the permanent magnet. In yet another embodiment, they perfectly align, which means that at least 95% of the width of the electromagnet overlaps with the permanent magnet. Again, the aforementioned number, axial spacing and width of the electromagnets and permanent magnets may help achieve these alignments, and thus proper and efficient engagement between the two when the flow tube is in the flow state and the electromagnets are energized.

The present disclosure has additionally recognized that certain benefits may be achieved when a magnetic flux of the two or more permanent magnets is orthogonal to a central axis of the central bore, and for example thus orthogonal to a second magnetic flux of the two or more electromagnets. The present disclosure has additionally recognized that certain benefits may be achieved when a magnetic flux of the two or more permanent magnets is at an angle ranging from +15 degrees to +75 degrees or −15 degrees to −75 degrees relative to a central axis of the central bore. In yet another embodiment, the present disclosure has recognized that certain benefits may be achieved when a magnetic flux of the two or more permanent magnets is at an angle ranging from +30 degrees to +60 degrees or −30 degrees to −60 degrees relative to a central axis of the central bore. In even yet another embodiment, the present disclosure has recognized that certain benefits may be achieved when a magnetic flux of the two or more permanent magnets is at an angle of +45 degrees or −45 degrees relative to a central axis of the central bore. Such angles help assure that the attraction/repulsive force is not purely in shear. Similar angles may be used for the two or more electromagnets, whether alone or in combination with such angles of the two or more permanent magnets.

The present disclosure has further acknowledged that SSSVs have inherent problems, and thus from time to time need servicing and/or replacing. In fact, often the tubing retrievable safety valve (TRSV) will fail, and then a wireline retrievable safety valve (WLRSV) will be run in hole.

The present disclosure has thus additionally developed an improved WLRSV. In at least one embodiment, the WLRSV includes a first portion that is run-in-hole with the TRSV and second and third portions that are run-in-hole after the TRSV is no longer working properly and/or has failed. The first portion of the WLRSV, in at least one embodiment, includes a WLRSV sub that would be run-in-hole along with the TRSV sub, and for example the tubing string. In at least one embodiment, the WLRSV sub would be located above the TRSV sub. In at least one other embodiment, the WLRSV sub would include the two or more electromagnets (e.g., coupleable to a control line, such as a primary control line and/or single TEC), as well as a fluid isolation sleeve that isolates the two or more electromagnets from fluid and/or debris within the wellbore. In at least one embodiment, the fluid isolation sleeve is a fixed fluid isolation sleeve, and thus does not readily move once positioned downhole.

The WLRSV, in one or more embodiments, further includes the second portion of the WLRSV, which is run-in-hole after the TRSV is no longer working properly and/or has failed. The second portion of the WLRSV, in accordance with one or more embodiments, may be run-in-hole within the TRSV, for example using a latch mechanism to axially fix the second portion of the WLRSV within the TRSV or the first portion of the WLRSV. The second portion of the WLRSV, in one or more embodiments, may include a flow tube and a flapper valve, and may be located below the first portion of the WLRSV (e.g., below the two or more electromagnets and the fluid isolation sleeve). The second portion of the WLRSV may additionally include a power spring and/or nose spring, as will be further discussed below.

The WLRSV, in one or more embodiments, further includes a third portion that is run-in-hole after the second portion of the WLRSV is latched downhole (e.g., latched within the TRSV or first portion of the WLRSV). In another embodiment, the third portion is run-in-hole after the second portion is run-in-hole on a separate wellbore operation, such as a separate wireline trip or a separate slickline trip. In another embodiment, the third portion is run-in-hole after the second portion in the same wellbore operation, such as on the same wireline trip or the same slickline trip. The third portion, in one or more embodiments, includes a mechanical connecting apparatus. For example, in accordance with one or more embodiments of the disclosure, once the second portion of the WLRSV is latched in place, the mechanical connecting apparatus may be run-in-hole and coupled with the flow tube of the second portion. In at least this one embodiment, the mechanical connecting apparatus is located radially inside of the two or more electromagnets and/or the fluid isolation sleeve of the first portion. The mechanical connecting apparatus, in one or more embodiments, includes two or more permanent magnets coupled thereto. The two or more permanent magnets, in this embodiment, are configured to magnetically couple with the two or more electromagnets of the first portion, when the two or more electromagnets of the first portion are energized and the electromagnets and permanent magnets are aligned. In essence, the mechanical connecting apparatus may be run-in-hole to axially fix the two or more permanent magnets of the third portion of the WLRSV with the flow tube of the second portion of the WLRSV. Accordingly, any axial movement of the flow tube would result in the same axial movement of the two or more permanent magnets, and vice-versa.

In operation, once the mechanical connecting apparatus is in place, fluid pressure (e.g., from within the tubular below the flapper valve) may urge the flow tube toward the flapper valve. Typically, the flow tube is unable to move past the flapper valve until a pressure differential across the flapper valve is reduced/eliminated. Once the pressure differential across the flapper valve is reduced/eliminated, for example by pumping fluid down the wellbore toward an uphole side of the flapper valve, the flow tube may be urged past the flapper valve, for example using one or more springs (e.g., power springs and/or nose springs). As the two or more permanent magnets are axially fixed to the flow tube, the axial movement of the flow tube also axially moves the two or more permanent magnets. This axial movement of the flow tube brings the two or more permanent magnets associated with the mechanical connecting apparatus proximate (e.g., in alignment with) the two or more electromagnets of the first portion. Accordingly, when the two or more electromagnets are energized (e.g., before, during or after the two or more permanent magnets approach the two or more electromagnets) and located proximate the two or more permanent magnets, the two or more permanent magnets, and thus the flow tube axially fixed thereto, may be held in the flow state. The two or more permanent magnets, the mechanical connecting apparatus and the associated flow tube will be held in this flow state until such time as the two or more electromagnets are no longer energized, such as when the two or more electromagnets are de-energized (e.g. powered off). When this happens, the one or more springs (e.g., power springs and/or nose springs) are allowed to return the flow tube, and the associated flapper valve, to the closed state.

The present disclosure has further developed a switch system (e.g., mechanical, electrical, etc.) that will allow a single primary control line (e.g., single TEC) to operate two different downhole tools, such as the TRSV and/or WLRSV, or to operate redundant downhole tools, such as a wet connection or an actuator. For example, the switch system could shift power between two different electrical devices (e.g., electromagnetic coils, electric motor or pump, piezo-electric actuator, solenoid valve, etc.) of the two different downhole tools. As another example, the switch system could shift power between an electrical device that has failed to a redundant device that has not been powered. Thus, in at least one embodiment, a single primary control line (e.g., single TEC) could be run downhole from the surface to the switch system, and then the switch system would toggle the power between the TRSV and the WLRSV as necessary. In at least one embodiment, the switch system would toggle the power from the TRSV to the WLRSV as the WLRSV is ready to be run-in-hole, as the WLRSV is being run-in-hole, or after the WLRSV has been run-in-hole.

Accordingly, a switch system designed, manufactured and/or operated according to one or more embodiments of the disclosure reduces the need to run additional control lines, for example in contingency operations, such as when the TRSV fails and a WLRSV is necessary. This reduces the complexity in running completions, control line protection, tubing hanger penetration, and the overall cost to the customer.

FIG. 1A illustrates a well system 100 designed, manufactured and/or operated according to one or more embodiments of the disclosure. The well system 100, in at least one embodiment, includes an offshore platform 110 connected to a first downhole device 170 (e.g., first SSSV, such as a TRSV) and a second downhole device 180 (e.g., second SSSV, such as a WLRSV) via a control line 120 (e.g., single electrical control line, single primary control line, TEC, etc.). An annulus 150 may be defined between walls of a wellbore 130 and a conduit 140. A wellhead 160 may provide a means to hand off and seal conduit 140 against the wellbore 130 and provide a profile to latch a subsea blowout preventer to. Conduit 140 may be coupled to the wellhead 160. Conduit 140 may be any conduit such as a casing, liner, production tubing, or other oilfield tubulars disposed in a wellbore.

The first downhole device 170, or at least a portion thereof, may be interconnected with the conduit 140 (e.g., interconnected in line with the conduit 140) and positioned in the wellbore 130. The second downhole device 180, or at least a portion thereof, may be interconnected with the conduit 140 (e.g., positioned within an ID or OD of the conduit 140) and positioned in the wellbore 130. In the illustrated embodiment, the second downhole device 180 is illustrated uphole of the first downhole device 170 (e.g., a portion of it being run-in-hole with the first downhole device 170 and another portion of it being run-in-hole after the first downhole device 170 has failed), but other embodiments may possibly exist wherein the second downhole device 180 is located downhole of the first downhole device 170.

The control line 120 may extend into the wellbore 130 and may be connected to the first downhole device 170 and the second downhole device 180. The control line 120 may provide power to the first downhole device 170 and the second downhole device 180. As will be described in further detail below, power may be provided to first downhole device 170 or the second downhole device 180 to actuate or de-actuate the first downhole device 170 or the second downhole device 180. Actuation may comprise holding the first downhole device 170 or the second downhole device 180 in an open position, and thus providing a flow path for subsurface production fluids to enter conduit 140, and de-actuation may comprise allowing the first downhole device 170 or the second downhole device 180 to move toward a closed position, and thus closing a flow path for subsurface production fluids to enter conduit 140. While the embodiment of FIG. 1A illustrates only the first downhole device 170 and the second downhole device 180, other embodiments exist wherein more than two downhole devices according to the disclosure are used.

In accordance with one embodiment of the disclosure, the well system 100 may further include a switch system 190a positioned between the control line 120 and each of the first downhole device 170 and the second downhole device 180. The switch system 190a, as discussed above, is configured to switch the incoming power from the control line 120 between the first downhole device 170 and the second downhole device 180, depending on which of the first downhole device 170 or the second downhole device 180 that the operator intends to operate. In at least one embodiment, the first downhole device 170 includes a first electrical device (e.g., electromagnetic coils, electric motor or pump, piezoelectric actuator, solenoid valve, etc.) and the second downhole device 180 includes a second electrical device (e.g., electromagnetic coils, electric motor or pump, piezoelectric actuator, solenoid valve, etc.), and the switch system 190a is configured to switch the incoming power from the control line 120 between the first electrical device of the first downhole device 170 and the second electrical device of the second downhole device 180.

While the embodiment of FIG. 1A employs a single control line 120 and the switch system 190a, other embodiments of the disclosure could use two or more different control lines with or without the switch system 190a. Although the well system 100 is depicted in FIG. 1A as an offshore well system, one of ordinary skill should be able to adopt the teachings herein to any type of well, including onshore or offshore. In the embodiment of FIG. 1A, the first downhole device 170 is a TRSV, and the second downhole device 180 is a WLRSV.

Figure 1B:
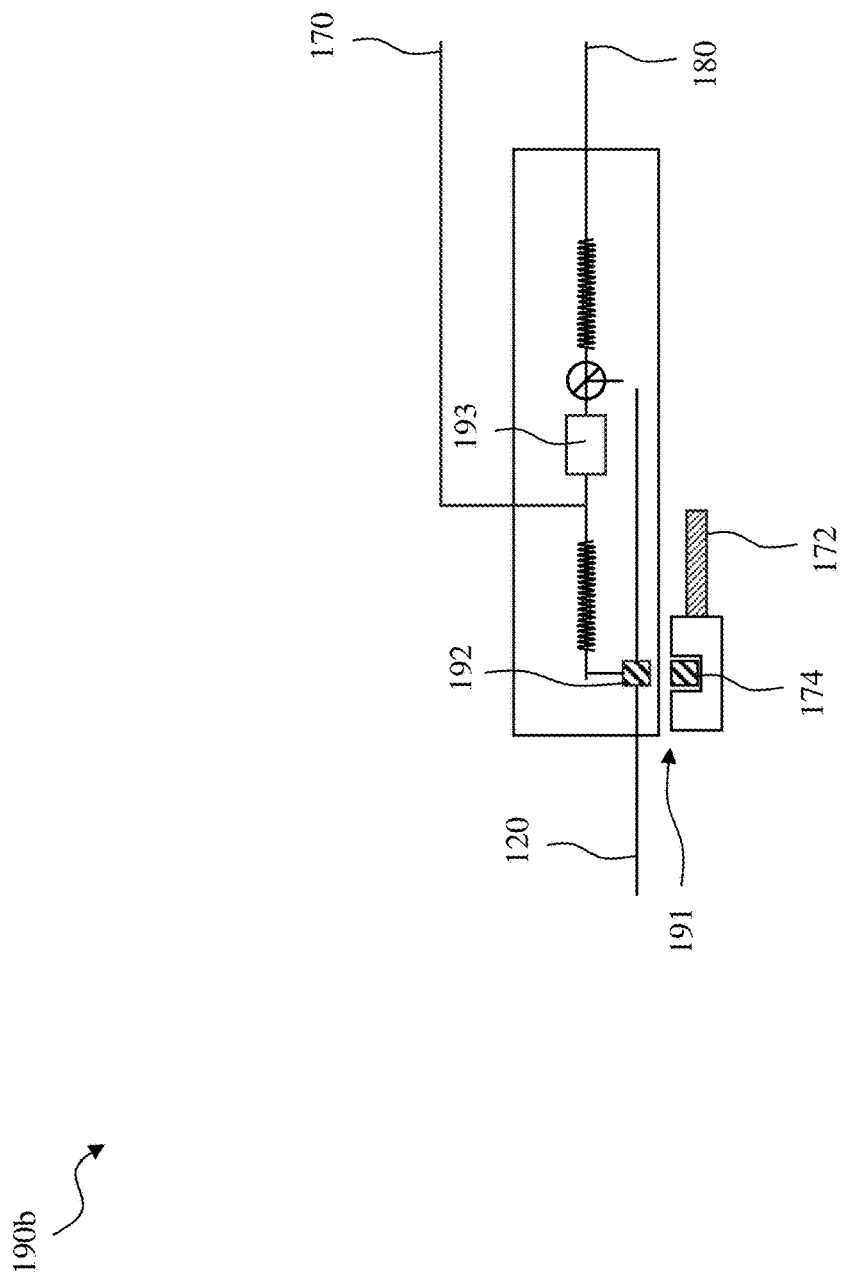
FIGS. 1B and 1C illustrate one embodiment of a switch system designed, manufactured and/or operated according to one or more embodiments of the disclosure, as might be used in the well system of FIG. 1A.
Figure 1C:
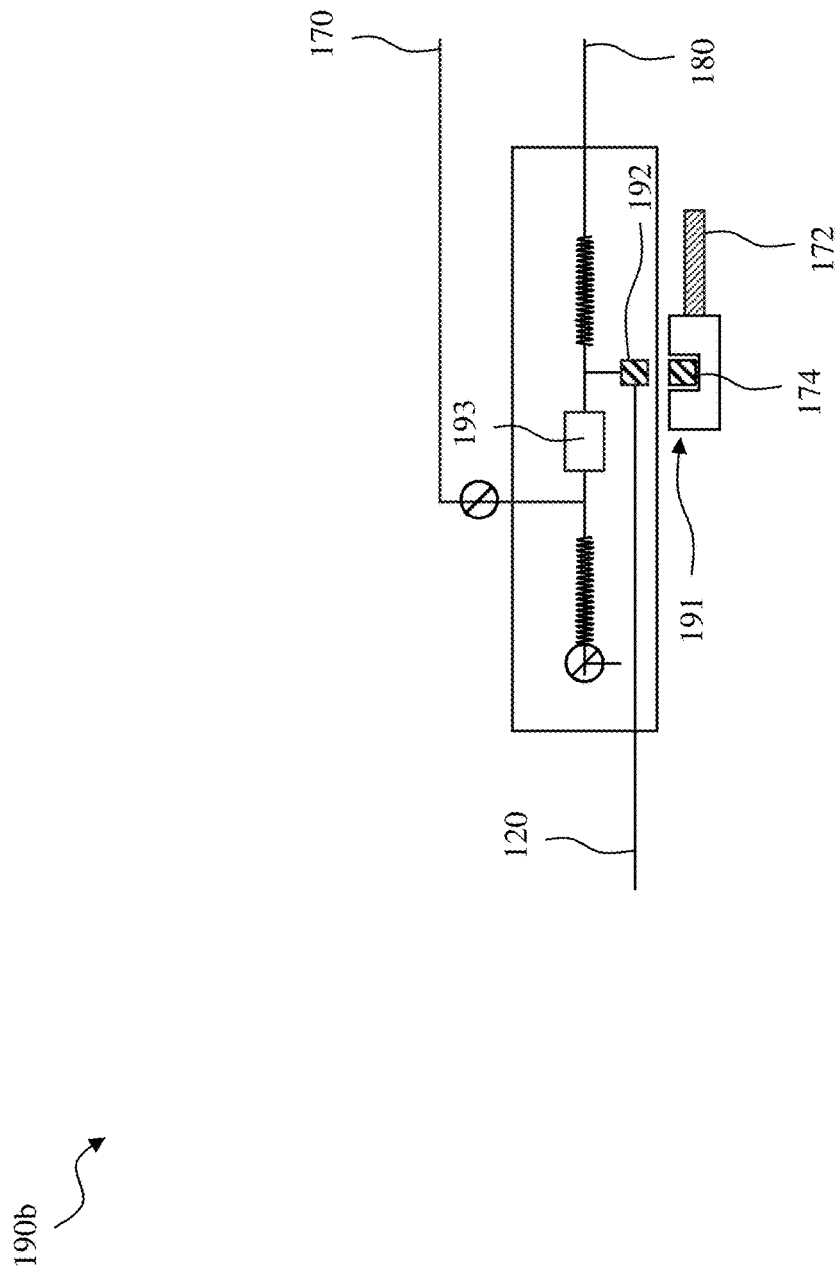

Turning to FIGS. 1B and 1C, illustrated is one embodiment of a switch system 190b designed, manufactured and/or operated according to one or more embodiments of the disclosure, as might be used in the well system 100 of FIG. 1A. The switch system 190b, in the illustrated embodiment, is a mechanical switch system. In the illustrated embodiment, the switch system 190b includes a mechanical switch 191, the mechanical switch 191 having an input thereof coupled to the control line 120, and a first output thereof coupled to the first downhole device 170 and a second output thereof coupled to the second downhole device 180. Accordingly, the mechanical switch 191 switches the input power from the control line 120 between the first downhole device 170 (e.g., FIG. 1B) and the second downhole device 180 (e.g., FIG. 1C), as necessary.

While a number of different embodiments for mechanical switch systems may be used, in the illustrated embodiment, a sliding sleeve 172 of the first downhole device 170 includes a permanent magnet 174 thereon. Similarly, the switch system 190b includes a related permanent magnet 192 therein, for example coupled to the mechanical switch 191. Furthermore, the switch system 190b may include an insulator 193 separating the first output and the second output. Accordingly, the related permanent magnet 192 will couple with the permanent magnet 174 to switch the power between the first downhole device 170 and the second downhole device 180, in this instance as the sliding sleeve 172 moves, as shown in FIGS. 1B and 1C. In at least one embodiment, the sliding sleeve 172 is configured to move when the second downhole tool 180 is being run-in-hole.

While not illustrated in FIGS. 1B and 1C, another embodiment may exist wherein a reed switch is employed to switch between the first downhole device 170 and the second downhole device 180. In such an embodiment, one or more of the permanent magnets 192 could be exchanged for a reed switch. Thus, as the permanent magnet 174 passes over the reed switch, the reed switch will switch the power between the first downhole device 170 and the second downhole device 180. In at least one embodiment, ones of the one or more reed switches are single pole single-throw reed switches and/or single pole double-throw reed switches. Those skilled in the art appreciate how such reed switches could be configured to achieve the desires stated herein.

Figure 1D:
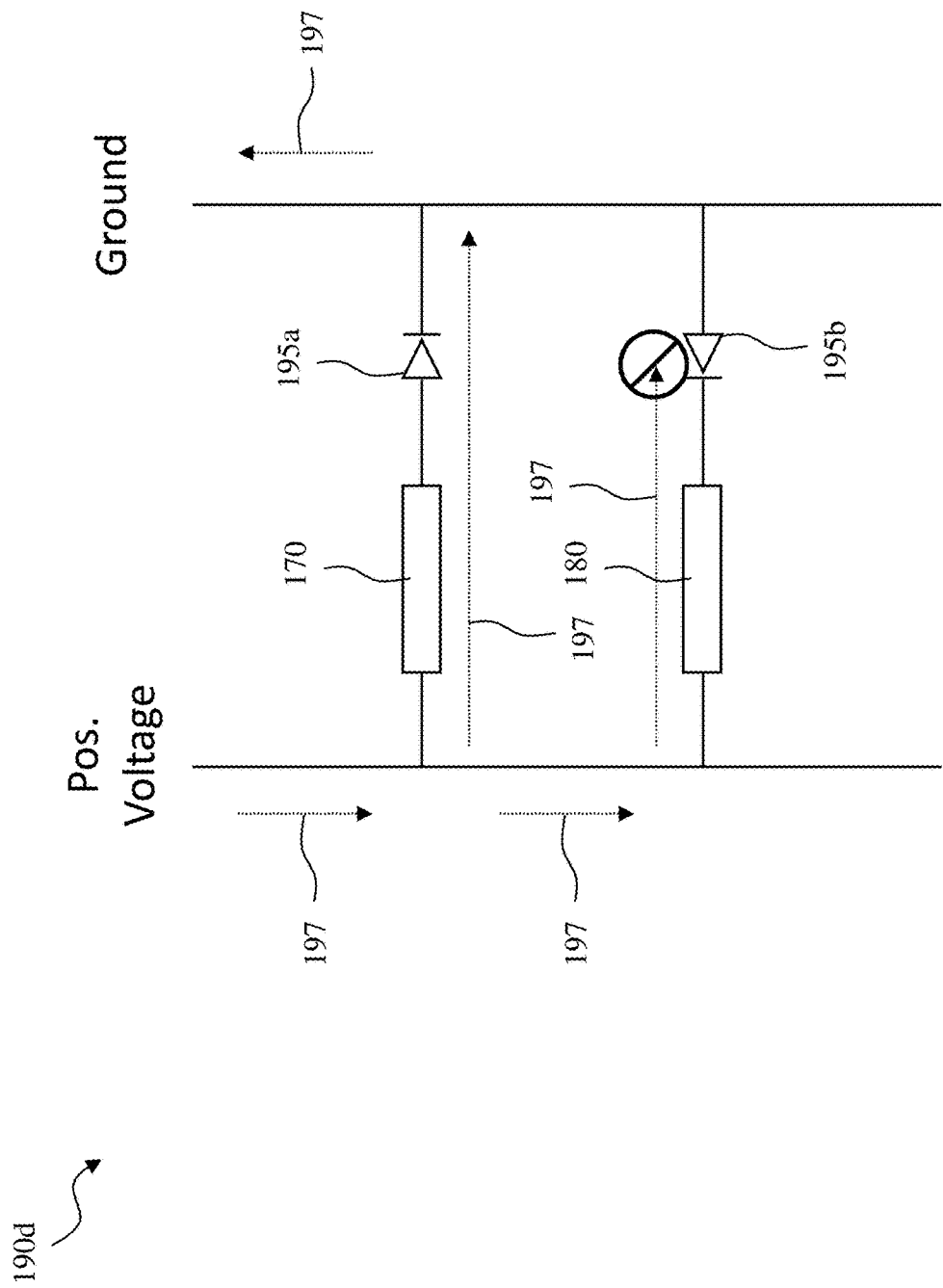
FIGS. 1D and 1E illustrate an alternative embodiment of a switch system designed, manufactured and/or operated according to one or more embodiments of the disclosure, as might be used in the well system of FIG. 1A.
Figure 1E:
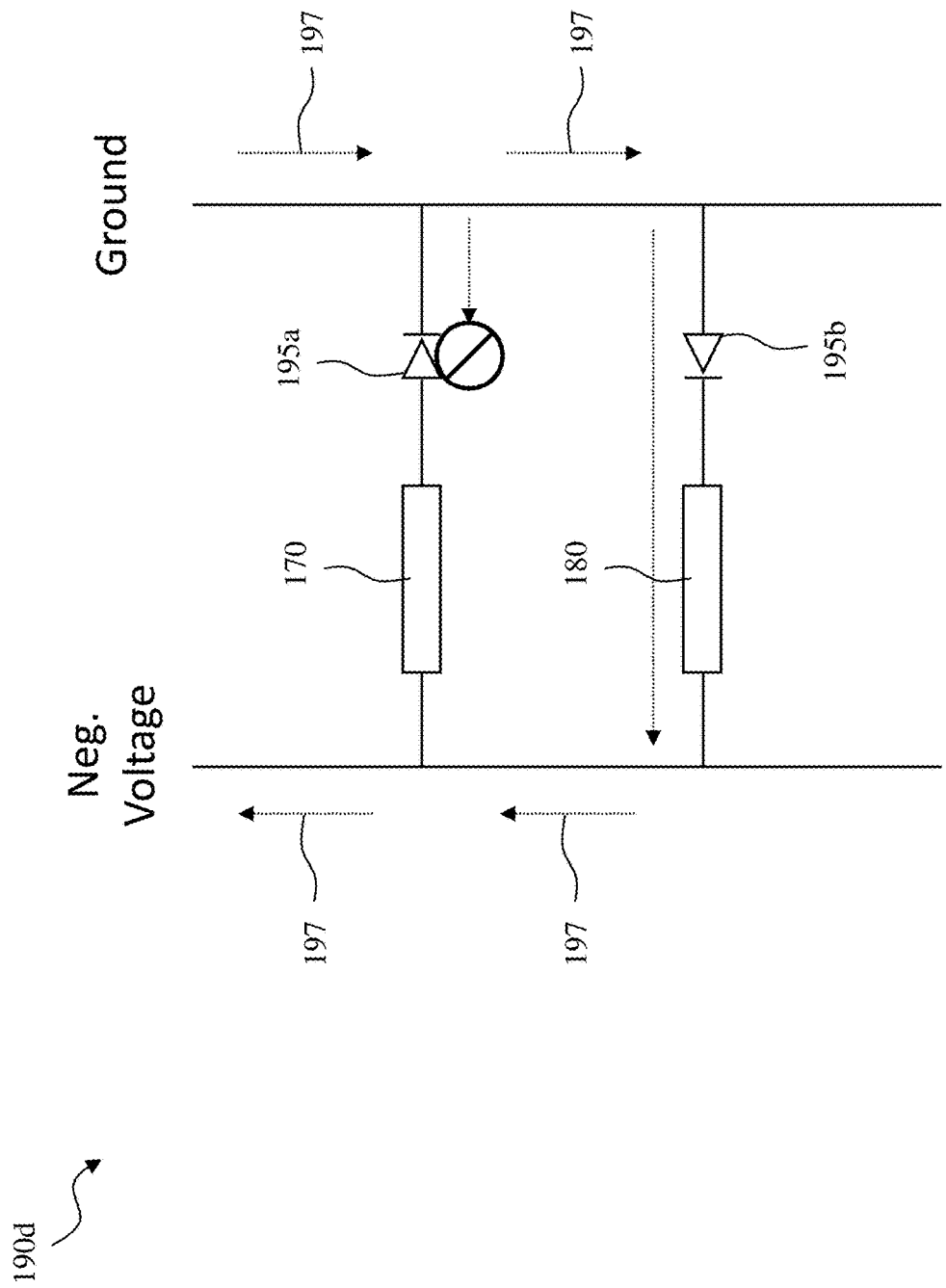

Turning to FIGS. 1D and 1E, illustrated is one embodiment of a switch system 190d designed, manufactured and/or operated according to one or more embodiments of the disclosure, as might be used in the well system 100 of FIG. 1A. The switch system 190d, in the illustrated embodiment, is an electrical switch system. In the illustrated embodiment, the switch system 190d includes ones of oppositely oriented diodes 195a, 195b coupled between the primary control line 120 and each of the first downhole tool 170 and the second downhole tool 180, respectively. Thus, for example, if a positive voltage is applied to the primary control line 120, the first diode 195a would allow the current 197 to pass therethrough and thus would establish a closed circuit, and therefore the first downhole tool 170 would be energized. However, the second diode 195b would not allow the current 197 to pass therethrough and thus would establish an open circuit, and thus the second downhole device 180 would not be powered. In contrast, if a negative voltage is applied to the primary control line 120, the first diode 195a would not allow the current 197 to pass therethrough and thus would establish an open circuit, and therefore the first downhole tool 170 would not be powered. However, the second diode 195b would allow the current 197 to pass therethrough and thus would establish a closed circuit, and thus the second downhole device 180 would be powered. Thus, by toggling the voltage between a positive voltage (e.g., preset positive voltage) and a negative voltage (e.g., preset negative voltage), the switch system 190c powers different ones of the first downhole tool 170 and the second downhole tool 180.

Figure 1F:
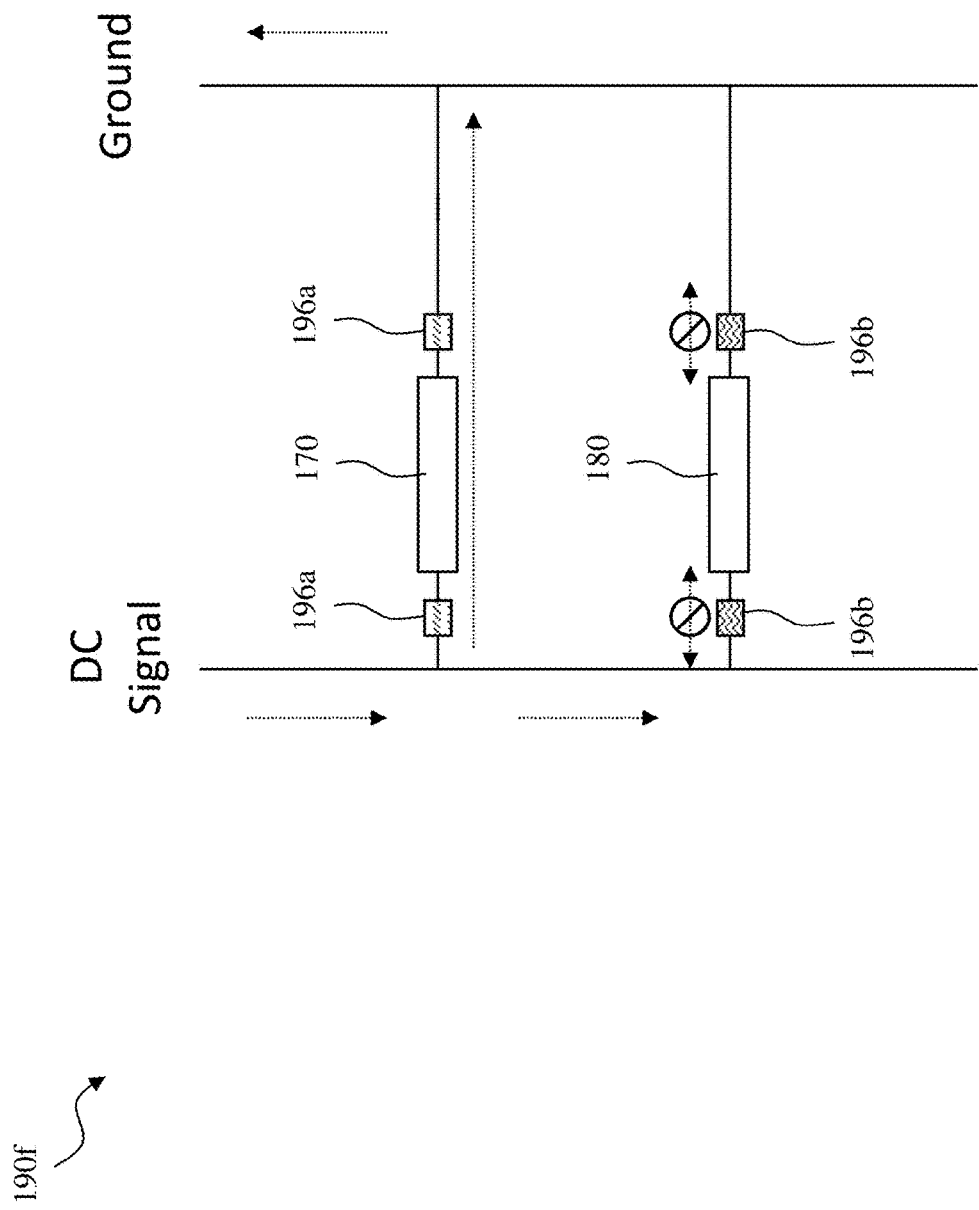
FIGS. 1F and 1G illustrate an alternative embodiment of a switch system designed, manufactured and/or operated according to one or more embodiments of the disclosure, as might be used in the well system of FIG. 1A.
Figure 1G:
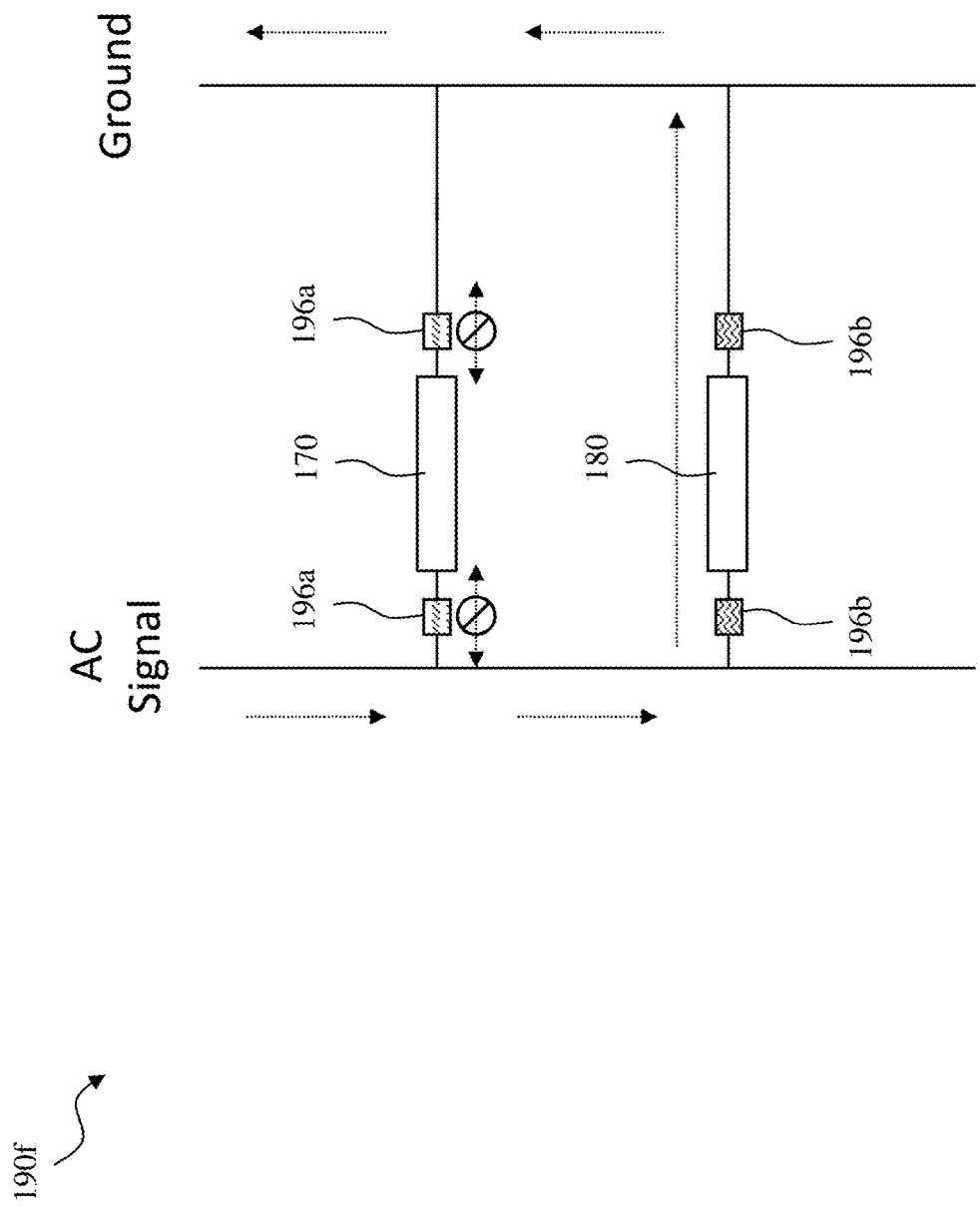

Turning to FIGS. 1F and 1G, illustrated is one embodiment of a switch system 190f designed, manufactured and/or operated according to one or more embodiments of the disclosure, as might be used in the well system 100 of FIG. 1A. The switch system 190f, in the illustrated embodiment, is an electrical switch system. In the illustrated embodiment, the switch system 190f includes ones (e.g., pairs) of low bandpass/high bandpass filters coupled between the primary control line 120 and the first downhole tool 170, and ones (e.g., pairs) of high bandpass/low bandpass filters coupled between the primary control line 120 and the second downhole tool 180. In this scenario, the ones of low bandpass filters would be configured to pass a lower frequency DC signal of a DC power source (e.g., and block the higher frequency AC signal of an AC power source), and the ones of the high bandpass filters would be configured to pass the higher frequency AC signal of the AC power source (e.g., and block the lower frequency DC signal of the DC power source). Accordingly, by switching the signal between DC and AC, one of the first downhole tool 170 or second downhole tool 180 will receive power, while the other of the second downhole tool 180 or the first downhole tool 170 will not receive power.

In the embodiment of FIGS. 1F and 1G, ones of low bandpass filters 196a surround the first downhole tool 170 and ones of high bandpass filters 196b surround the second downhole tool 180. Accordingly, as shown in FIGS. 1F and 1G, a DC signal will only power the first downhole tool 170 and an AC signal will only power the second downhole tool 180. Thus, by switching between a DC signal and an AC signal different ones of the first downhole device 170 and second downhole device 180 will be powered.

Figure 1H:
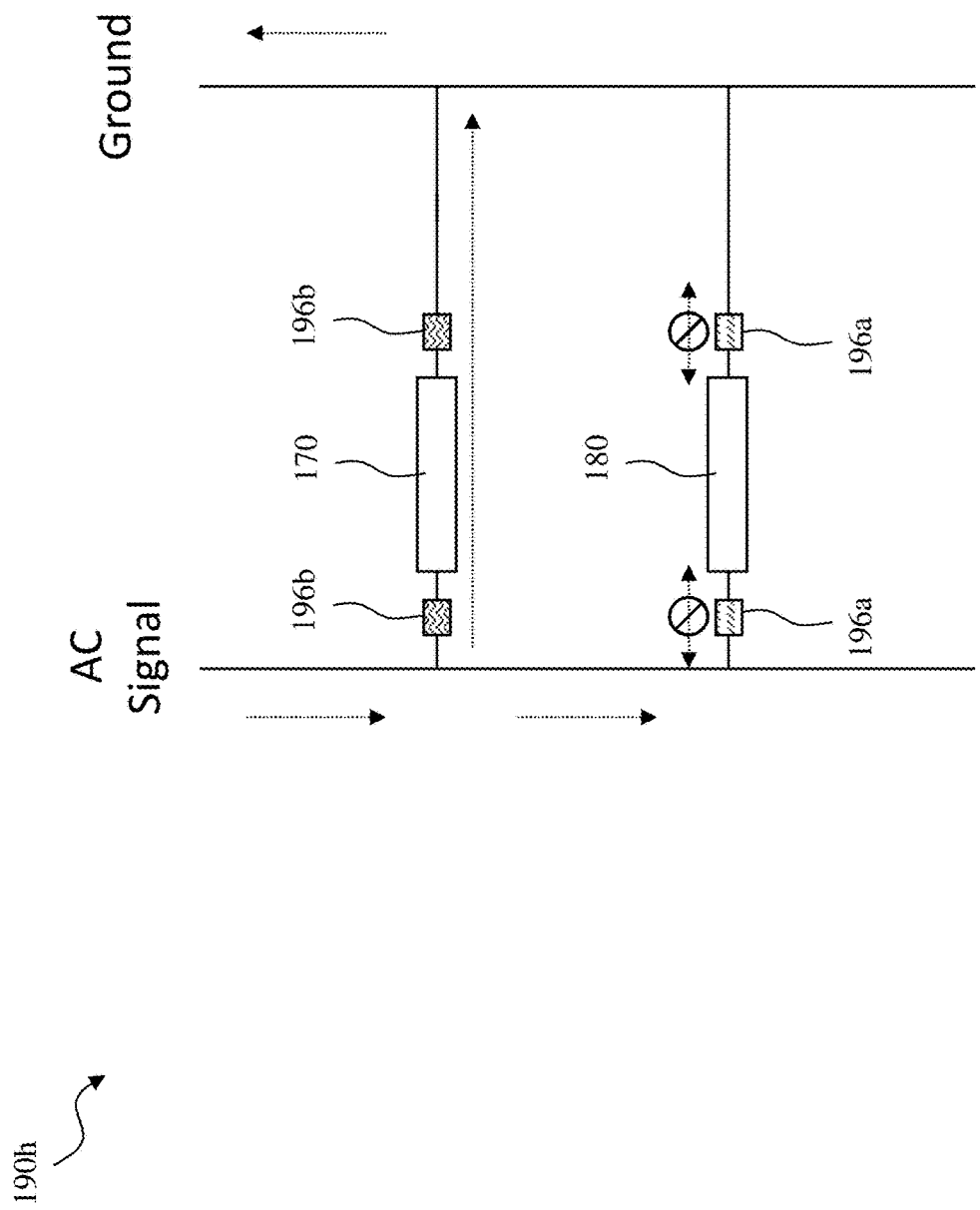
Figure 11:
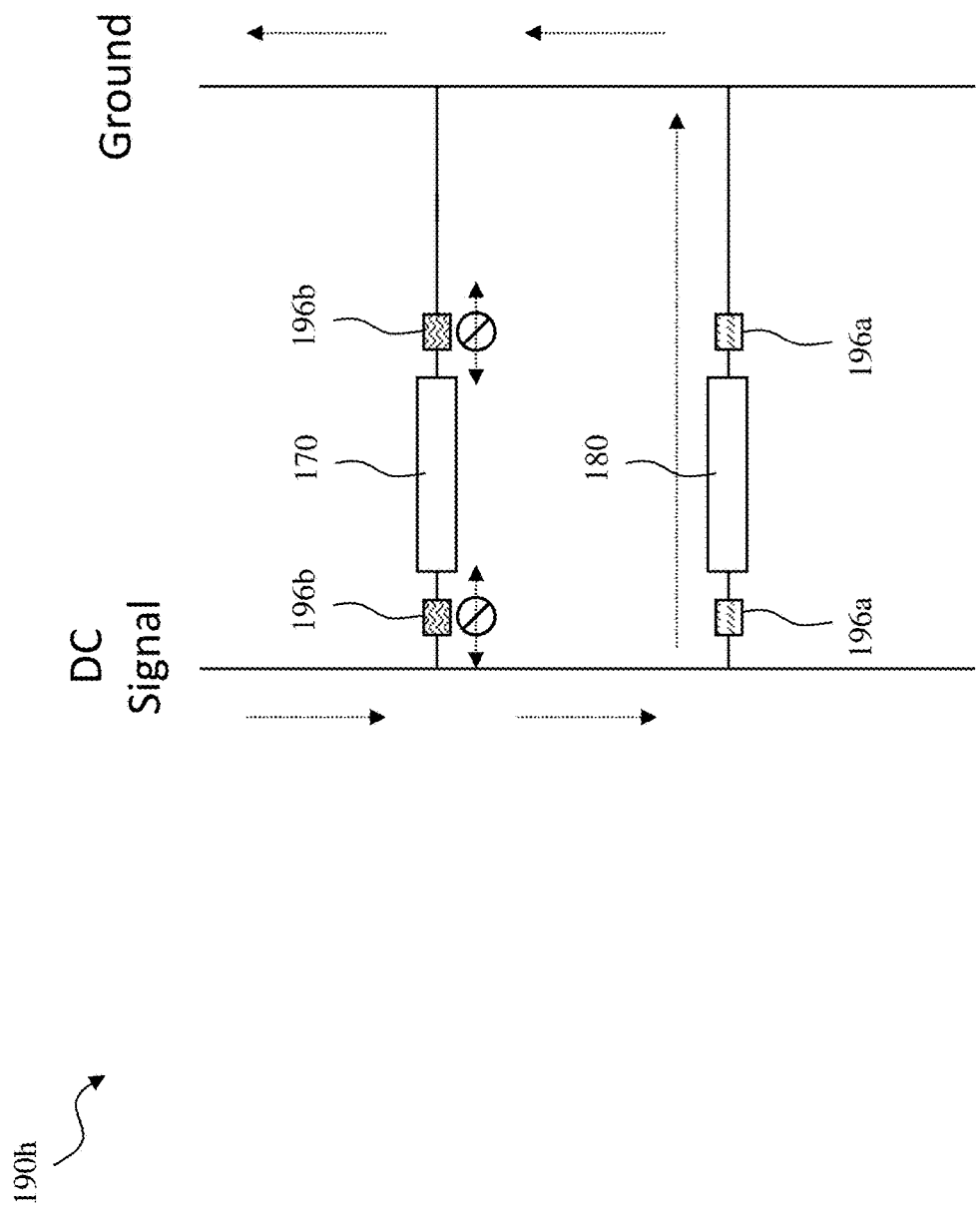

Turning to FIGS. 1H and 1I, illustrated is one embodiment of a switch system 190h designed, manufactured and/or operated according to one or more embodiments of the disclosure, as might be used in the well system 100 of FIG. 1A. In the embodiment of FIGS. 1H and 1I, ones of low bandpass filters 196a surround the second downhole tool 180 and ones of high bandpass filters 196b surround the first downhole tool 170. Accordingly, as shown in FIGS. 1H and 1I, a DC signal will only power the second downhole tool 180 and an AC signal will only power the first downhole tool 170. Thus, by switching between a DC signal and an AC signal different ones of the first downhole device 170 and second downhole device 180 will be powered.

Figure 1J:
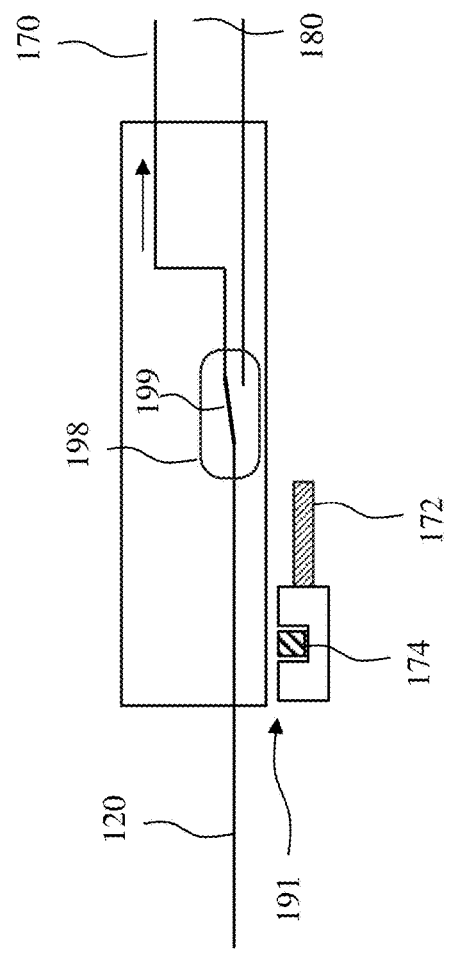
FIGS. 1J and 1K illustrate an alternative embodiment of a switch system designed, manufactured and/or operated according to one or more embodiments of the disclosure, as might be used in the well system of FIG. 1A.
Figure 1K:
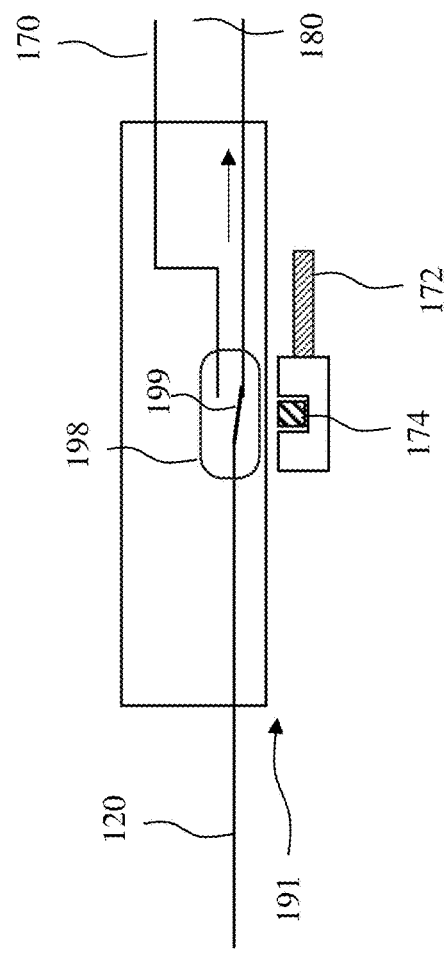

Turning to FIGS. 1J and 1K, illustrated is one embodiment of a switch system 190j designed, manufactured and/or operated according to one or more embodiments of the disclosure, as might be used in the well system 100 of FIG. 1A. The switch system 190j contains a magnetically activated switch 198. In one embodiment, the magnetically active switch 198 is a reed switch, as shown in FIGS. 1J and 1K. When there is no magnetic field, then the contact 199 in the reed switch is biased towards an electrical connection with the first downhole tool 170 and electrical current (e.g., power) can flow to that tool. In FIG. 1K, the permanent magnet 174 creates a magnetic attraction that pulls the contact 199 towards an electrical connection with the second downhole tool 180 and electrical current (e.g. power) flows towards the second downhole tool 180. Obviously, the switch system 190j could be oppositely designed, and thus when there is no magnetic field, then the contact 199 in the reed switch is biased towards an electrical connection with the second downhole tool 180 and electrical current (e.g., power) can flow to that tool. The magnetically activated switch 198 can employ two reed switches rather than the double throw switch that is shown. One of the advantages of the reed switch is that it is a mechanical switch and contains no electronics. As an alternative embodiment, the magnetically activated switch 198 could be a tunnel magnetoresistance (TMR) switch. A TMR switch contains a magnetic tunnel junction where the resistance of the junction varies with magnetic field. The TMR switch varies between high resistance (open switch) and low resistance (closed switch) with applied magnetic field.

Figure 1L:
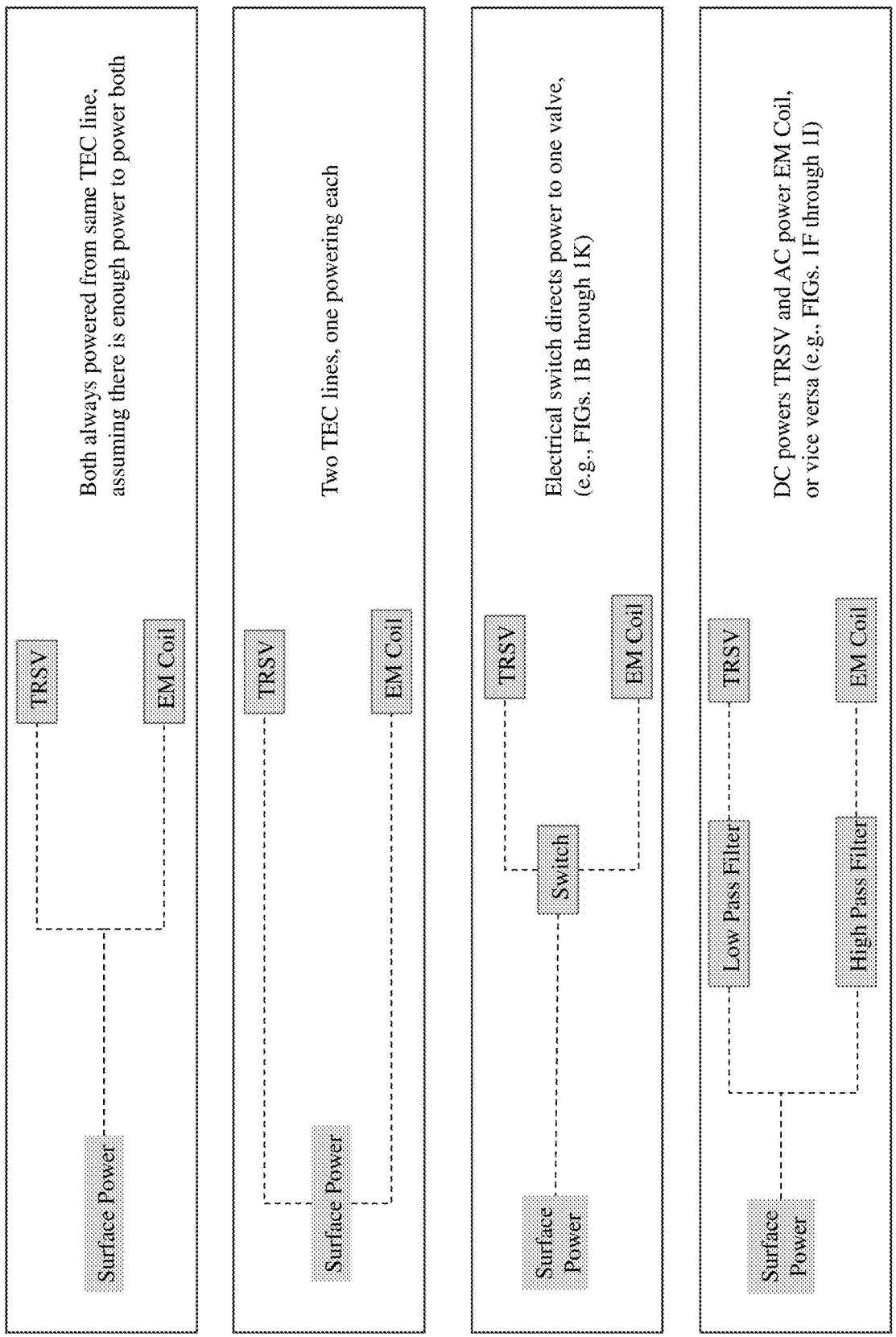
FIG. 1L illustrates a chart showing various different ways that an operator may provide power to the TRSV and/or WLRSV, including using a single control line, two dedicated control lines, a single control line with a switch, as well as a single control line with low/high pass filters.

Turning to FIG. 1L, illustrated is a chart illustrating various different ways that an operator may provide power to the TRSV and/or WLRSV, including using a single control line, two dedicated control lines, a single control line with a switch, as well as a single control line with low/high pass filters.

Figure 2A:
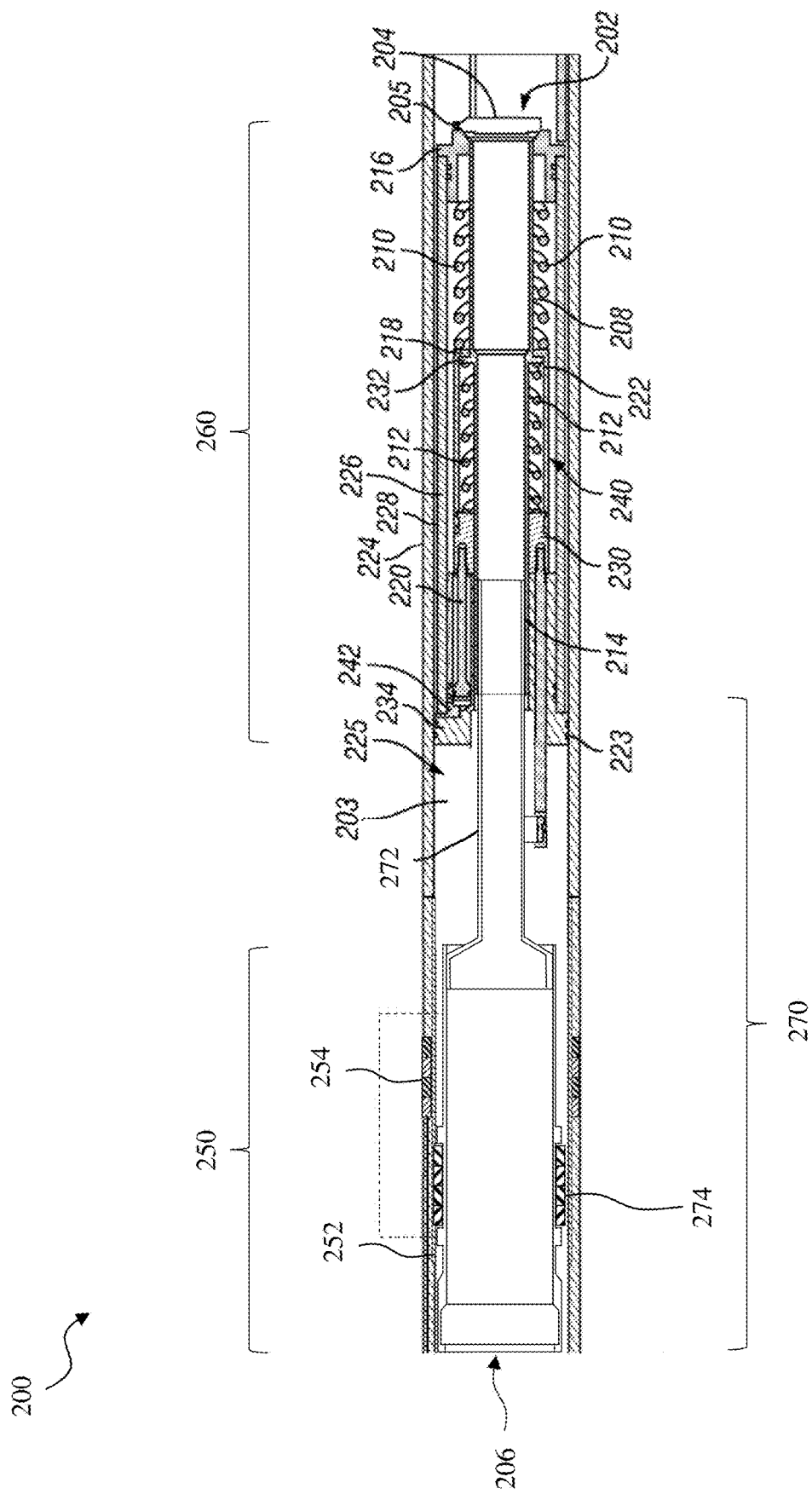
FIGS. 2A through 2I illustrate one embodiment of a subsurface safety valve designed, manufactured and/or operated according to one or more embodiments of the disclosure, as might employ first, second and third portions of a WLRSV.

Turning to FIGS. 2A through 2I illustrated is one embodiment of an SSSV 200 designed, manufactured and/or operated according to one or more embodiments of the disclosure, as might employ the first, second and third portions of the WLRSV, as discussed above. Referring to FIG. 2A, the SSSV 200 is illustrated in a first closed position. The SSSV 200 may include a housing 224 containing a bore 206 therein, wherein components of the SSSV 200 may be disposed within the bore 206. An upper valve assembly 234 may be attached to the housing 224 and may further include one or more sealing elements 223, such that fluid communication from a lower section 202 to an upper section 203 is prevented.

In the illustrated embodiment, a sleeve 226 may be attached to the upper valve assembly 234 and a lower valve assembly 216. Furthermore, a flow tube 240 may be disposed within the sleeve 226. The flow tube 240 may include a translating sleeve 222 and a flow tube main body 208. A flow path 214 may be defined by an interior of the flow tube main body 208. As illustrated in FIG. 2A, the flow path 214 may extend from an interior of a conduit 206 through an interior of flow tube main body 208. As will be discussed in further detail below, when the SSSV 200 is in an open position, the flow path 214 may extend from an interior of conduit 206 through an interior of the flow tube main body 208 and further into the lower section 202.

A power spring 210 may be disposed between the lower valve assembly 216 and a translating sleeve shoulder 218. As illustrated in FIG. 2A, the translating sleeve shoulder 218 and a flow tube shoulder 232 may be in contact when the SSSV 200 is in the first closed position. The power spring 210 may provide a positive spring force against the translating sleeve shoulder 218, which may keep the flow tube main body 208 in a first position (e.g., that shown in FIG. 2A). The power spring 210 may also provide a positive spring force to return the flow tube main body 208 and the translating sleeve 222 to the first position from a second position (e.g., that shown in FIG. 2D), as will be explained below.

A nose spring 212 may be disposed between a translating sleeve assembly 230 and the flow tube shoulder 232. The translating sleeve assembly 230 may be disposed between and attached to a piston 220 and the translating sleeve 222. Although only one piston 220 is illustrated in FIGS. 2A through 2I, there may be multiple pistons attached to the translating sleeve 222. The power spring 210 and the nose spring 212 are depicted as coiled springs in FIGS. 2A through 2I. However, the power spring 210 and the nose spring 212 may include any kind of spring, such as, for example, coil springs, wave springs, or fluid springs, and remain within the scope of the disclosure.

The translating sleeve assembly 230 may allow a force applied to a distal end of the piston 220 to be transferred into the translating sleeve 222. A force may be applied to the distal end of the piston 220 by way of fluid communication from a channel 228 through an orifice 242. A force applied to the piston 220 may move the translating sleeve 222 from a first position (e.g., FIG. 2A) to a second position (e.g., FIG. 2D). The nose spring 212 may provide a positive spring force against the translating sleeve assembly 230 and the flow tube shoulder 232, which may move the translating sleeve 222 from the second position to the first position as will be discussed in greater detail below.

In the first closed position, the translating sleeve 222 and the flow tube main body 208 are positioned such that the translating sleeve shoulder 218 and the flow tube shoulder 232 are in contact and the power spring 210 and the nose spring 212 are in an extended position. In the first closed position, the translating sleeve 222 may be referred to as being in a first position and flow tube main body 208 may be referred to as being in a first position.

The SSSV 200 may be disposed in a wellbore as part of a wellbore completion string. The wellbore may penetrate a subterranean formation that contains formation fluids such as oil, gas, water, or any combination thereof. The formation fluids may flow from the subterranean formation into the wellbore and thereafter into a lower portion of conduit 206 as discussed above. The lower section 202 may be fluidically coupled to a lower portion of conduit 206 and therefore may be exposed to formation fluids and pressure, as a function of being in fluid communication with fluids present in the wellbore. The lower section 202 may be fluidically coupled to a production tubing string disposed in the wellbore, for example.

In the first closed position, a valve 204 may be in a closed position thereby isolating lower section 202 from flow tube main body 208. When the valve 204 is in a closed position as in FIG. 2A, the valve 204 may prevent formation fluids and pressure from flowing into the flow tube main body 208. Although FIG. 2A illustrates the valve 204 as a flapper valve, the valve 204 may be any suitable type of valve, such as a flapper type valve or a ball type valve, for example. As will be illustrated in further detail below, the valve 204 may be actuated into an open position to allow formation fluids to flow from the lower section 202 through the flow path 214 defined by the lower section 202, an interior of the flow tube main body 208 and an interior of the conduit 206. The conduit 206 may be coupled to an upper portion of the conduit shown in FIG. 1A.

When the SSSV 200 is in the first closed position, no amount of differential pressure across the valve 204 will allow formation fluids to flow from lower section 202 into the flow path 214. In the first closed position, the SSSV 200 will only allow fluid flow from conduit 206 into the lower section 202 but not from the lower section 202 into the conduit 206. In the instance that pressure in the conduit 206 is increased, the valve 204 will remain in the closed position until the pressure in the conduit 206 is increased above the pressure in the lower section 202 plus the closing pressure provided by a flapper spring 205, sometimes referred to herein as valve opening pressure.

When the valve opening pressure is reached, the valve 204 may open and allow fluid communication from the conduit 206 into the lower section 202. In this manner, treatment fluids such as surfactants, scale inhibitors, hydrate treatments, and other suitable treatment fluids may be introduced into the subterranean formation. The configuration of the SSSV 200 may allow treatment fluids to be pumped from a surface, such as a wellhead, into the subterranean formation without actuating a control line or balance line to open the valve. Once pressure in the conduit 206 is decreased below the valve opening pressure, the flapper spring 205 may cause the valve 204 to return to the closed position, and flow from the conduit 206 into the lower section 202 may cease. When the valve 204 has returned to the closed position, flow from the lower section 202 into the flow path 214 may be prevented. Should a pressure differential across the valve 204 be reversed such that pressure in the lower section 202 is greater than a pressure in the conduit 206, the valve 204 will remain in a closed position such that fluids in the lower section 202 are prevented from flowing into the conduit 206.

In the illustrated embodiment, the SSSV 200 includes a first portion 250, a second portion 260 (e.g., the second portion 260 may include those features disclosed in the paragraph above, for example those feature located between the upper valve assembly 234 and the valve 204, and specifically the flow tube main body 208 and the valve 204), and a third portion 270. As indicated above, in at least one embodiment, the first portion 250 is run-in-hole with the TRSV, and the second and third portions 260, 270 are run-in-hole after the TRSV is no longer working properly and/or has failed. For example, the third portion 270 may be run-in-hole in a separate step after the second portion 260 has been run-in-hole.

In one or more embodiments, the first portion 250 includes a fluid isolation sleeve 252, and the two or more electromagnets 254. The two or more electromagnets 254, in one or more embodiments, may include an insulated electrical wire that makes loops around a common axis in order to produce a magnetic field when a current passes through the wire. The number of loops may vary, but in at least one embodiment the number of loops is between 10 and 500,000, if not between 100 and 100,000. As discussed above, the electric wires of the two or more electromagnets 254 may be oppositely wound to provide the desired opposite polarities.

In one or more embodiments, the fluid isolation sleeve 252 isolates the two or more electromagnets 254 from fluid and/or debris within the wellbore. The fluid isolation sleeve may be ported to allow pressure balancing. In one embodiment, the fluid isolation sleeve 252 is mechanically connected to the two or more electromagnets 254. In at least one embodiment, the fluid isolation sleeve 252 is a fixed fluid isolation sleeve, and thus does not readily move once positioned downhole. For example, the fluid isolation sleeve 252 could comprise a composite, a plastic, a ceramic, aluminum, stainless steel, or another non-ferromagnetic material. In yet another embodiment, the fluid isolation sleeve 252 could comprise a ferromagnetic material, but would need to be sufficient thin as to not draw too much of the magnetic force generated by the two or more electromagnets 254 from achieving their intended use, as discussed below.

In one or more embodiments, the second portion 260 includes the flow tube main body 208 and the valve 204, and may be located below the first portion 250 (e.g., below the fluid isolation sleeve 252, and the two or more electromagnets 254). The second portion 260 may additionally include the power spring 210 and/or the nose spring 212, as will be further discussed below.

In one or more other embodiments, the third portion 270 includes a mechanical connecting apparatus 272, the mechanical connecting apparatus including two or more permanent magnets 274. The mechanical connecting apparatus 272, in at least one embodiment, axially couples the two or more permanent magnets 274 of the third portion and the flow tube main body 208 of the second portion 260.

Figure 2B:
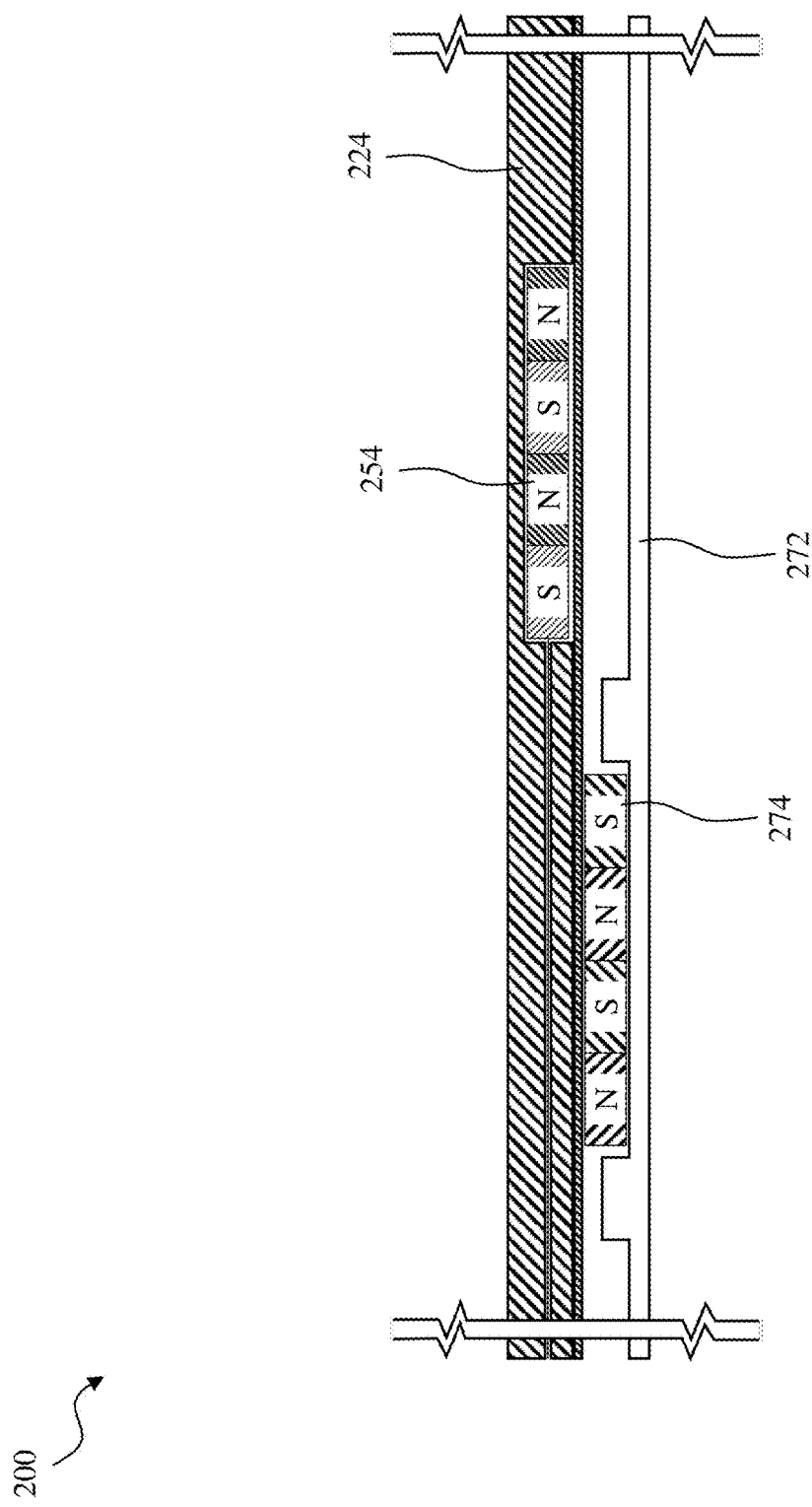

Turning briefly to FIG. 2B, illustrated is an exploded view of a portion of the SSSV 200 of FIG. 2A. FIG. 2B illustrates how the two or more electromagnets 254 and the two or more permanent magnets 274 may alternate in polarity (e.g., oppositely alternate in polarity).

Figure 2C:
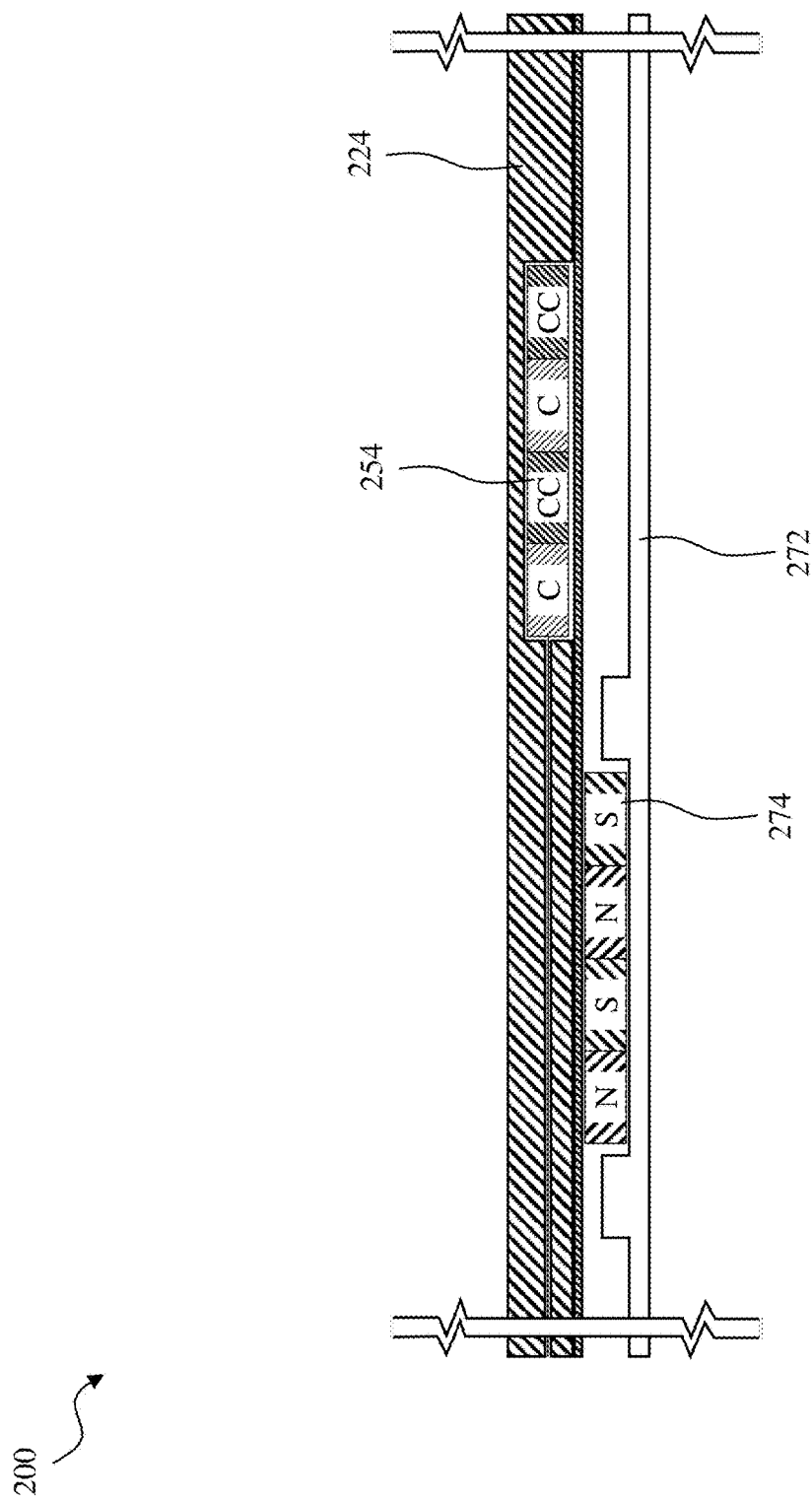

Turning briefly to FIG. 2C, illustrated is an alternate exploded view of a portion of the SSSV 200 of FIG. 2A. FIG. 2C illustrates how the two or more electromagnets 254 may alternate in polarity by going between a clockwise (C) and a counter-clockwise (CC) winding of the wire.

Figure 2D:
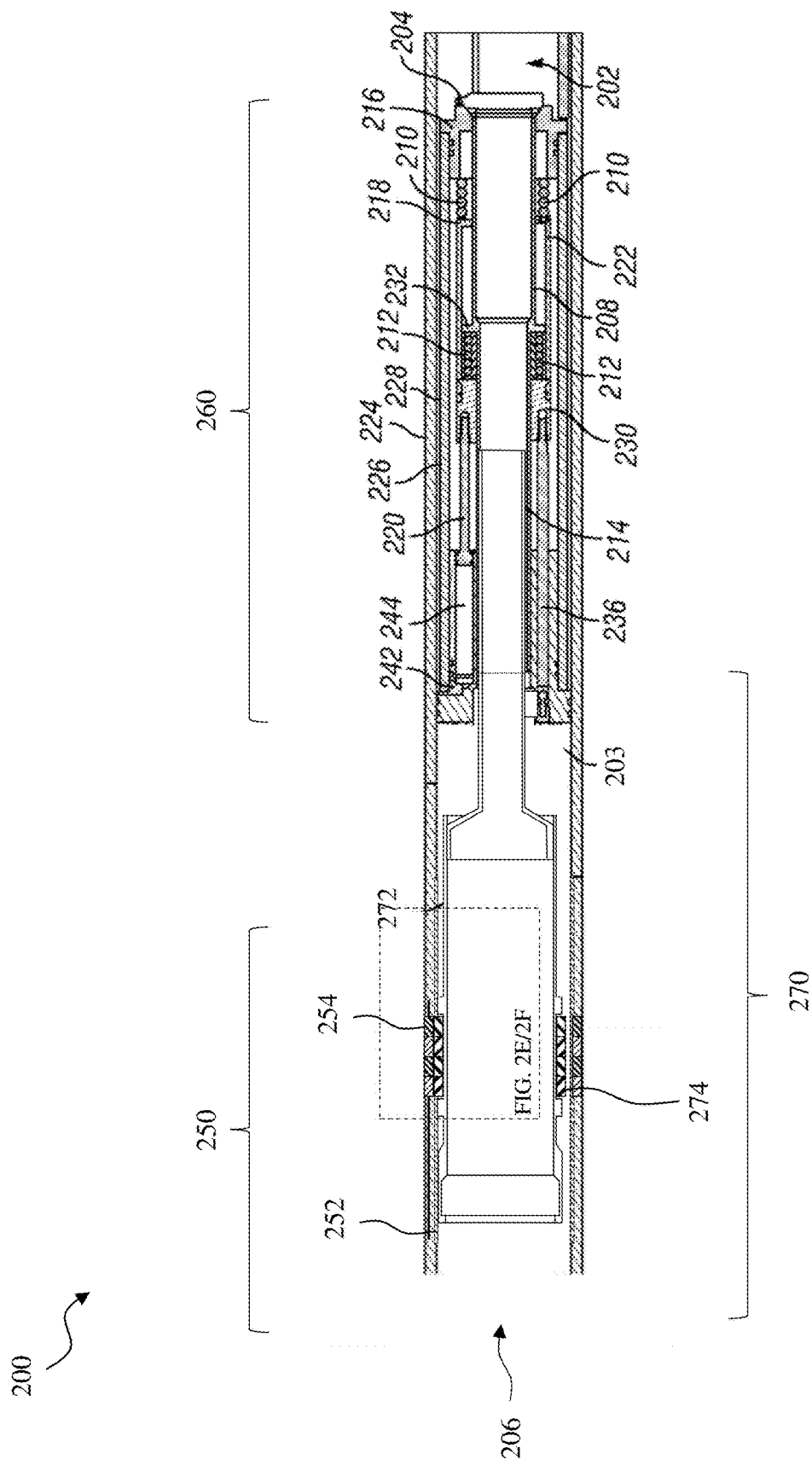

With reference to FIG. 2D the SSSV 200 is illustrated in a second closed position. In the second closed position, the translating sleeve 222 may be displaced from the first position to a second position, which is relatively closer in proximity to the valve 204. The flow tube main body 208 may remain in the first position, or alternatively only slightly downhole from the first position. When the SSSV 200 is in the second closed position, both the power spring 210 and the nose spring 212 may be in a compressed state.

To move the translating sleeve 222 to the second position, differential pressure across the valve 204 may be increased by lowering the pressure in the conduit 206 or increasing pressure in the lower section 202. Lowering pressure in the conduit 206 or increasing pressure in the lower section 202 may cause fluid from the lower section 202 to flow through the channel 228 defined between the sleeve 226 and the housing 224 into the orifice 242. The orifice 242 may allow fluid communication into a piston tube 244 whereby fluid pressure may act on the proximal end of the piston 220. The force exerted by fluid pressure on the proximal end of the piston 220 may displace the piston 220 towards the valve 204 by transferring the force through the piston 220, the translating sleeve assembly 230, and the translating sleeve shoulder 218. The nose spring 212 may provide a spring force against the flow tube shoulder 232 and the translating sleeve assembly 230, and the power spring 210 may provide a spring force against the translating sleeve shoulder 218 and the lower valve assembly 216.

Although not illustrated in FIGS. 2A through 2I, the flow tube main body 208 may include channels that allow pressure and/or fluid communication between the flow path 214 and an interior of the sleeve 226. Collectively the spring forces from the power spring 210 and the nose spring 212 may resist the movement of the piston 220 until the differential pressure across the valve 204 is increased beyond the spring force provided from the power spring 210 and the nose spring 212. Increasing differential pressure may include decreasing pressure in the conduit 206 such that the pressure in the lower section 202 is relatively higher than the pressure in the conduit 206. When the differential pressure across the valve 204 is increased, the differential pressure across the piston 220 also increases. When the differential pressure across the valve 204 is increased beyond the spring force provided by the nose spring 212 and the power spring 210, the nose spring 212 and the power spring 210 may compress and allow the translating sleeve 222 to move into the second position. Differential pressure across the valve 204 may be increased by pumping fluid out of the conduit 206, for example. In the instance that the lower section 202 is fluidically coupled to a non-perforated section of pipe or where there is a plug in the conduit 206 fluidically coupled to the lower section 202 that prevents pressure being transmitted from the lower section 202 to the piston 220, a pressure differential across the valve 204 may be induced through pipe swell.

In the second closed position, the SSSV 200 remains safe as no fluids from the lower section 202 can flow into the flow path 214. In the second closed position, no amount of differential pressure across the valve 204 should cause the valve 204 to open to allow fluids from the lower section 202 to flow into the flow path 214, as the pressure from the lower section 202 is acting on the valve 204. If pressure is increased in the conduit 206, the differential pressure across the valve 204 decreases and the translating sleeve 222 may move back to the first position illustrated in FIG. 2A. Unlike conventional safety valves that generally require a control line to supply pressure to actuate a piston to move a translating sleeve, the SSSV 200 may only require pressure supplied by the wellbore fluids in the lower section 202 to move the translating sleeve.

Figure 2E:
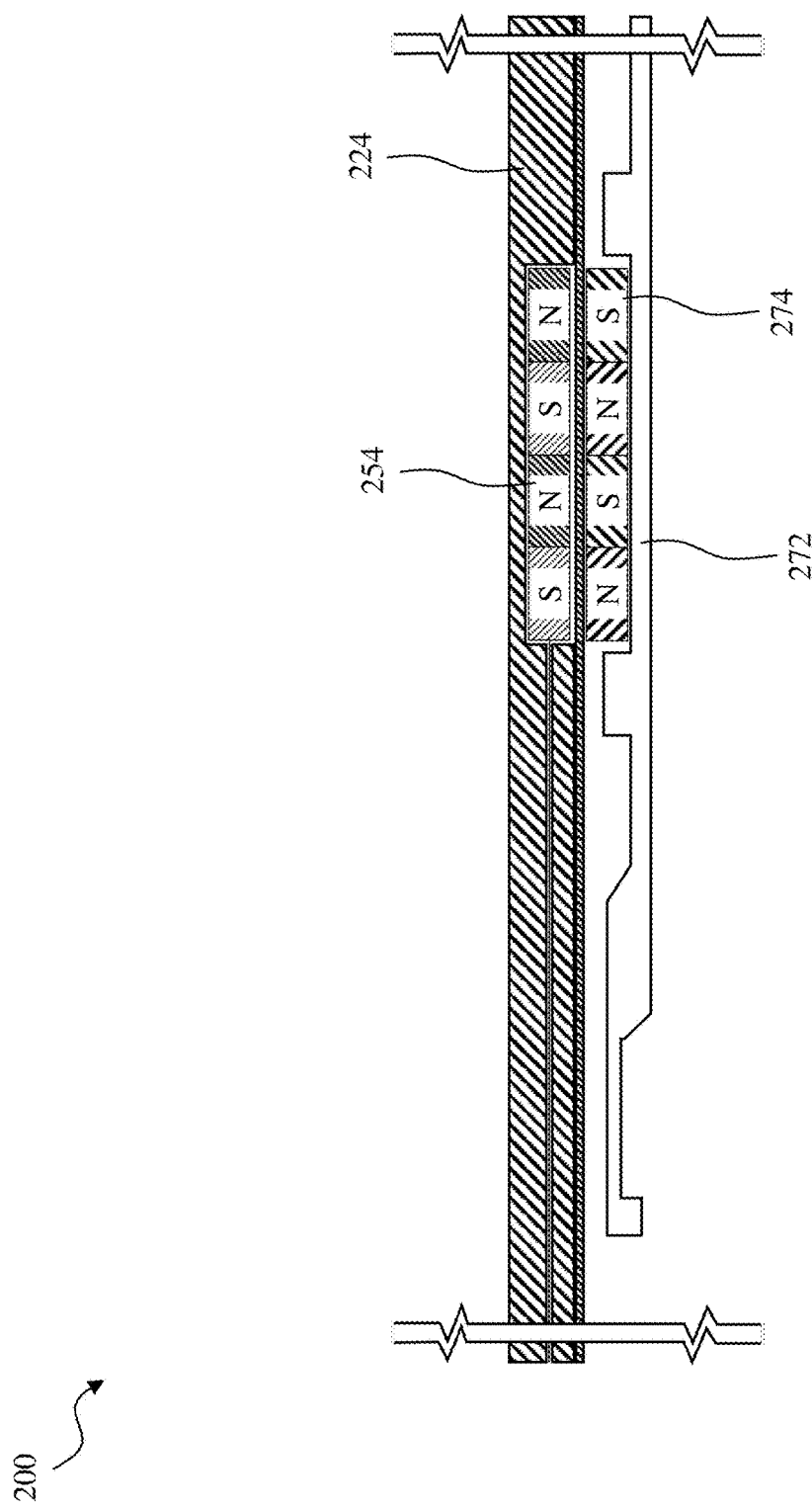

Turning briefly to FIG. 2E, illustrated is an exploded view of a portion of the SSSV 200 of FIG. 2D. FIG. 2E illustrates how the two or more electromagnets 254 and the two or more permanent magnets 274 may alternate in polarity (e.g., oppositely alternate in polarity). FIG. 2E additionally illustrates how the mechanical connecting apparatus 272 and the two or more permanent magnets 274 have axially slid downhole so that the two or more electromagnets 254 are substantially aligned with the two or more permanent magnets 274.

Figure 2F:
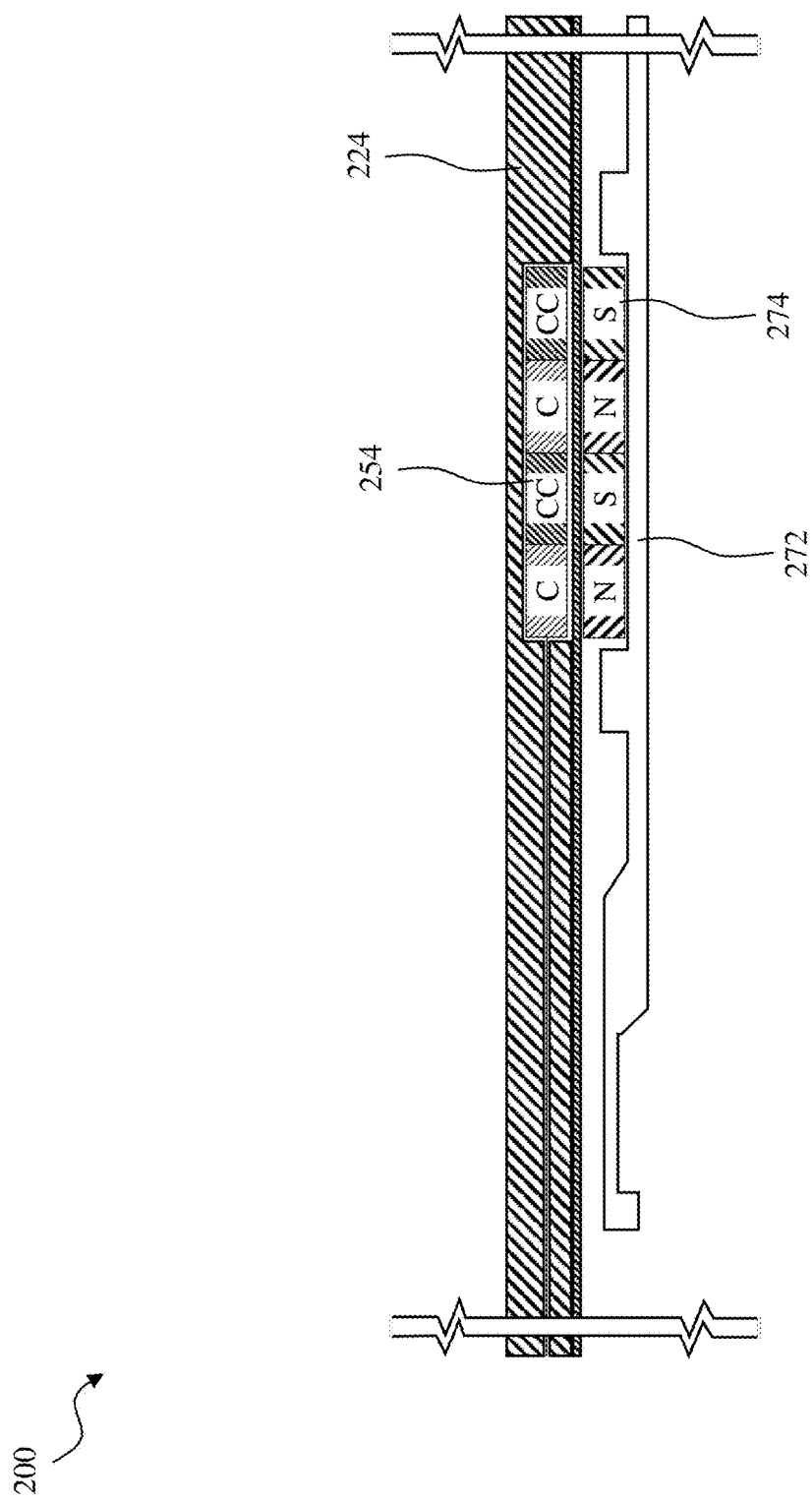

Turning briefly to FIG. 2F, illustrated is an alternate exploded view of a portion of the SSSV 200 of FIG. 2D. FIG. 2F illustrates how the two or more electromagnets 254 may alternate in polarity by going between a clockwise (C) and a counter-clockwise (CC) winding of the wire. FIG. 2F additionally illustrates how the mechanical connecting apparatus 272 and the two or more permanent magnets 274 have axially slid downhole so that the two or more electromagnets 254 are substantially aligned with the two or more permanent magnets 274.

Figure 2G:
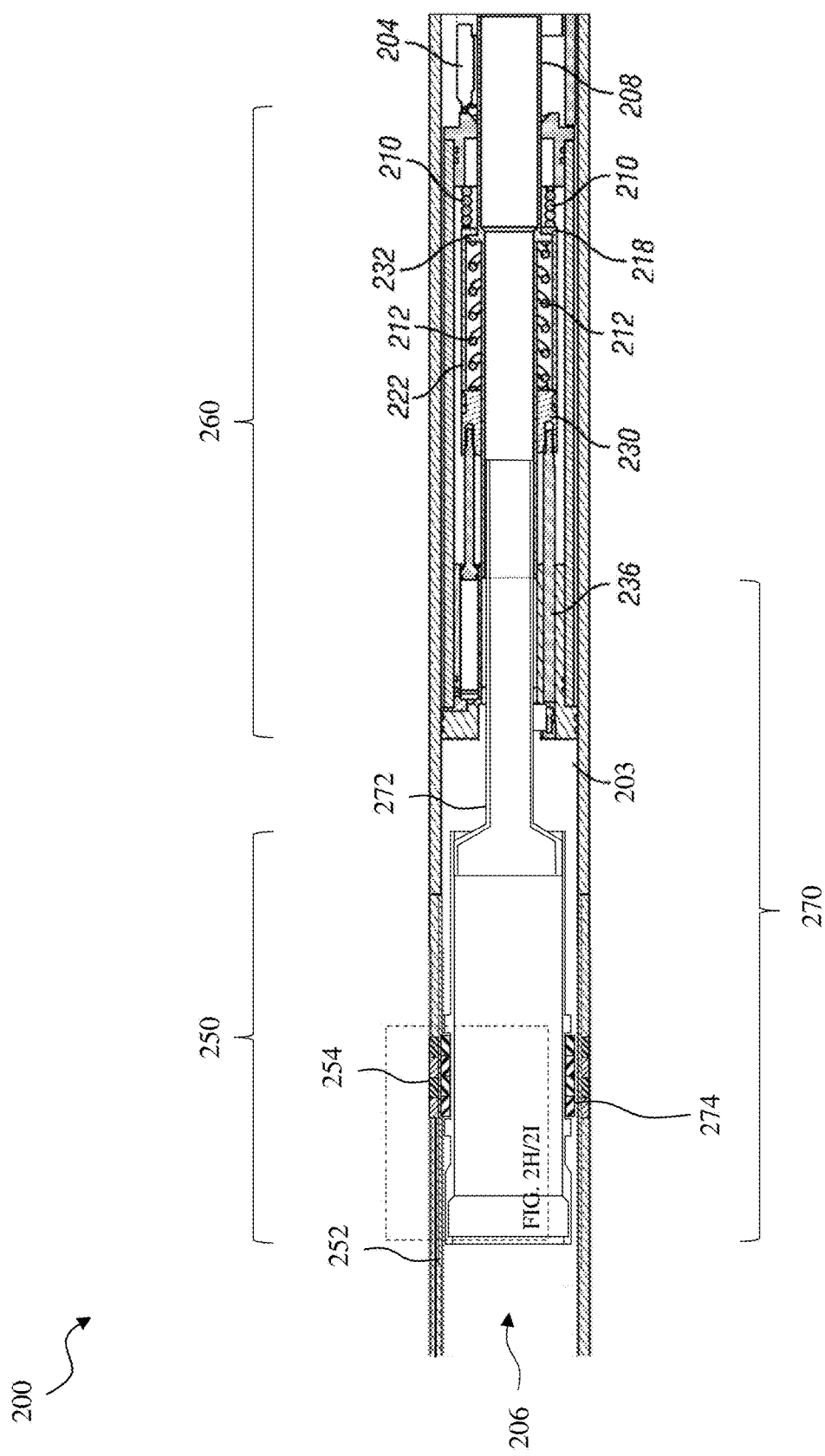

With continued reference to FIG. 2G, the second piston 236 may be fixedly attached to the translating sleeve assembly 230. Although illustrated as two pistons in FIGS. 2A through 2I, the second piston 236 may be an integral component of the piston 220. As illustrated, when the translating sleeve 222 is moved from the first position to the second position, the second piston 236 may also be moved, as shown in FIGS. 2D through 2F above. After the translating sleeve 222 is allowed to come to the second position as described above, the two or more electromagnets 254 may be energized. The energizing of the two or more electromagnets 254 may cause the two or more electromagnets 254 to hold the two or more permanent magnets 274 of the third portion 270 in their axial downhole position. As the two or more permanent magnets 274 are rigidly coupled to the flow tube main body 208 (e.g., via the mechanical connecting apparatus 272), the flow tube main body 208 is also held in its axial downhole position, as shown in FIG. 2G.

Figure 2H:
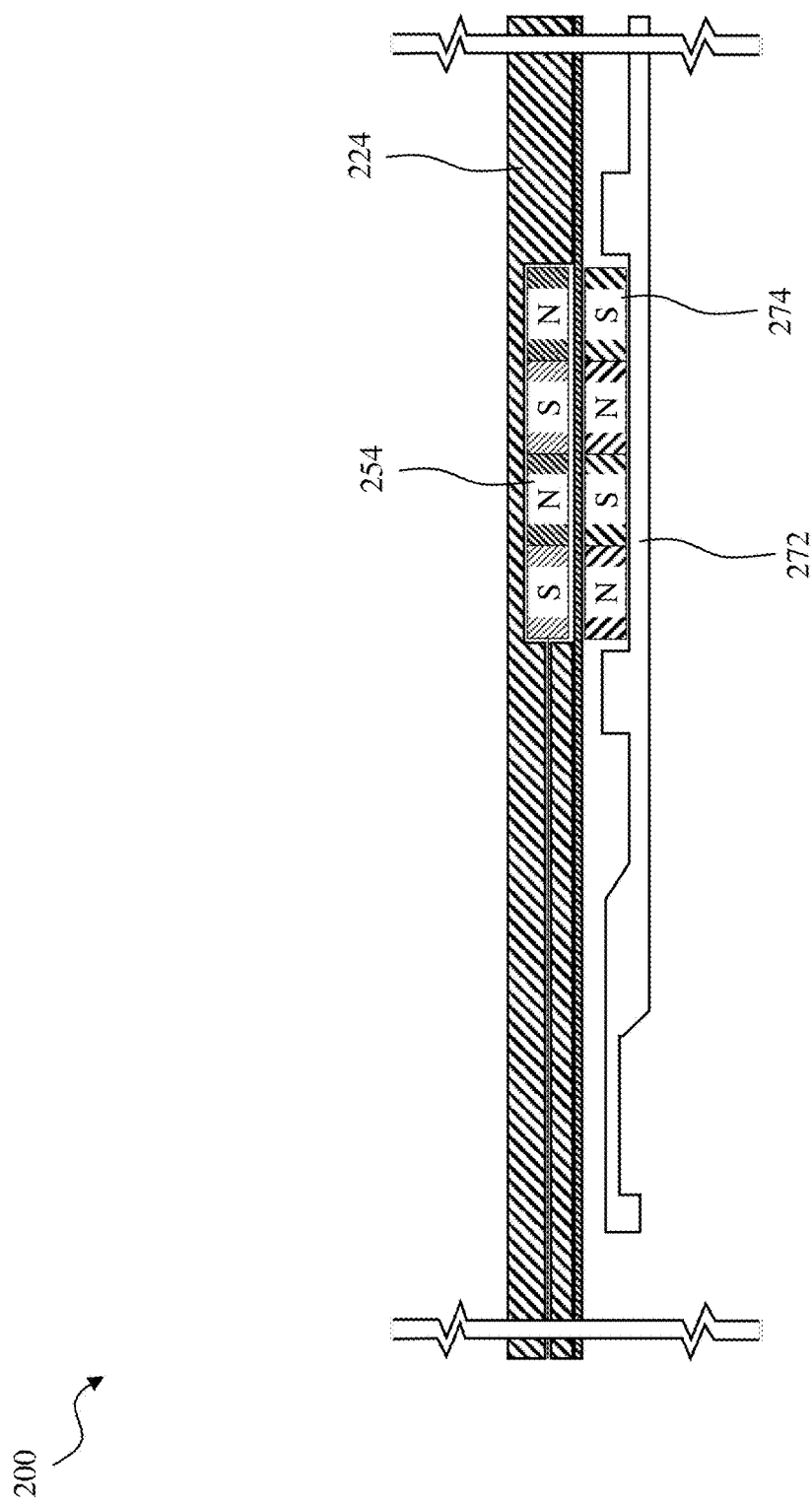

Turning briefly to FIG. 2H, illustrated is an exploded view of a portion of the SSSV 200 of FIG. 2G. FIG. 2H illustrates how the two or more electromagnets 254 and the two or more permanent magnets 274 may alternate in polarity (e.g., oppositely alternate in polarity). FIG. 2H has again illustrated how the mechanical connecting apparatus 272 and the two or more permanent magnets 274 have axially slid downhole so that the two or more electromagnets 254 are substantially aligned with the two or more permanent magnets 274.

Figure 2I:
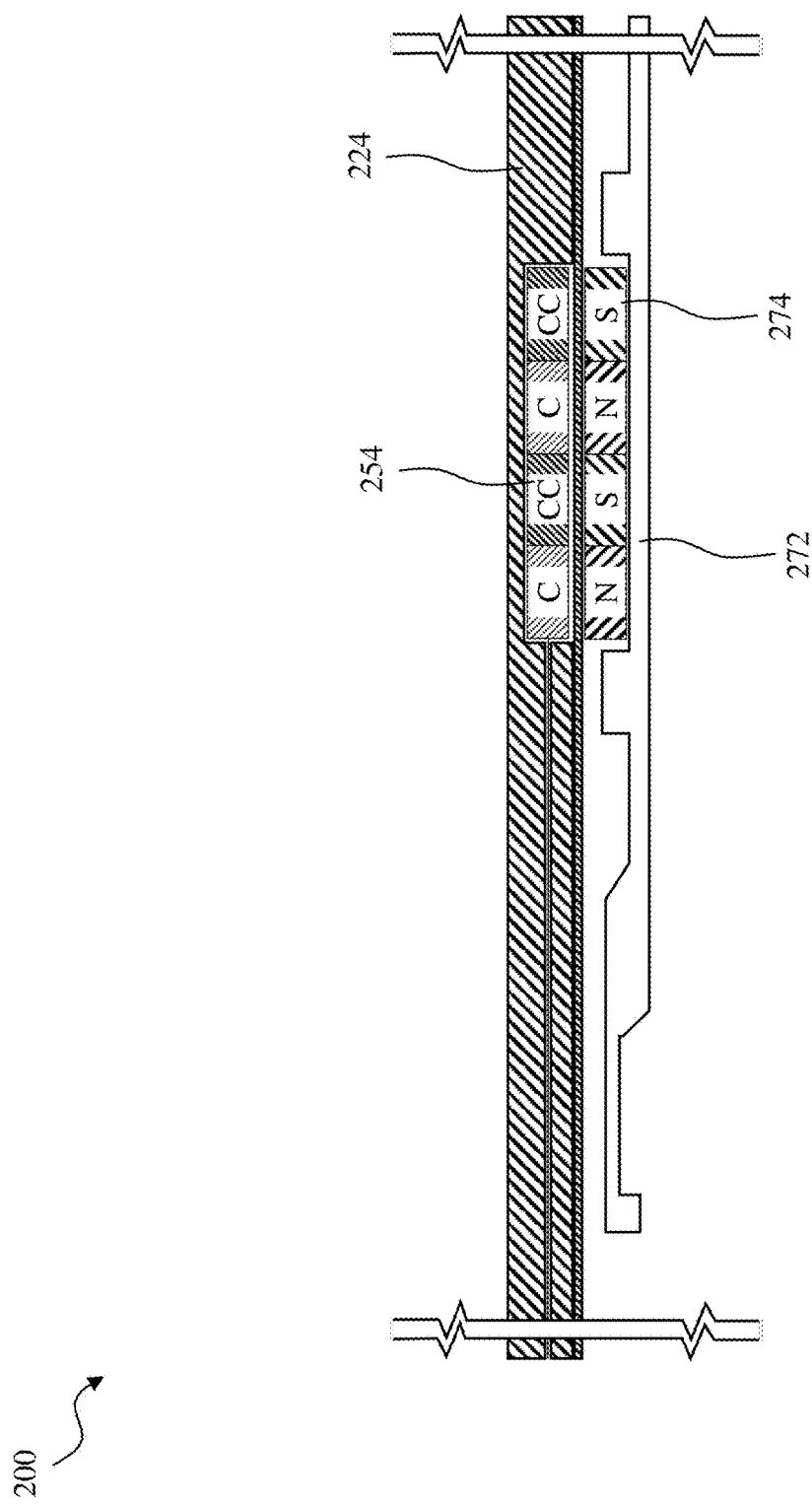
Figure 3A:
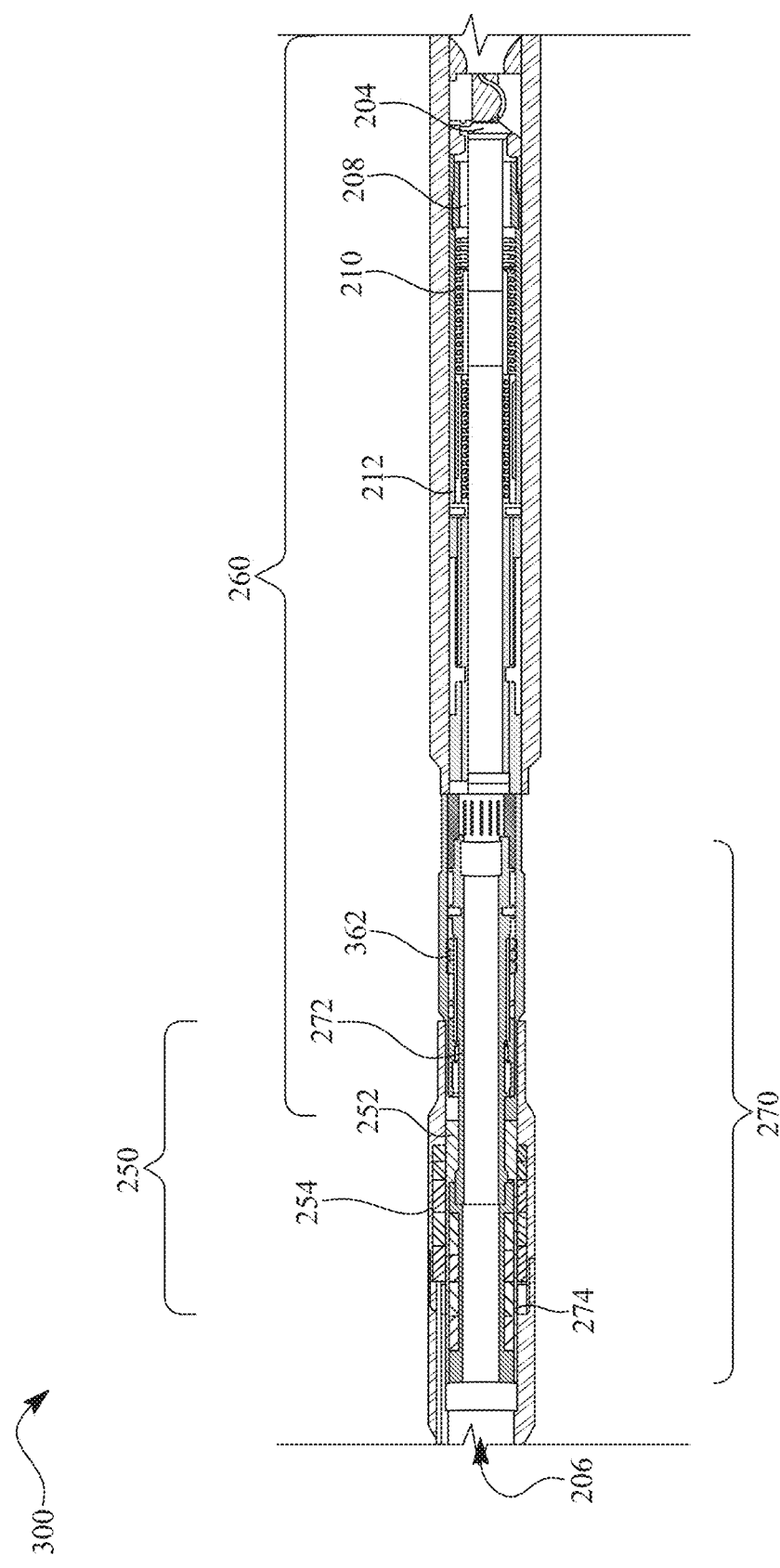
Figure 3B:
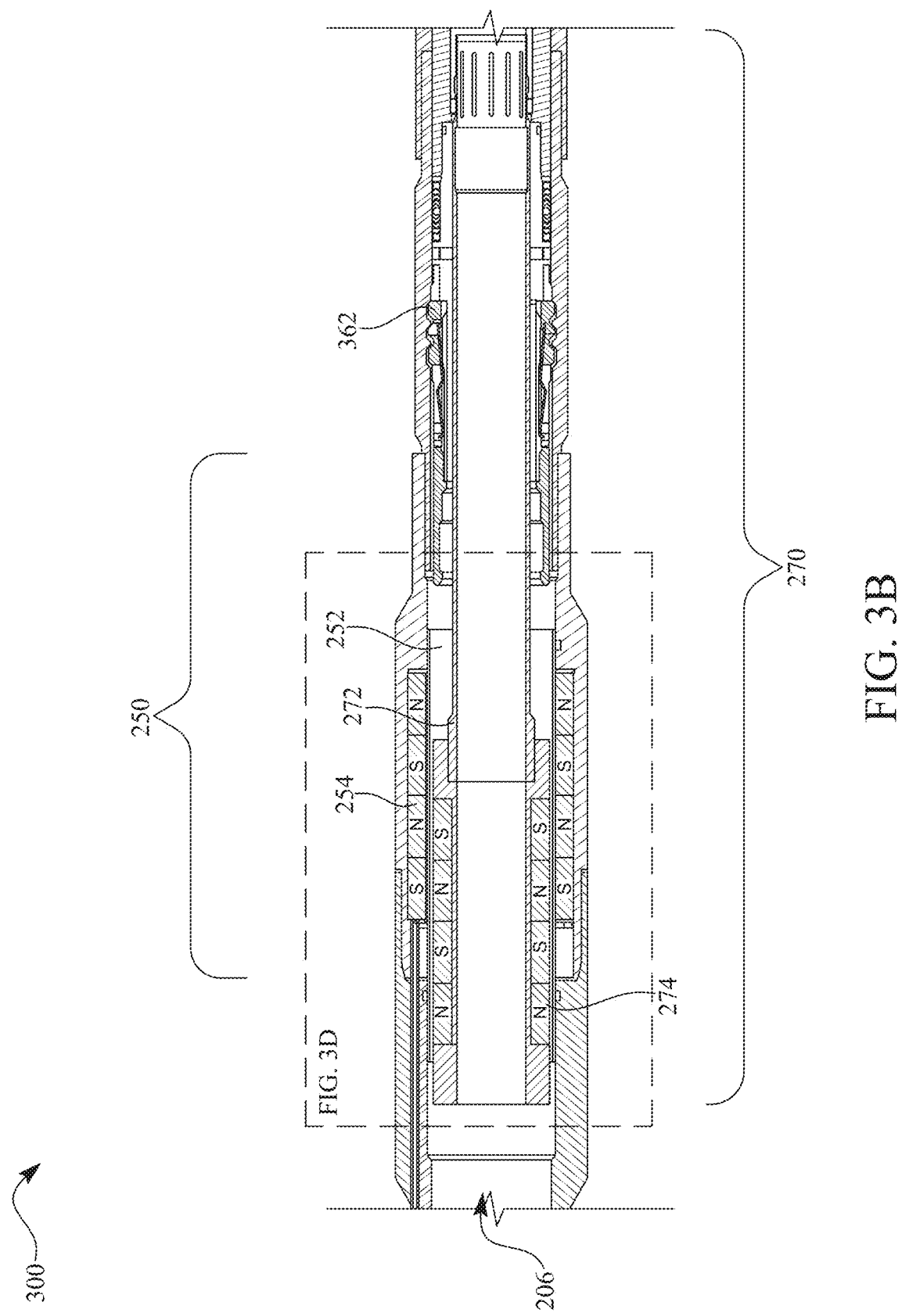
Figure 3C:
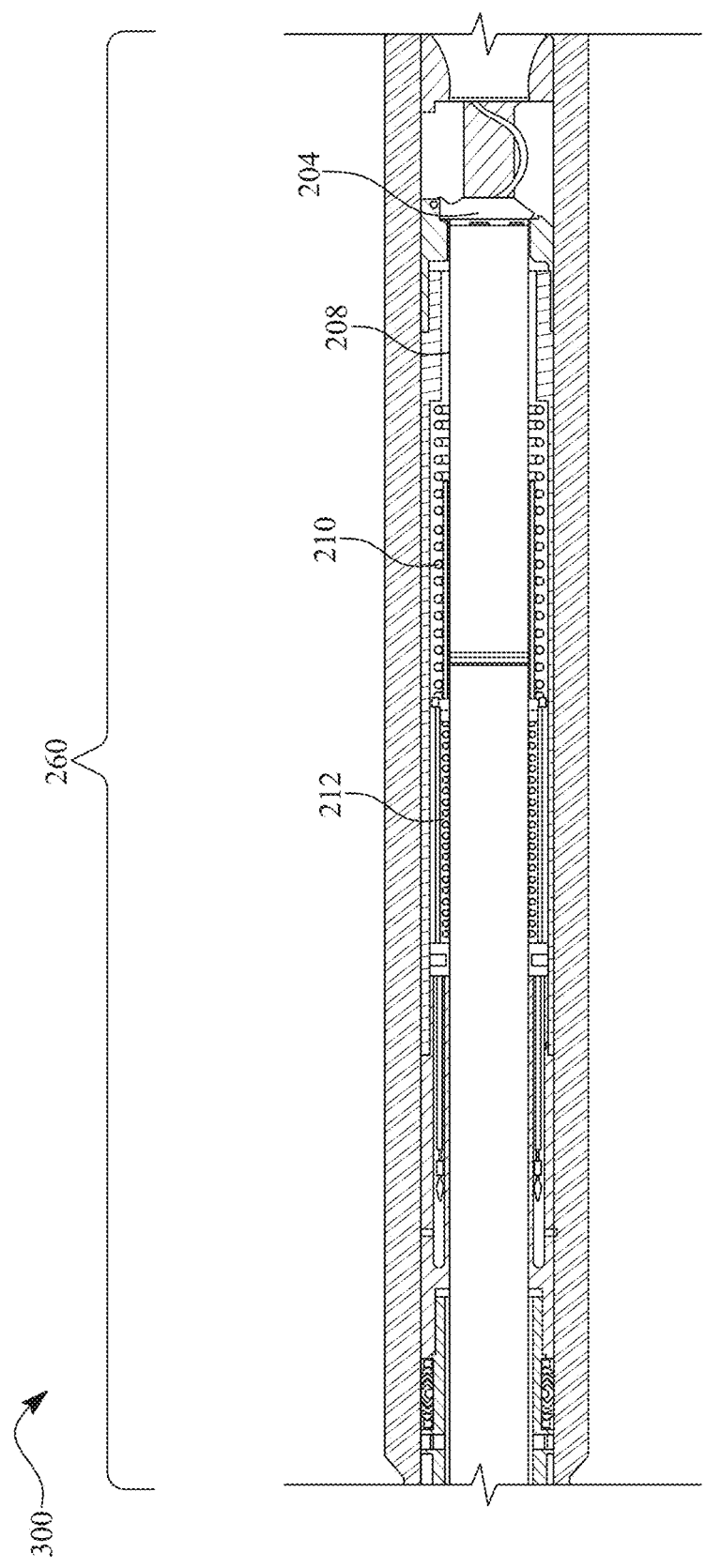
Figure 3D:
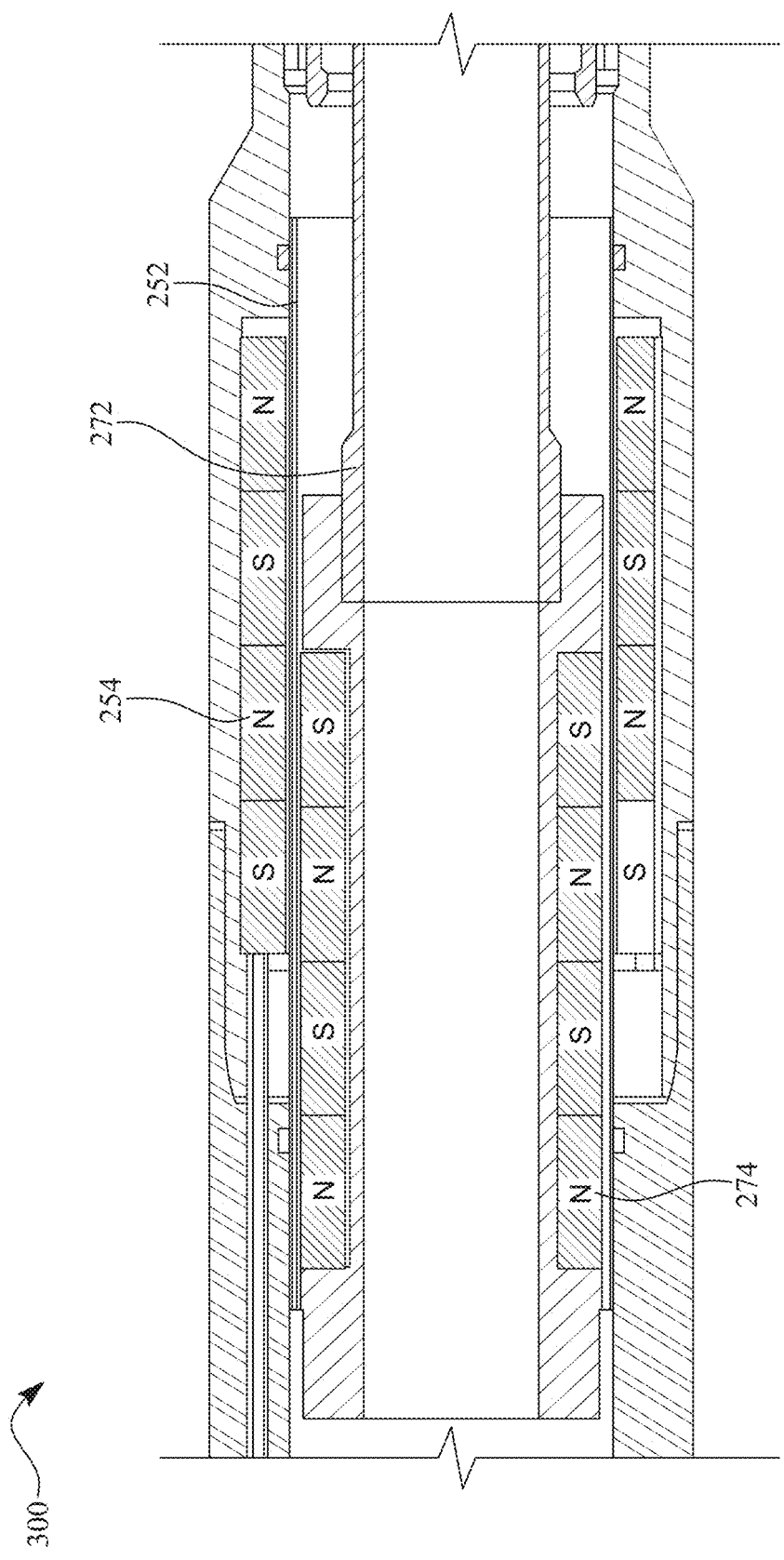
Figure 4A:
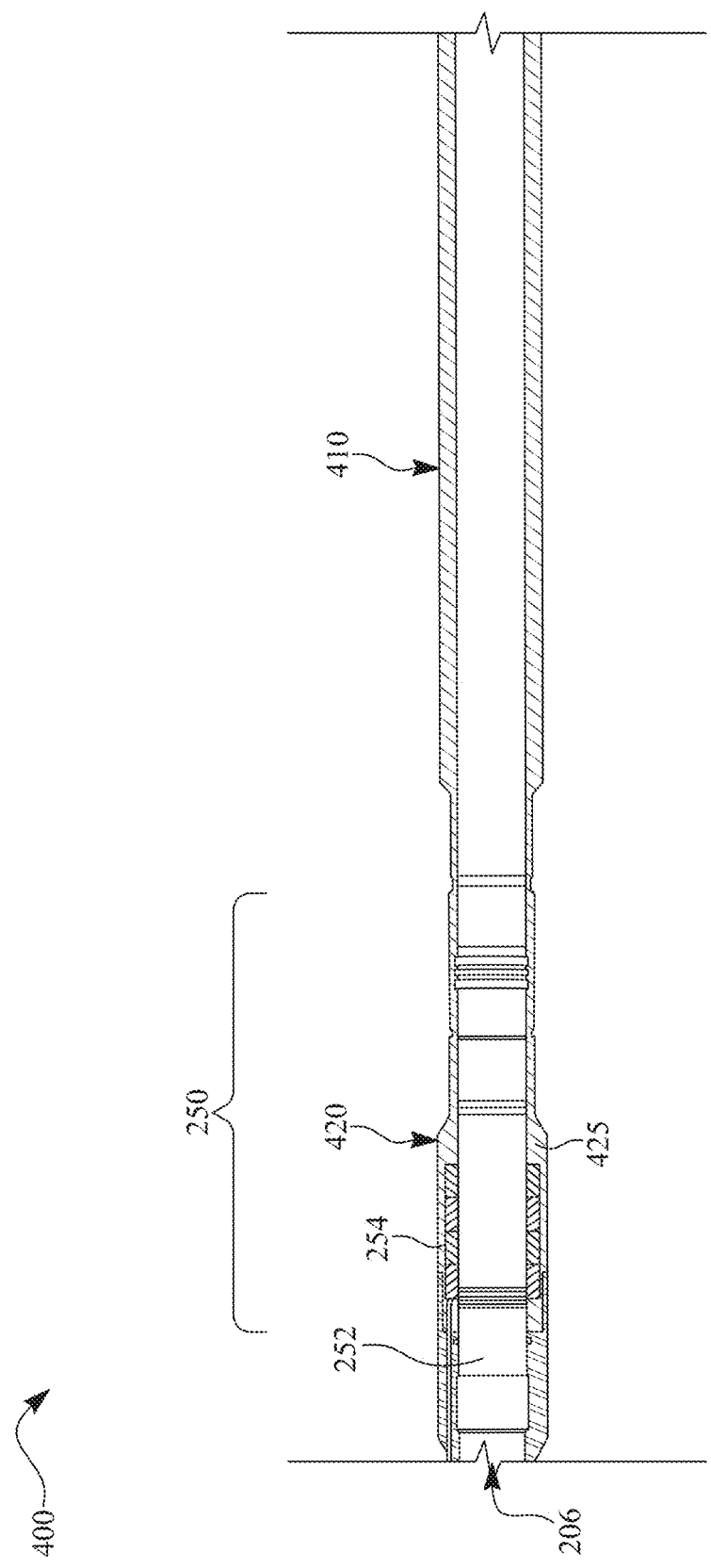
Figure 4B:
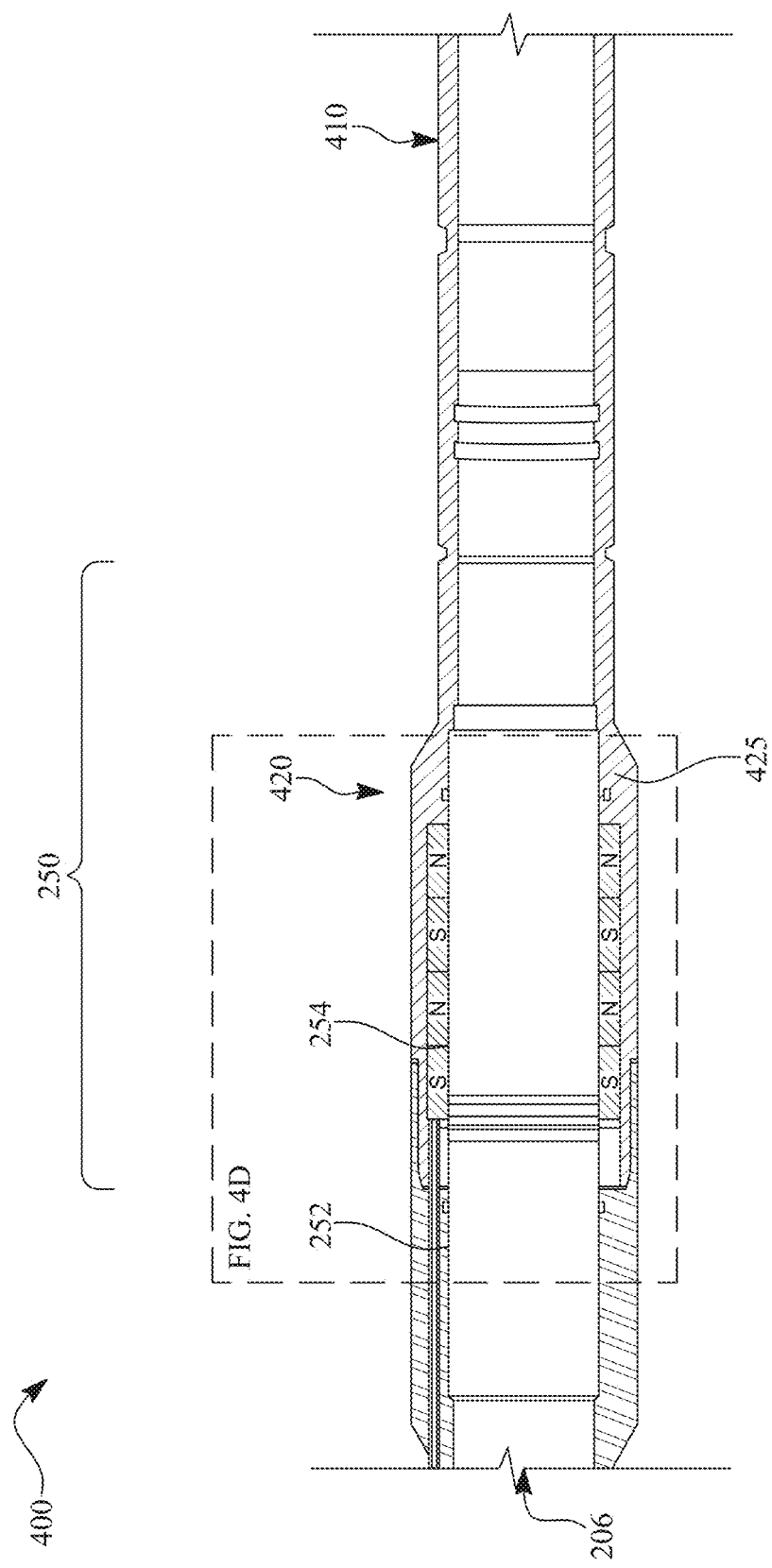
Figure 4C:
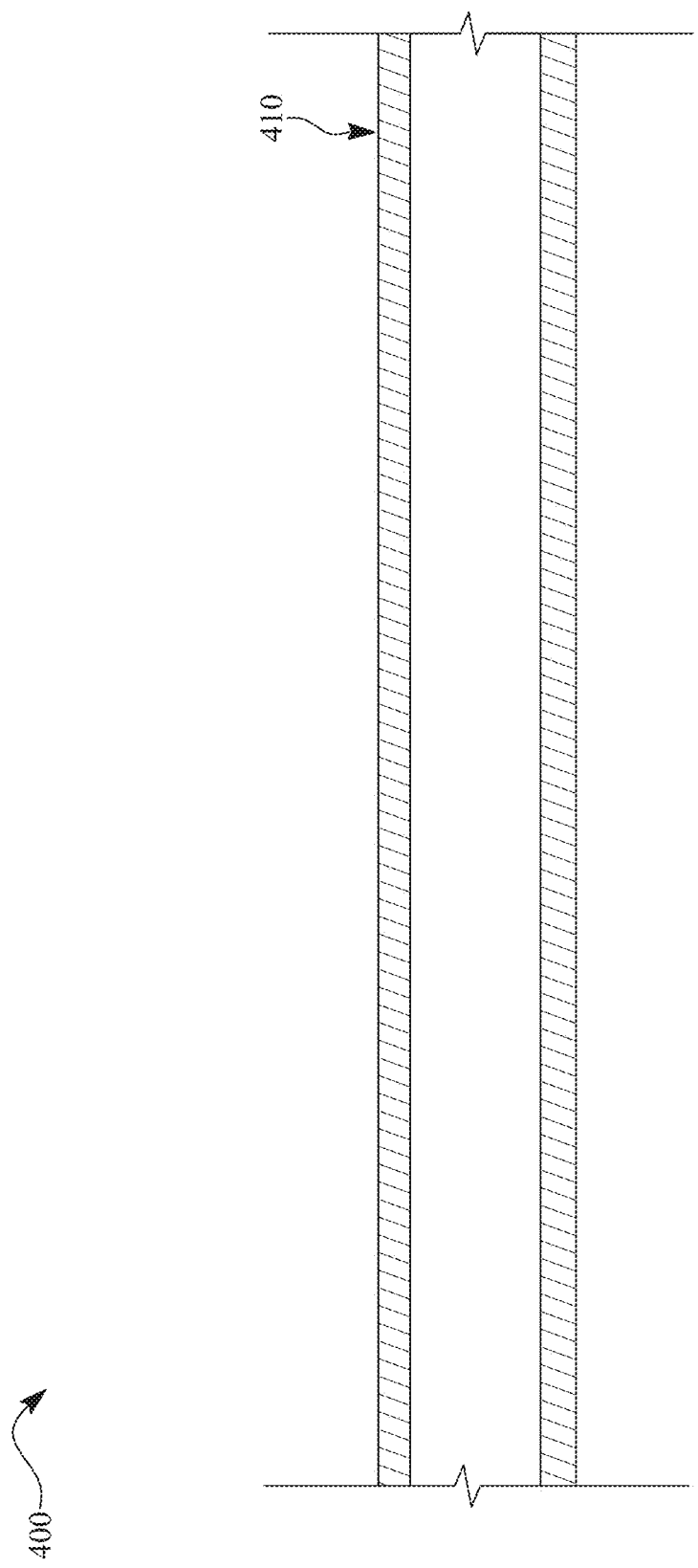
Figure 4D:
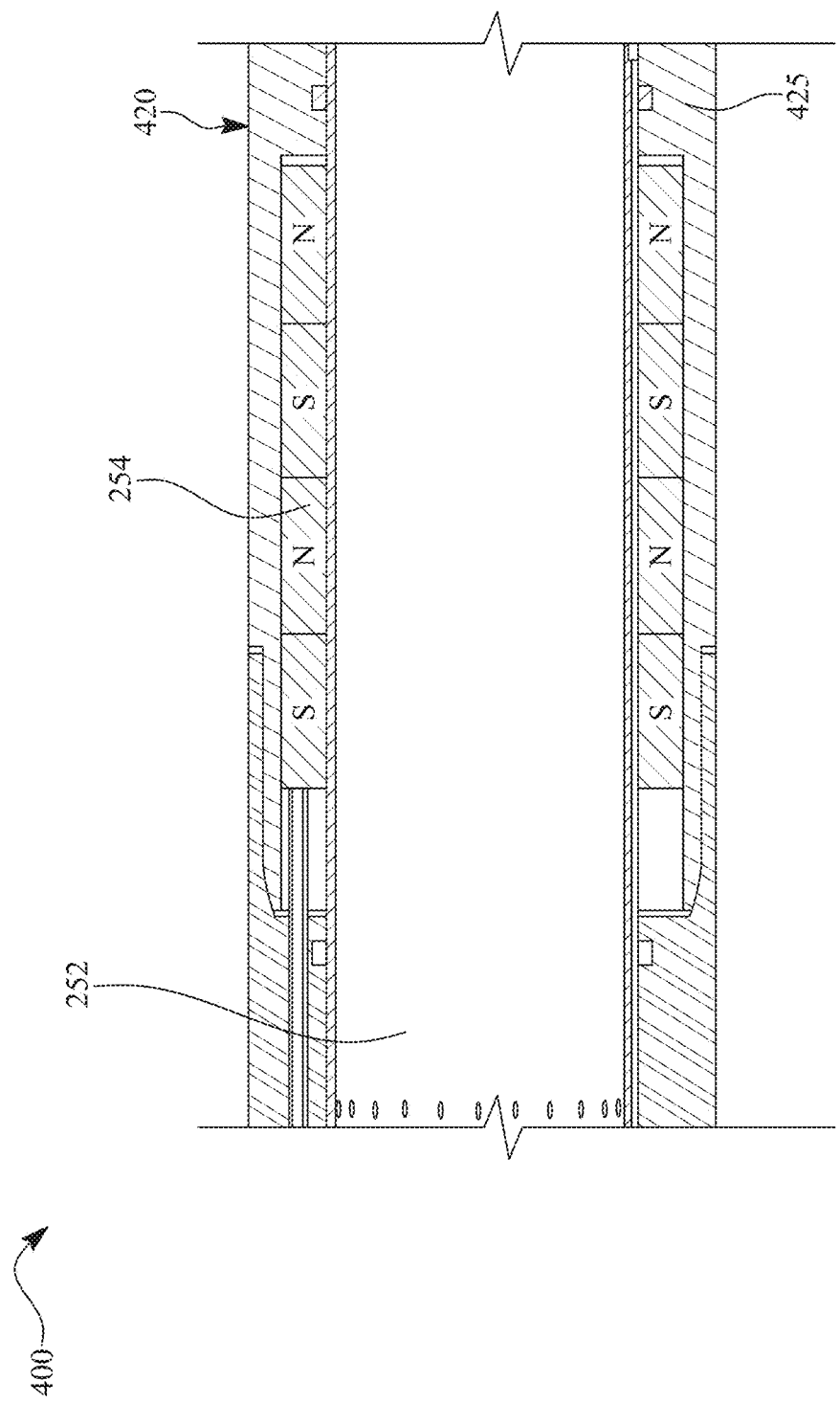
Figure 5A:
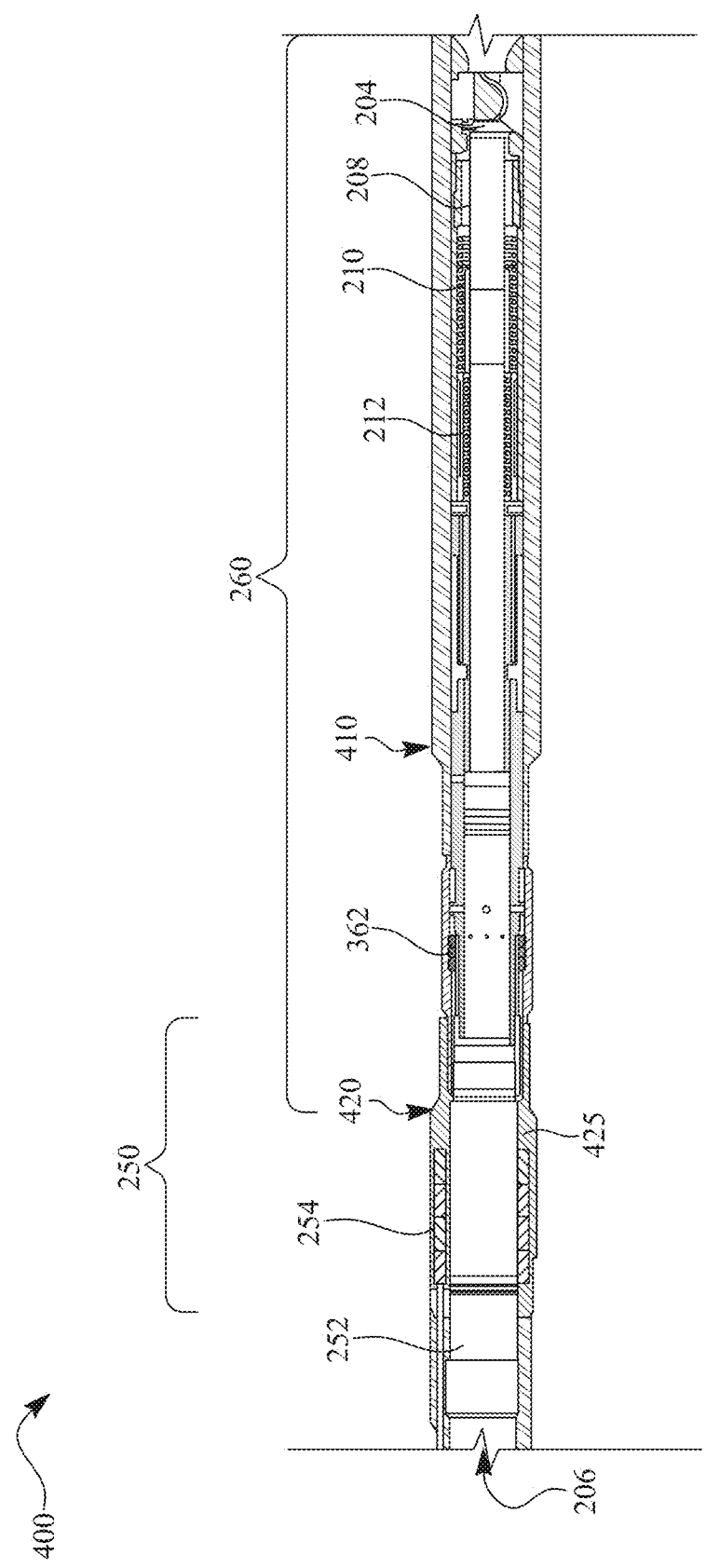
Figure 5B:
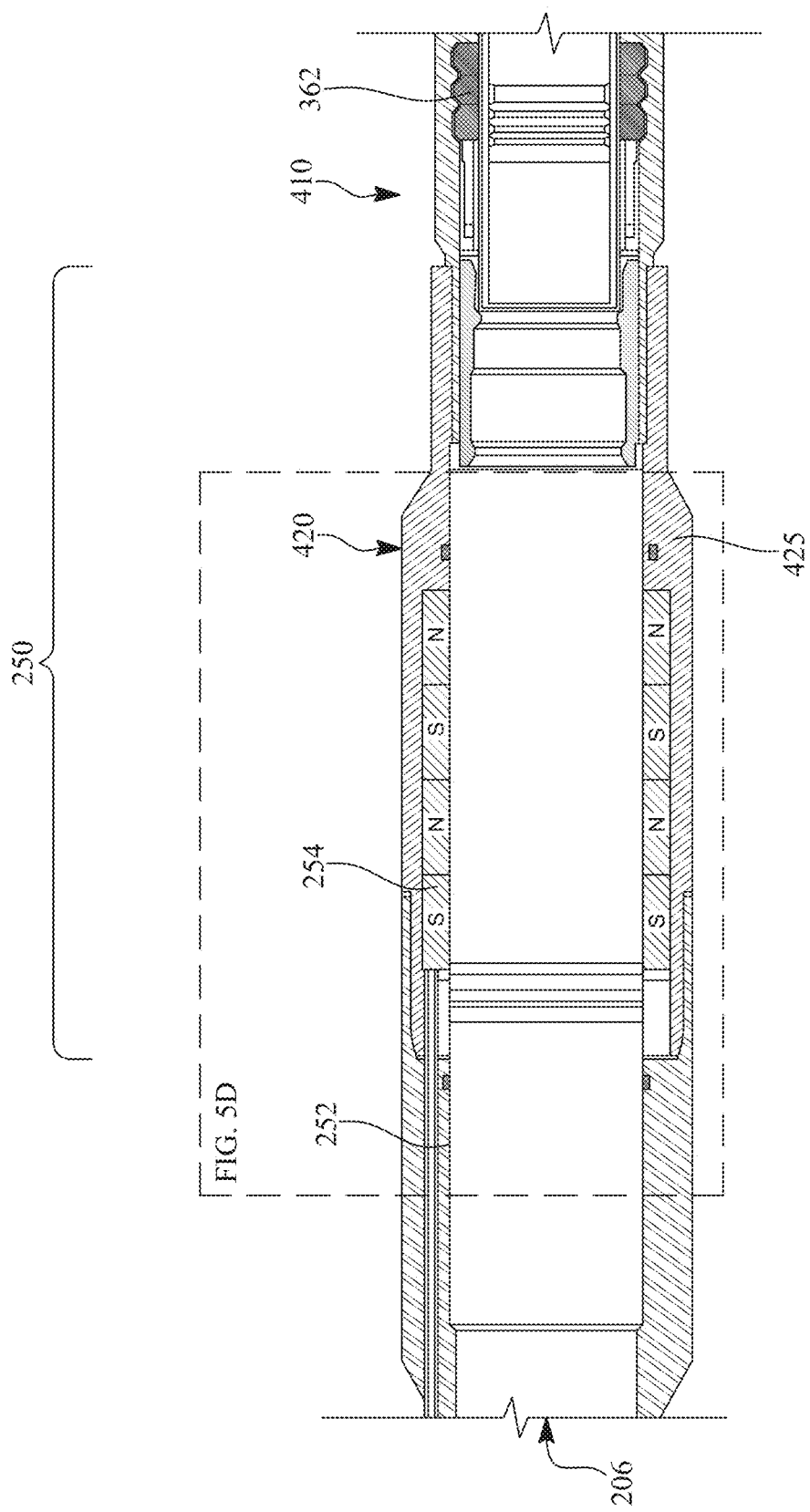
Figure 5C:
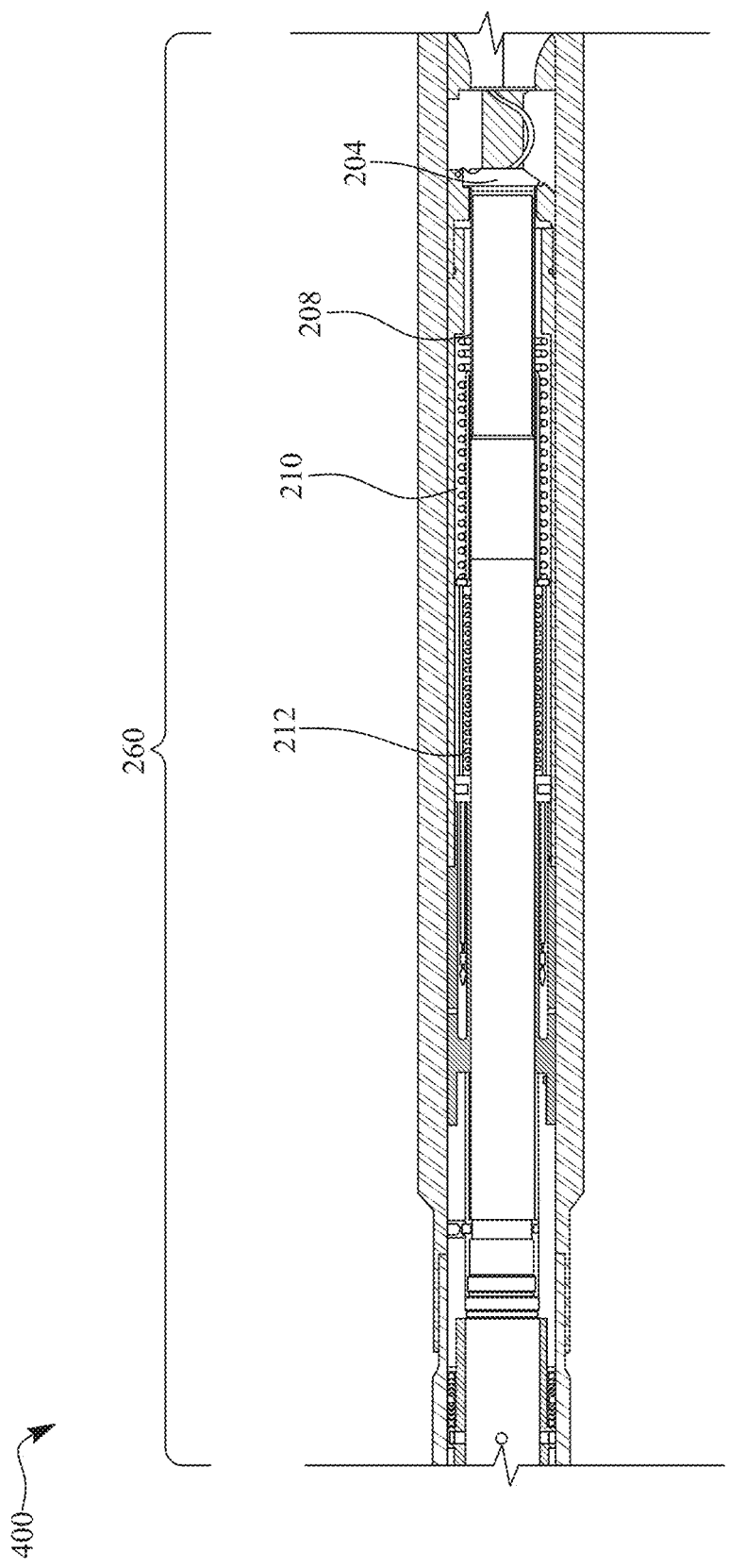
Figure 5D:
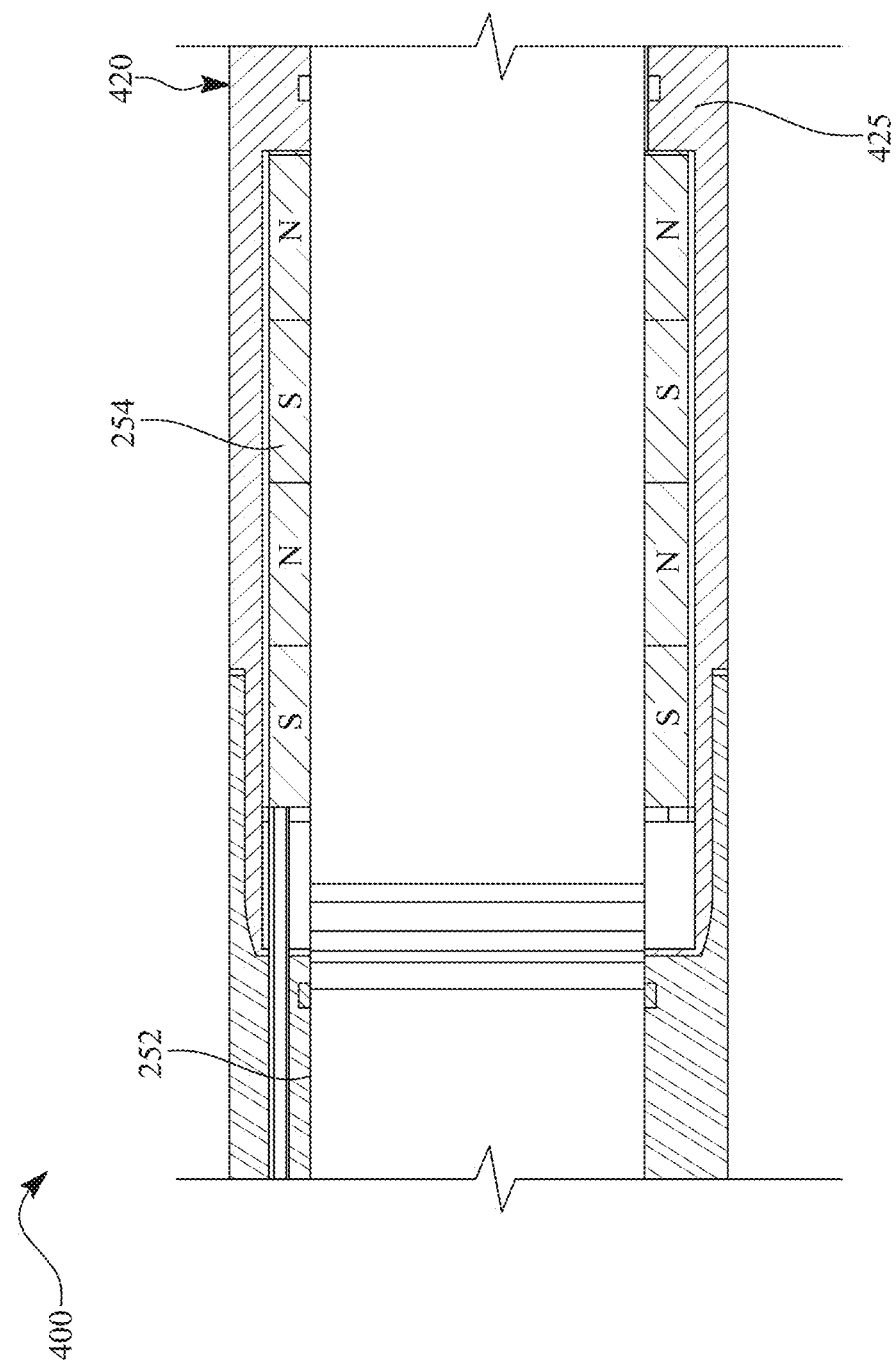
Figure 6A:
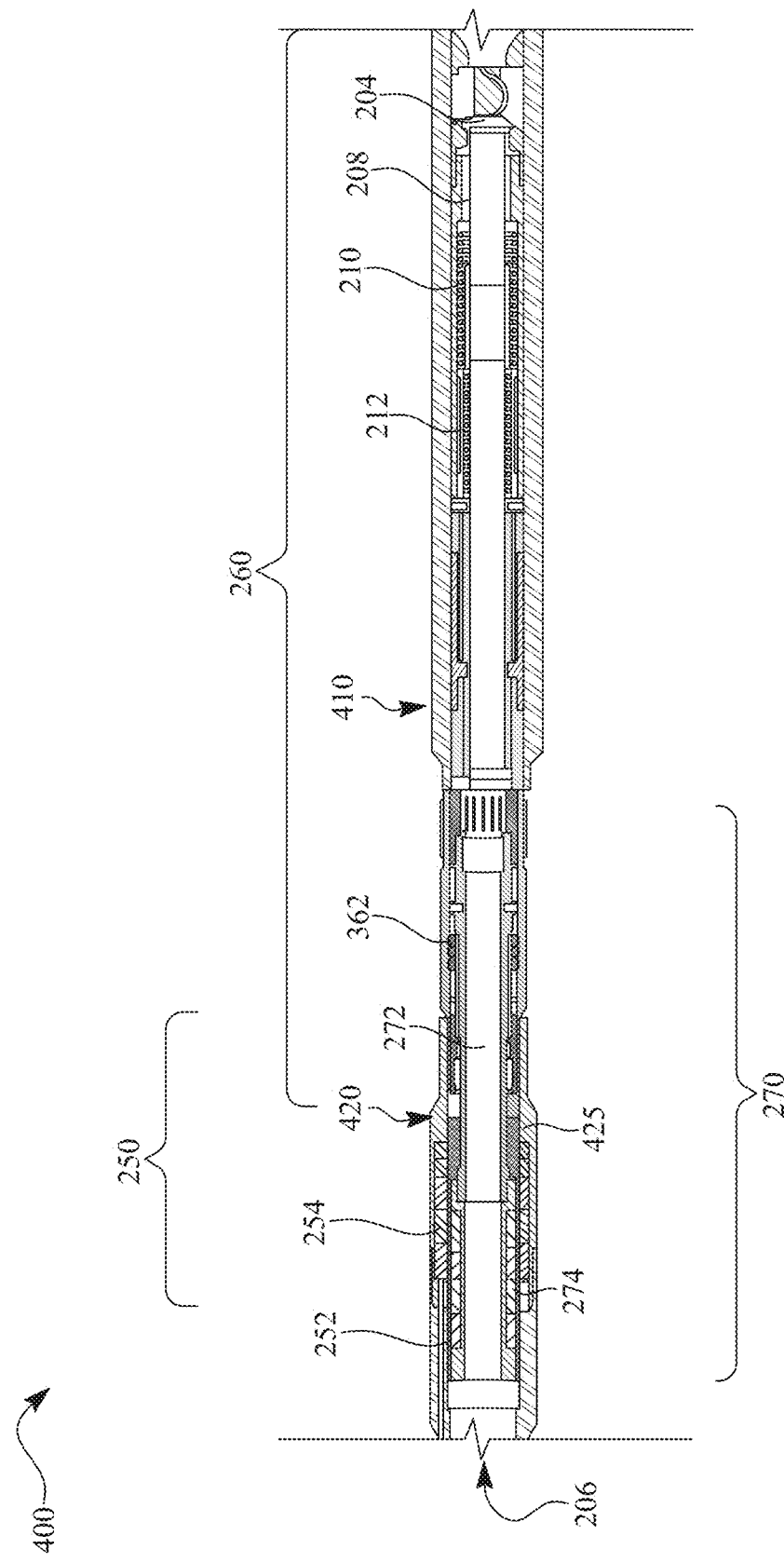
Figure 6B:
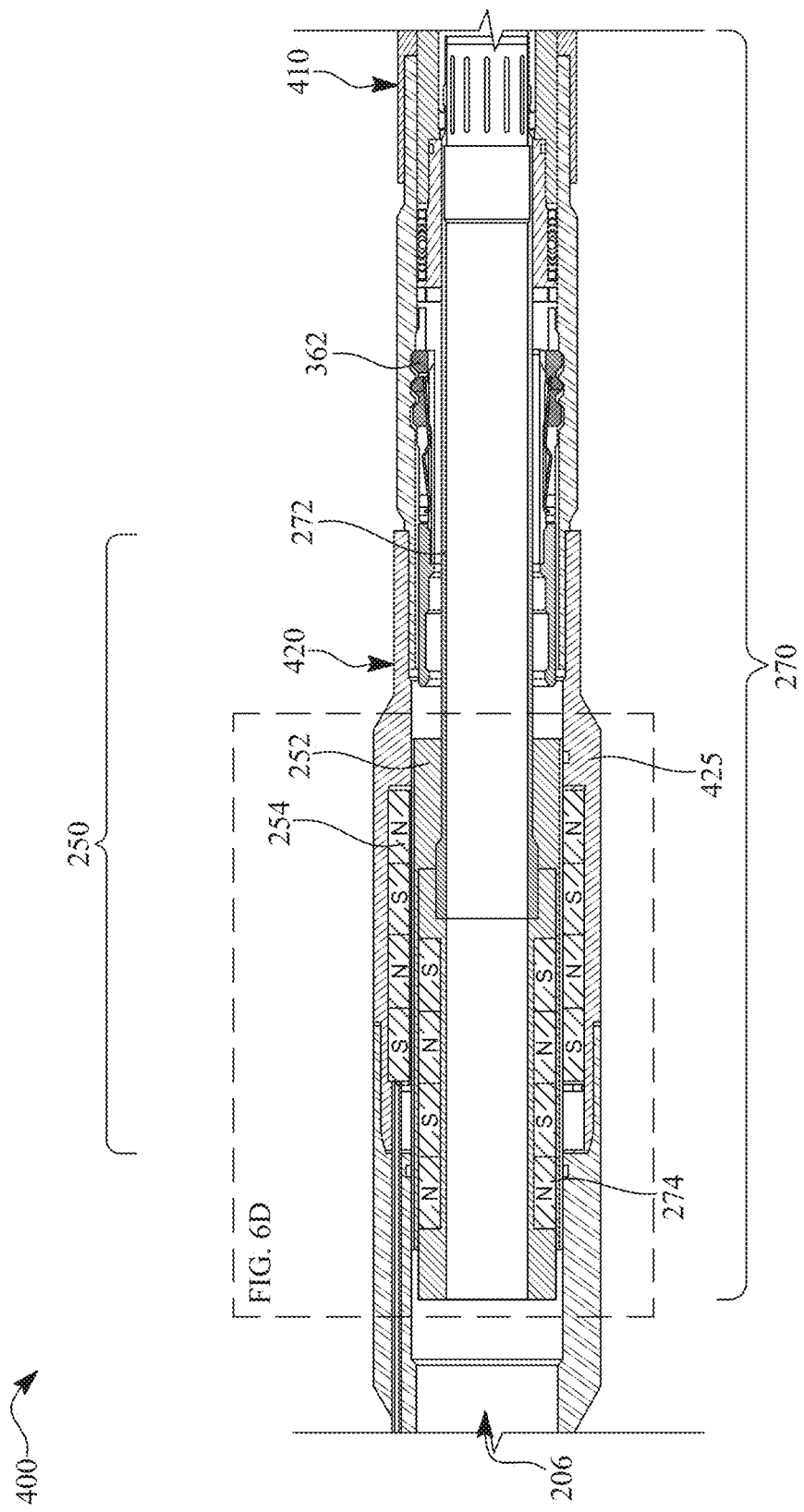
Figure 6C:
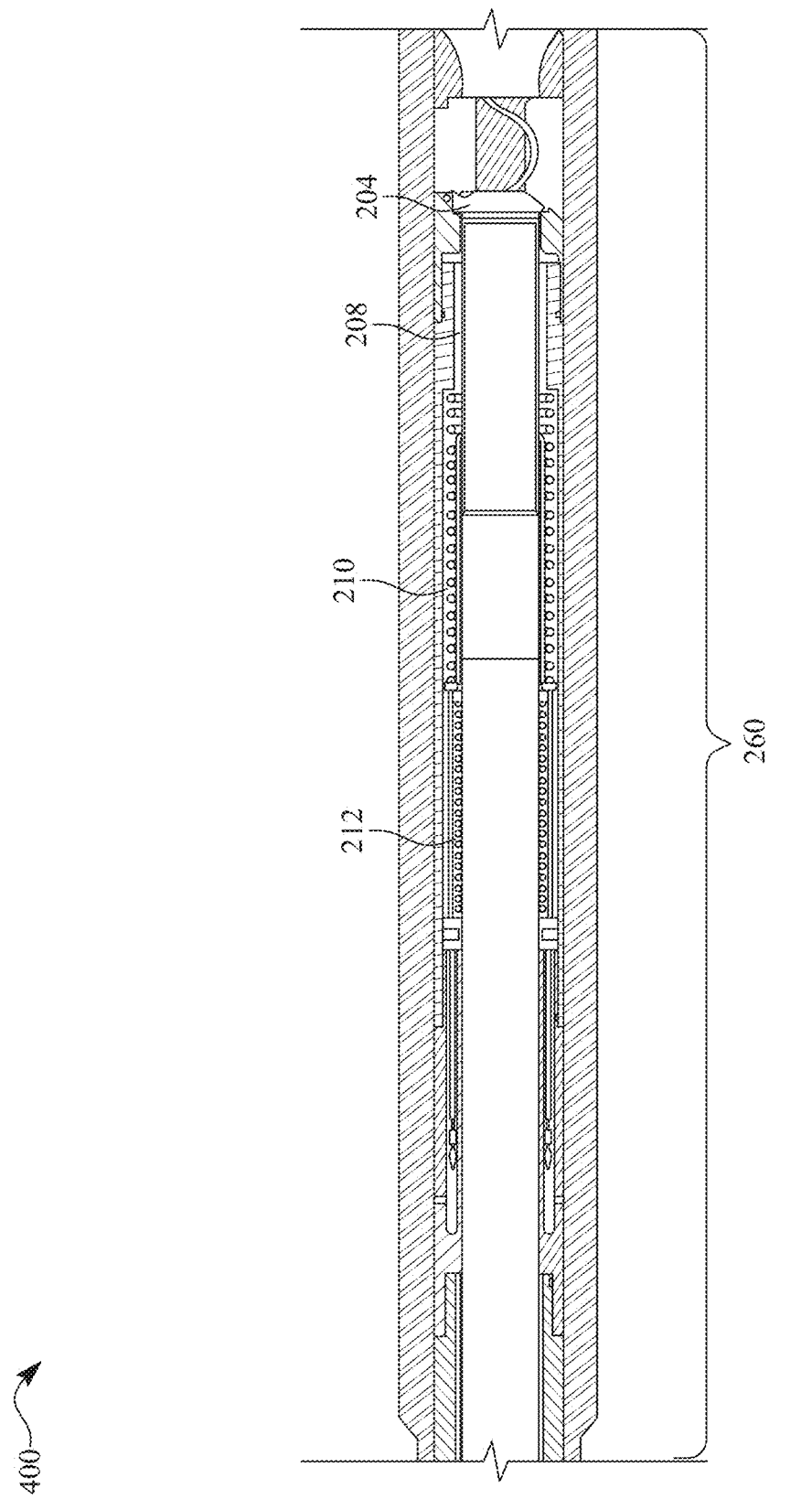
Figure 6D:
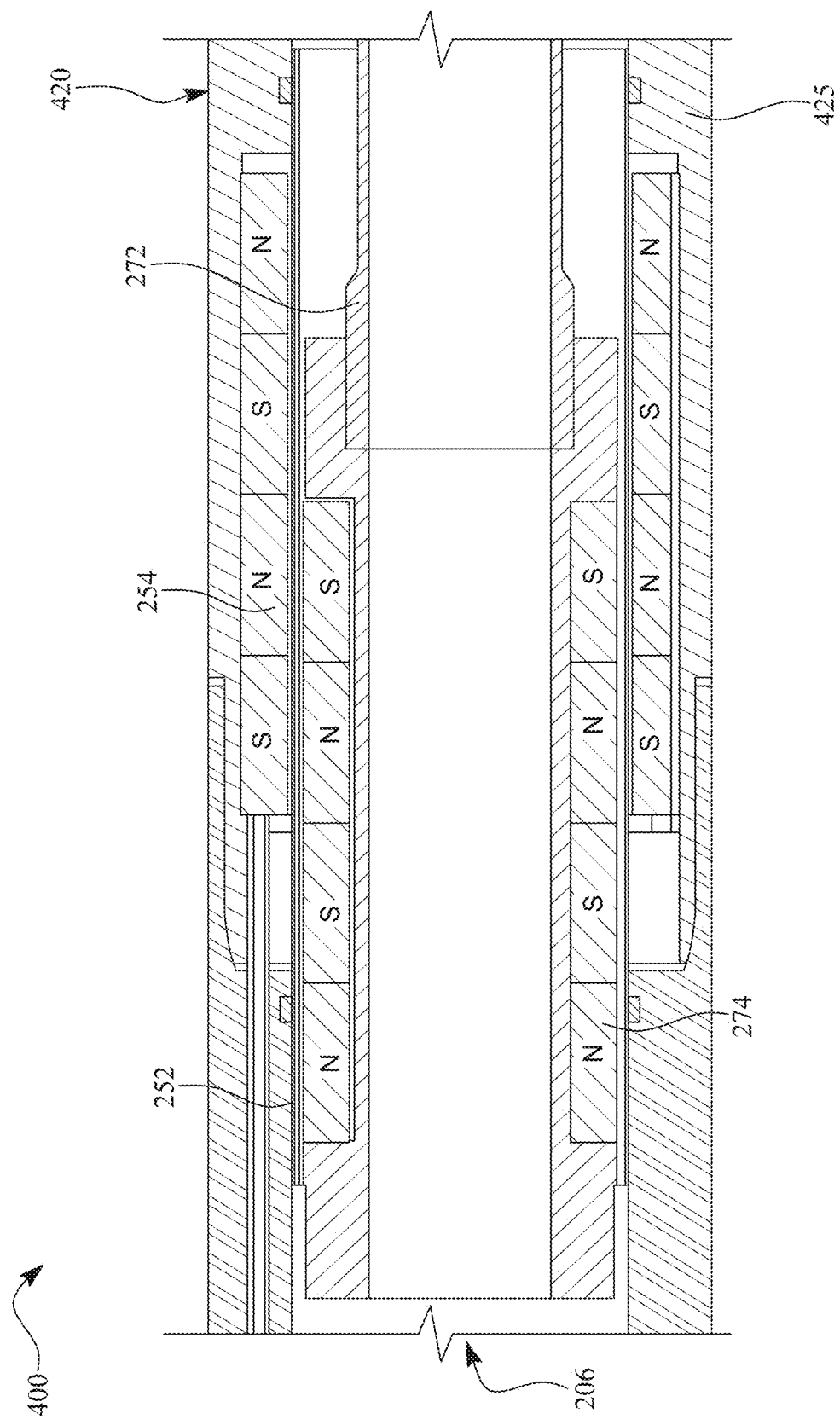
Figure 7A:
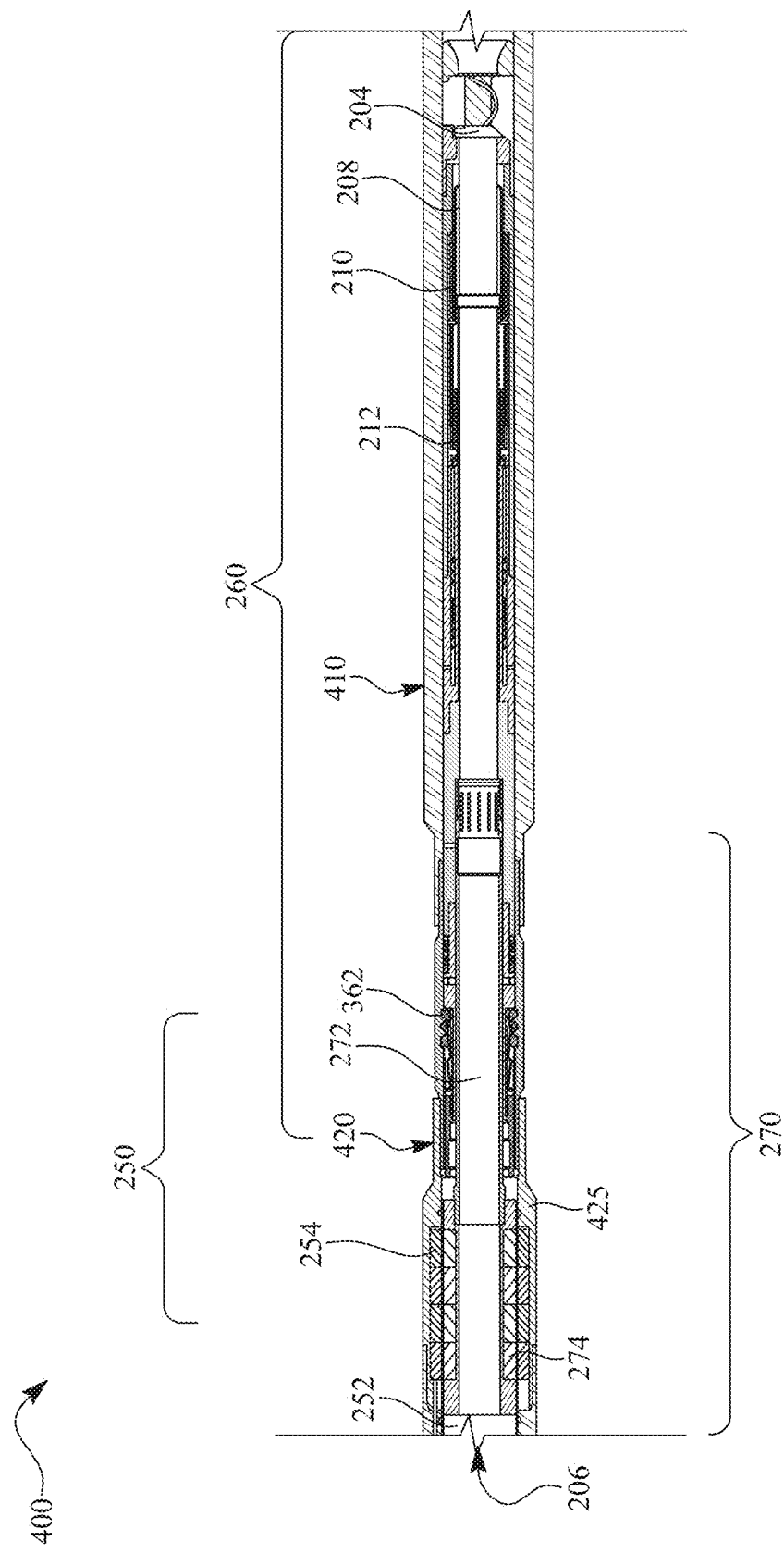
Figure 7B:
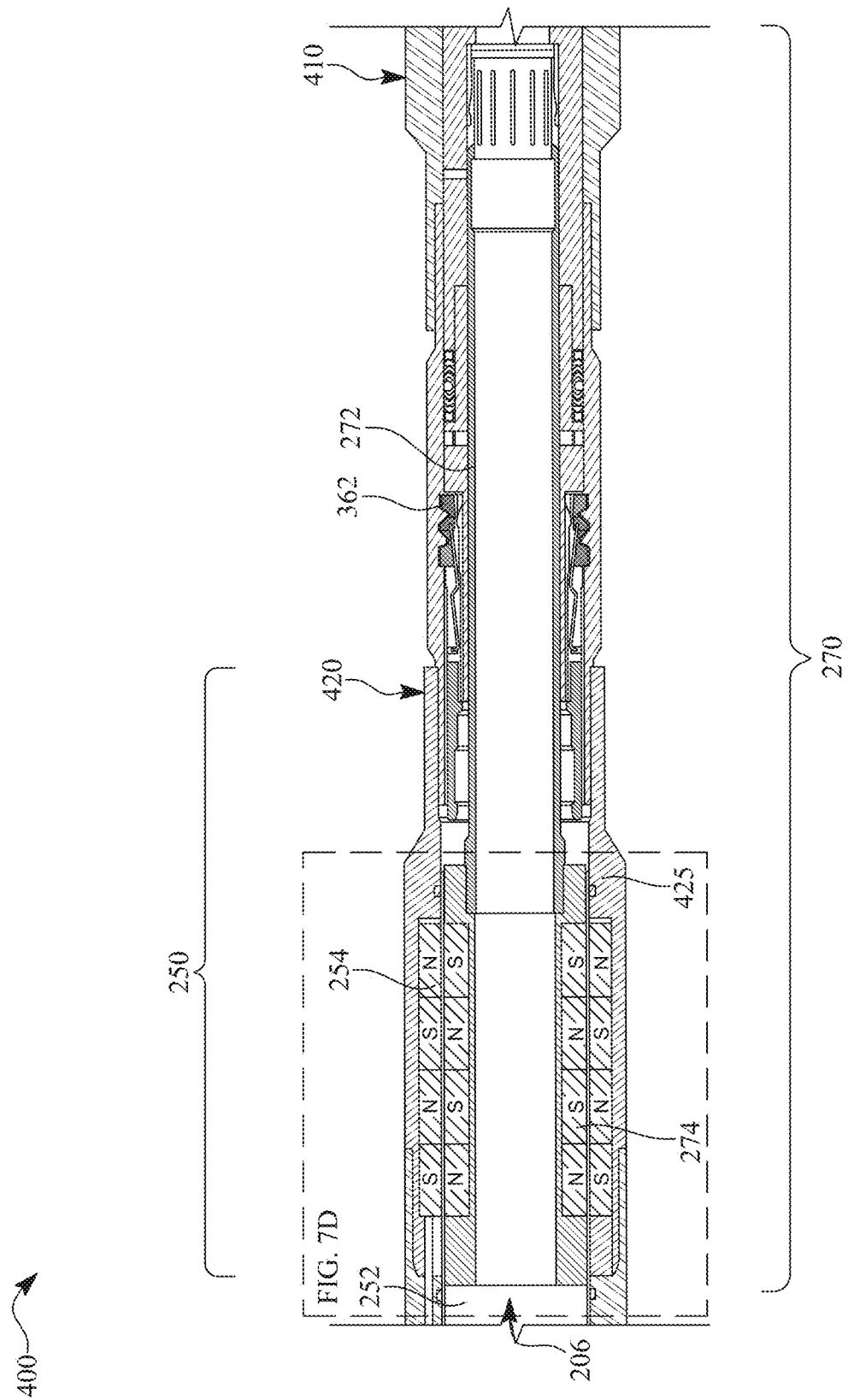
Figure 7C:
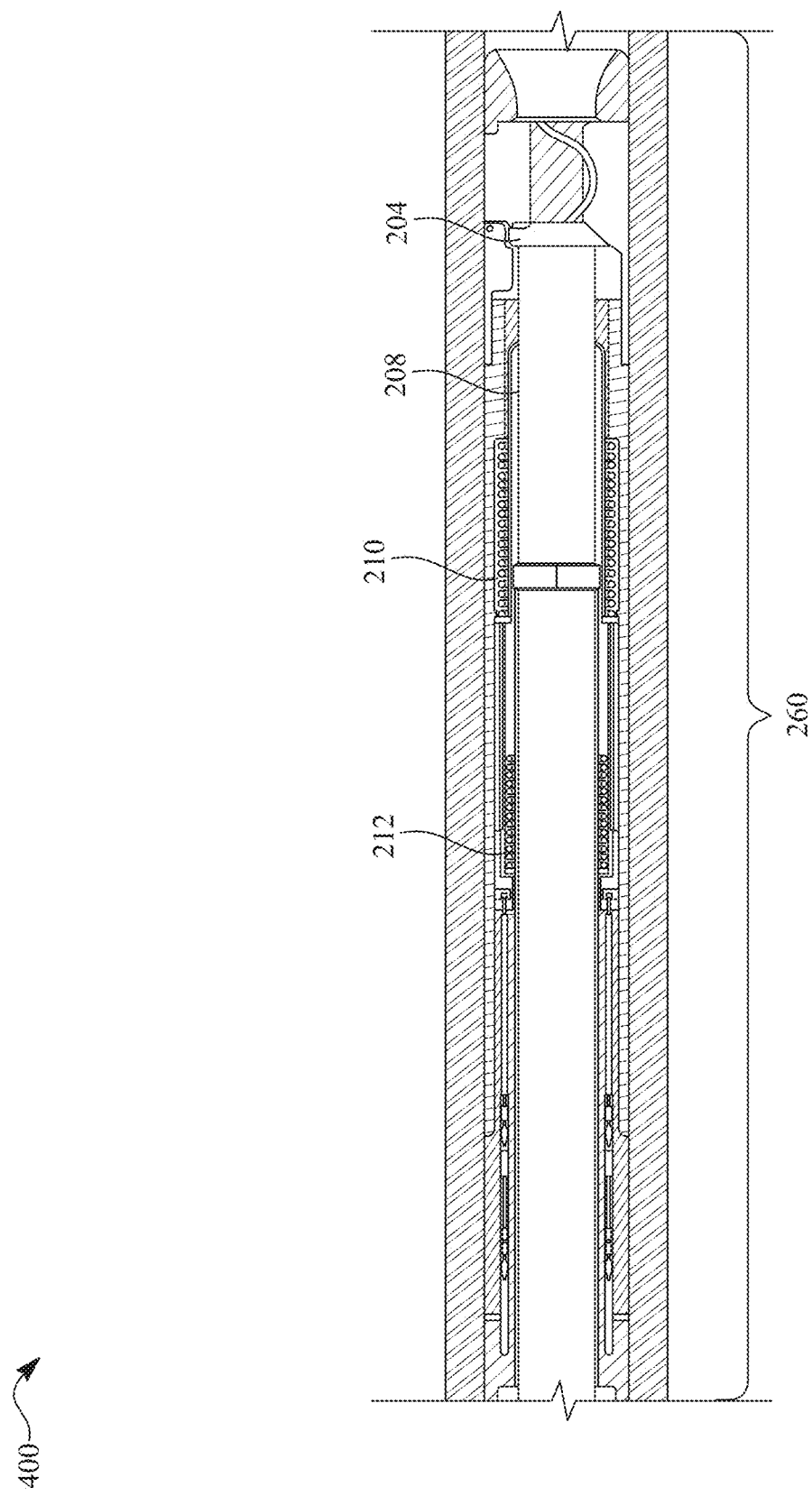
Figure 7D:
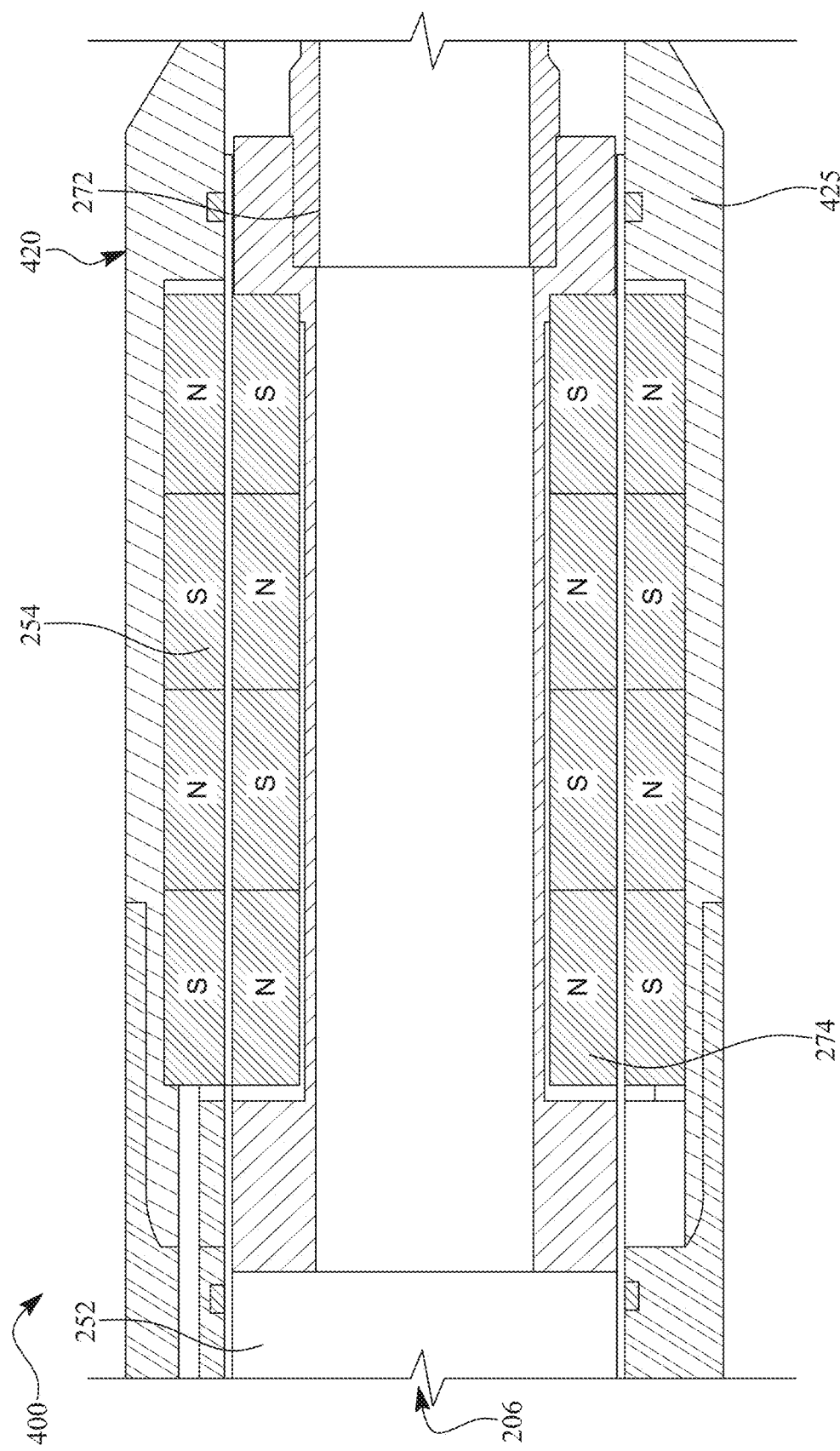
Figure 8A:
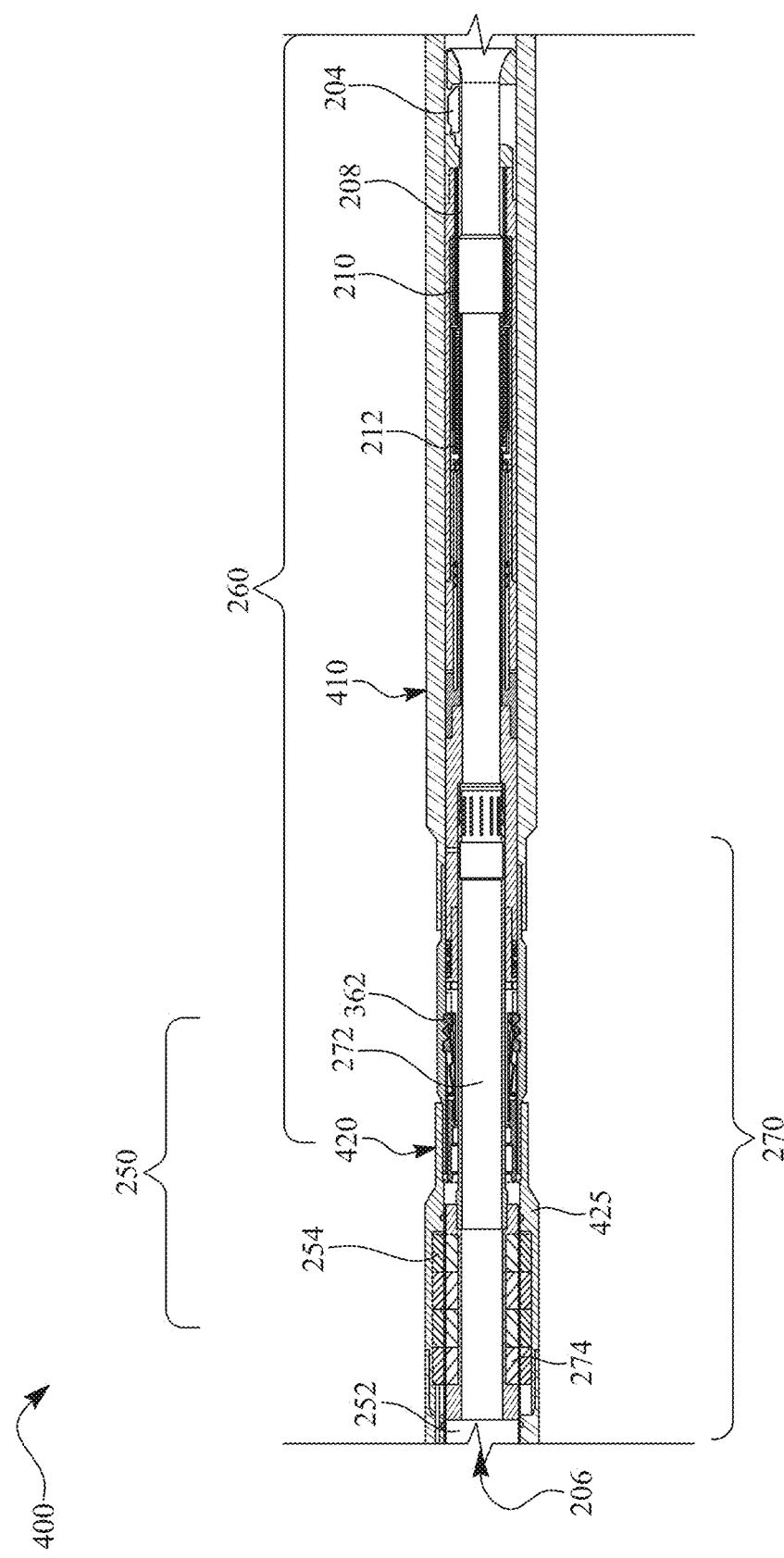
Figure 8B:
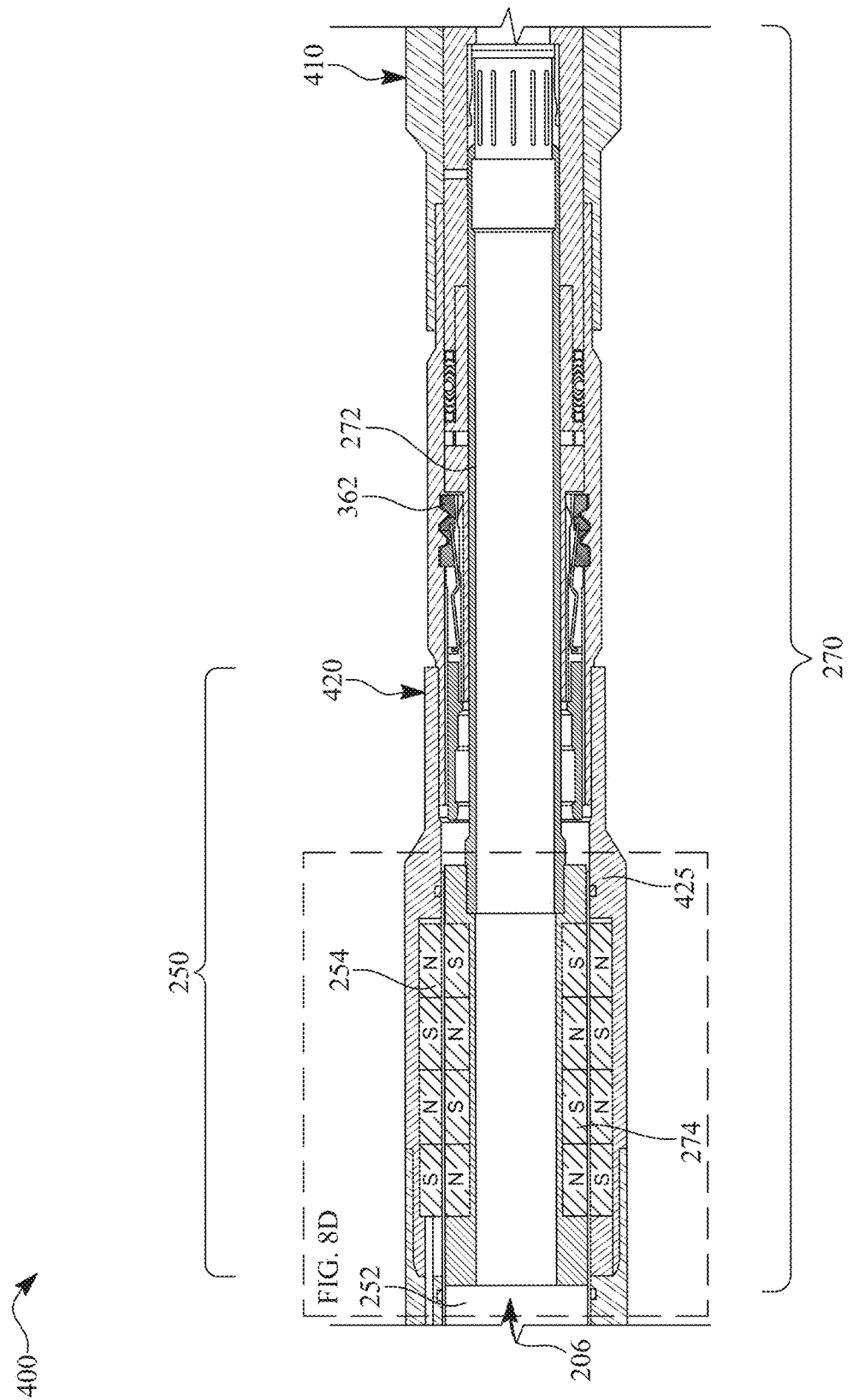
Figure 8C:
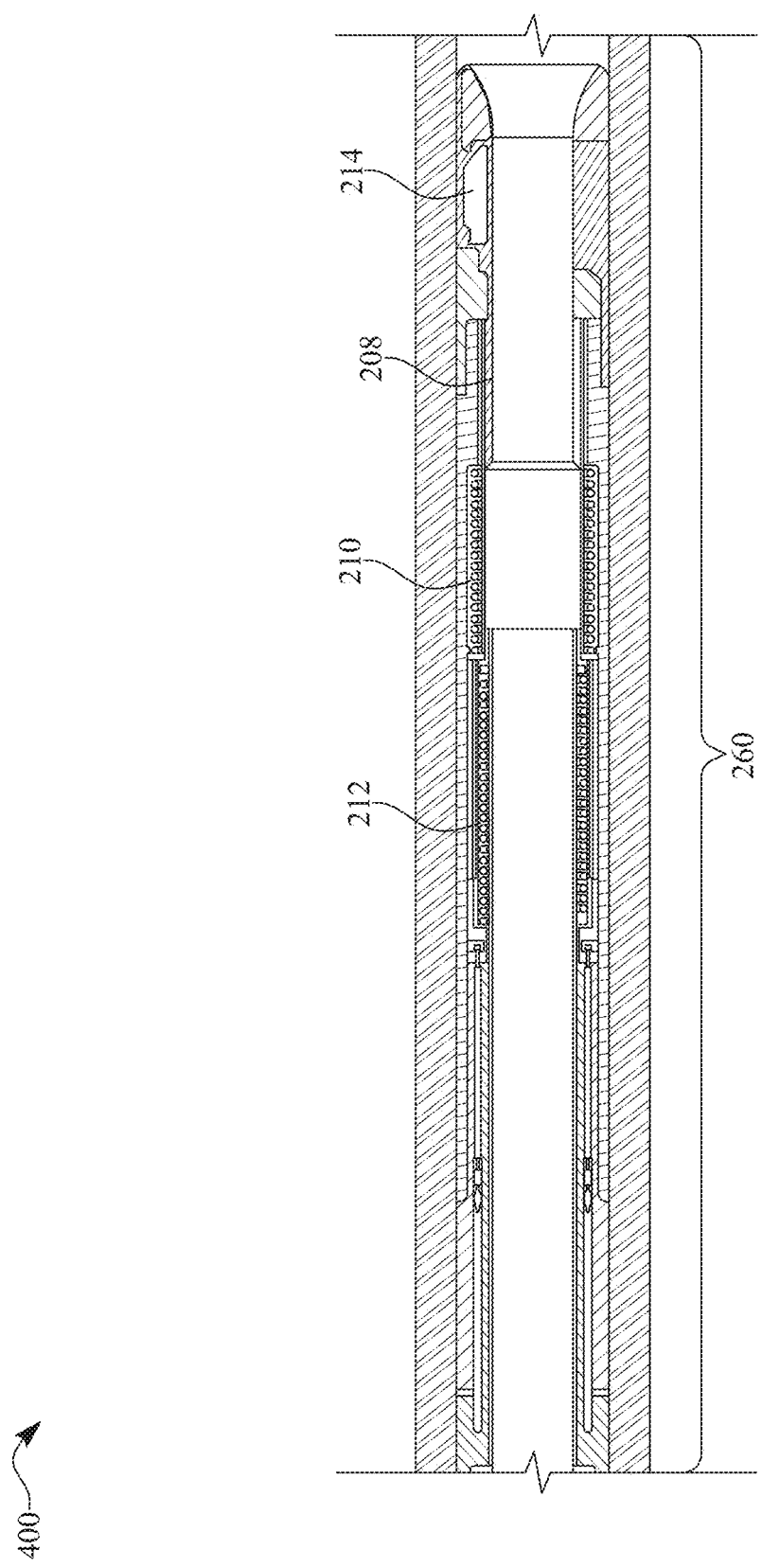
Figure 8D:
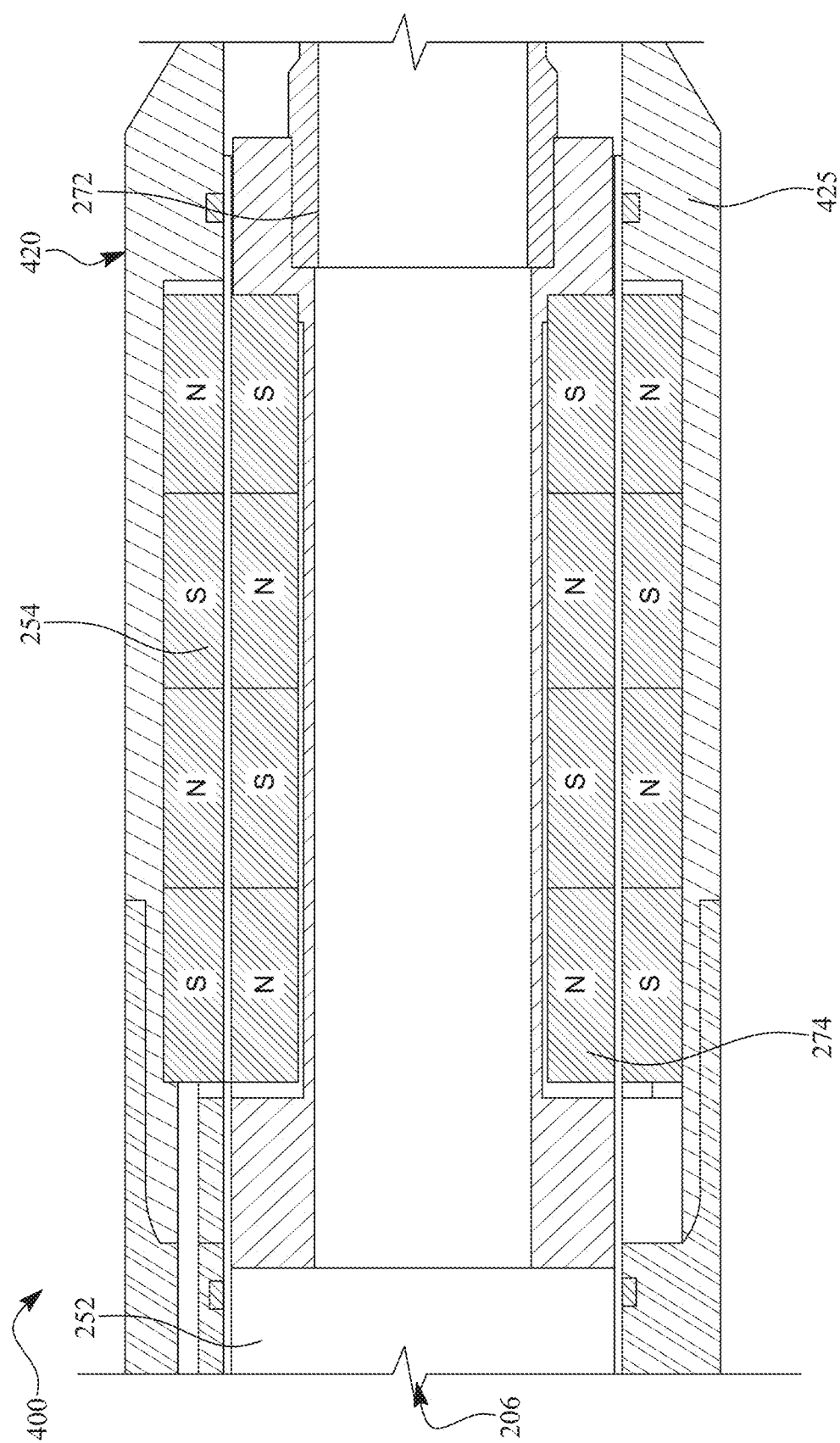
Figure 9A:
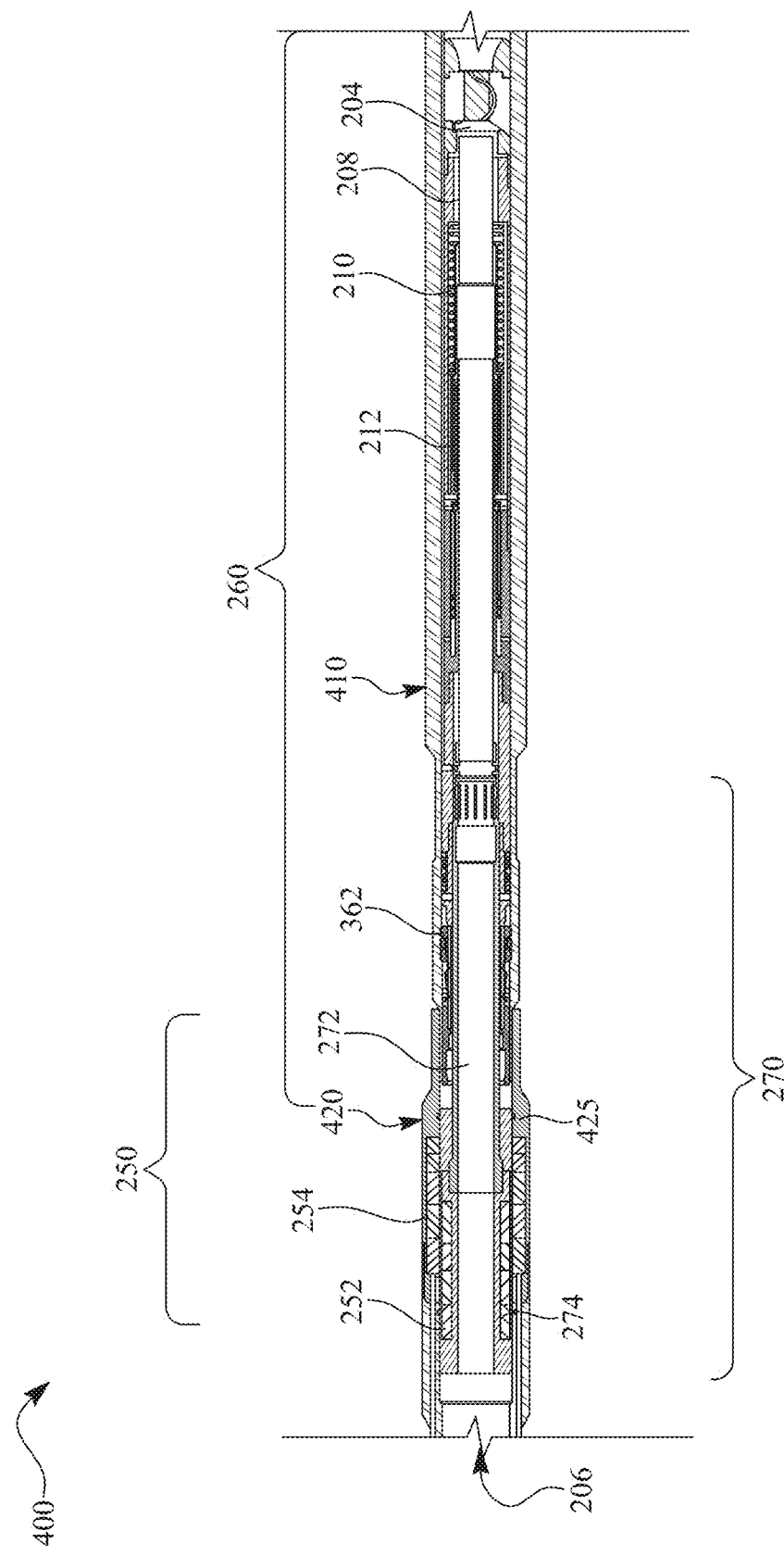
Figure 9B:
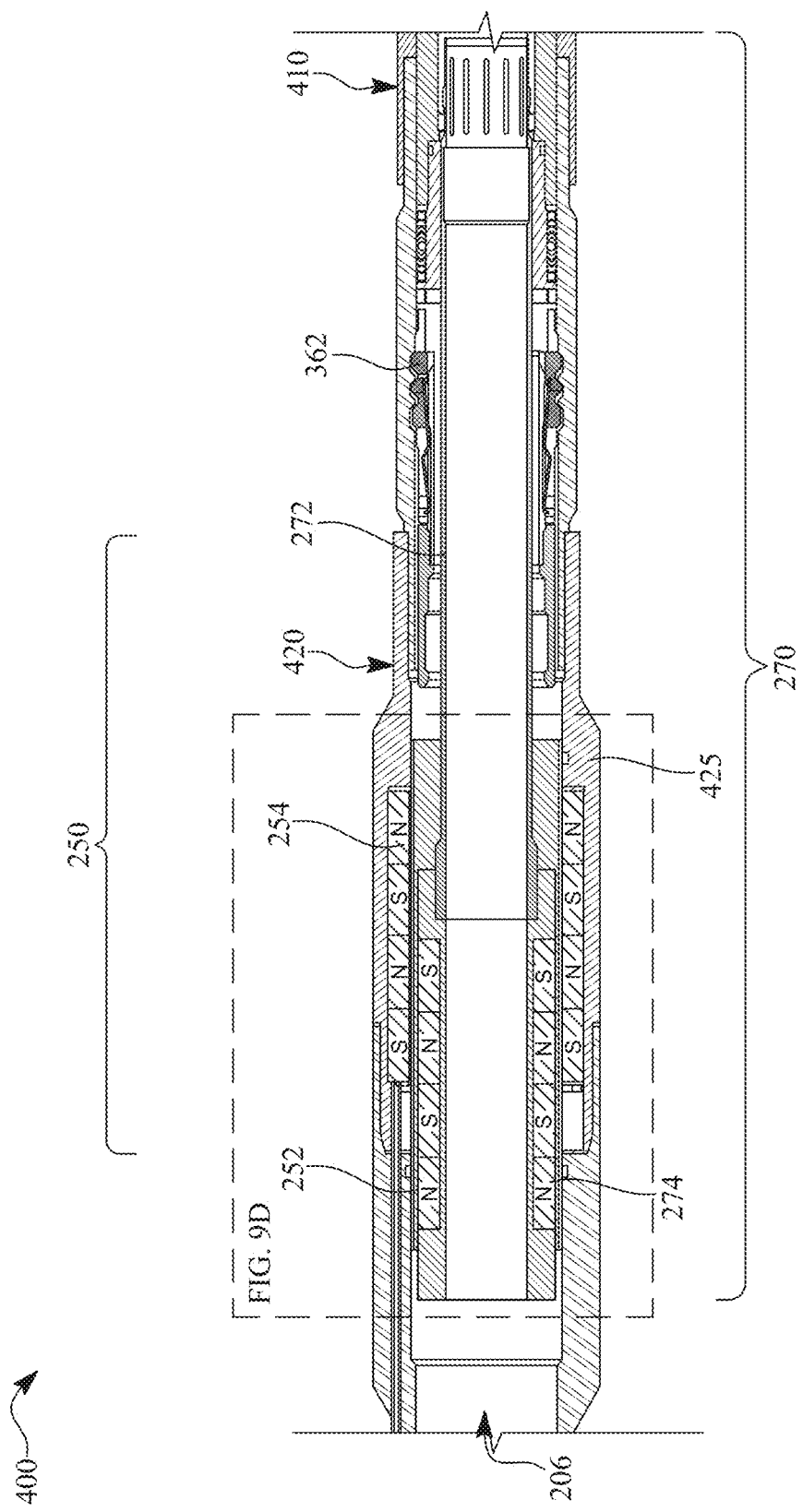
Figure 9C:
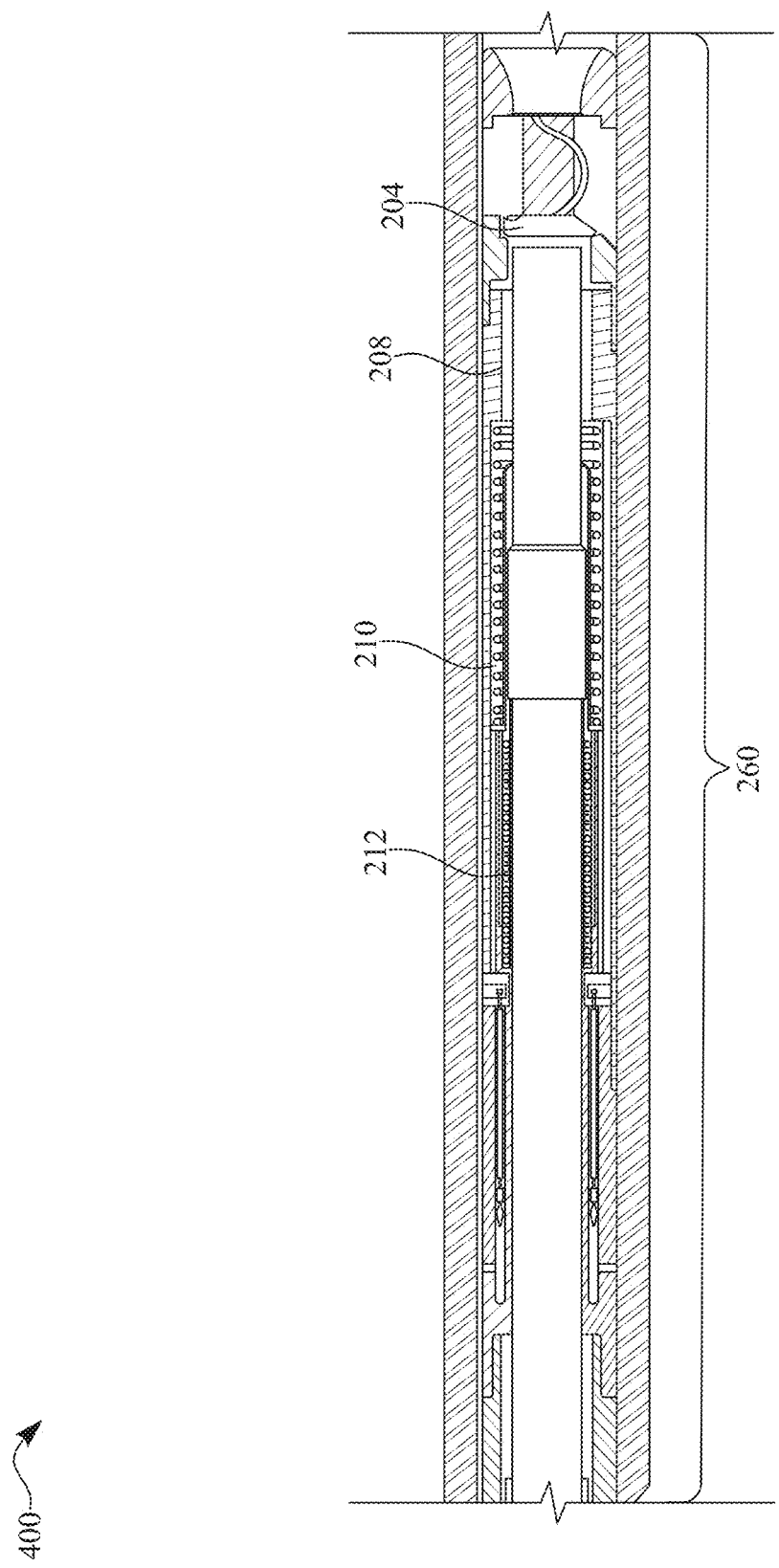
Figure 9D:
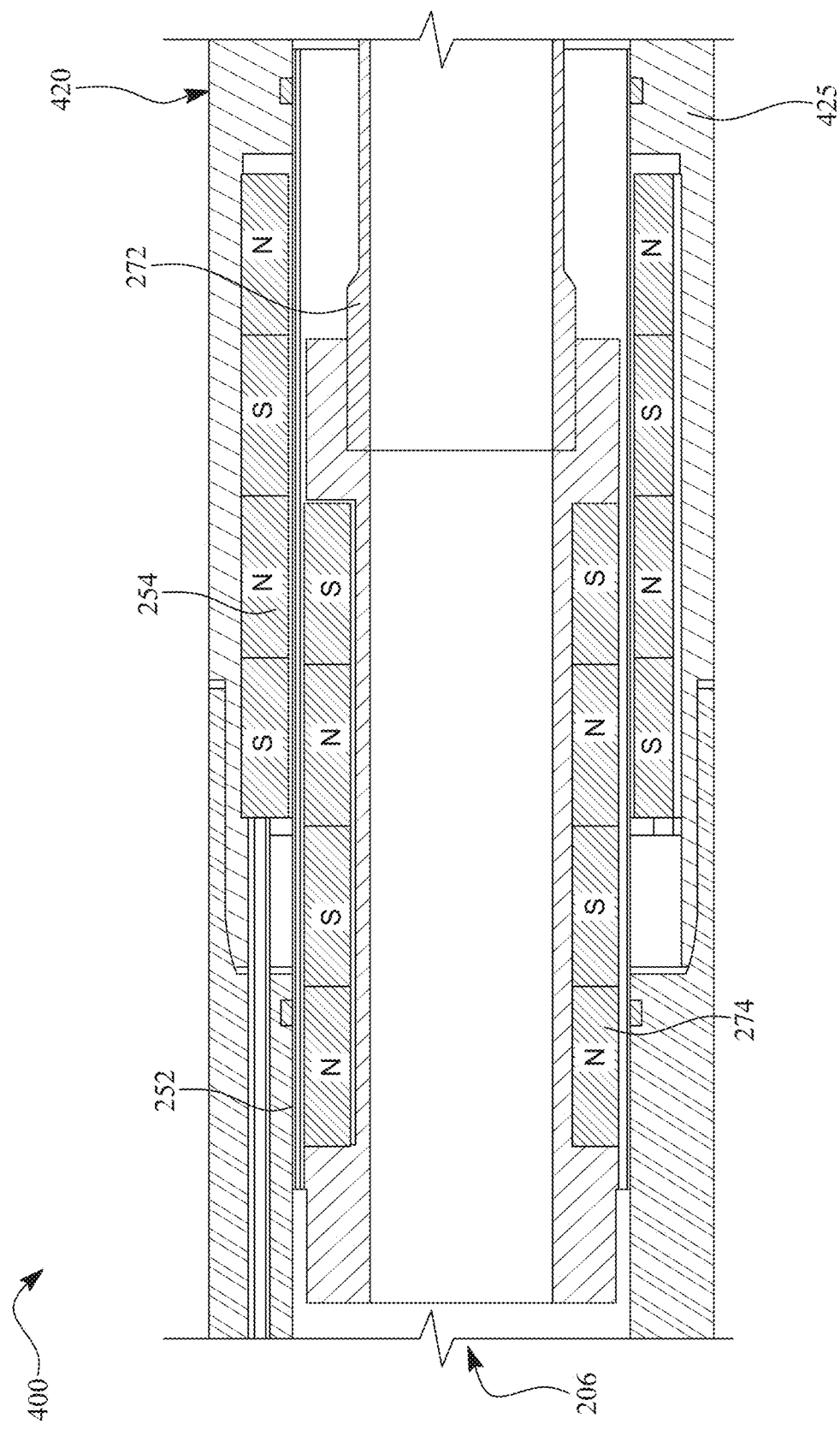

Turning briefly to FIG. 2I, illustrated is an alternate exploded view of a portion of the SSSV 200 of FIG. 2G. FIG. 2I illustrates how the two or more electromagnets 254 may alternate in polarity by going between a clockwise (C) and a counter-clockwise (CC) winding of the wire. FIG. 2I has again illustrated how the mechanical connecting apparatus 272 and the two or more permanent magnets 274 have axially slid downhole so that the two or more electromagnets 254 are substantially aligned with the two or more permanent magnets 274.

In FIGS. 2A through 2I, the two or more electromagnets 254 are depicted as one coil circumscribing the tubular, but there may be any number of coils in any orientation to fix the two or more permanent magnets 274 and the flow tube main body 208 in place. The two or more electromagnets 254 may apply a force in a substantially radial direction, for example. The force applied by the two or more electromagnets 254 may be any amount of force, including but not limited to, a force in a range of about 45 Newtons to about 45000 Newtons. The two or more electromagnets 254 may provide a means to hold the two or more permanent magnets 274 and the flow tube main body 208 at any well depth.

Hydraulic systems used in previous wellbore safety valves generally require control and balance lines to actuate and hold a valve open which may have pressure limitations. The limitations experienced by hydraulic systems may be overcome by using the two or more electromagnets 254 described herein, as only well pressure is required to open the SSSV 200. Again, when the two or more permanent magnets 274 are in their first position, either when the two or more electromagnets 254 are switched on or switched off, no amount of differential pressure across the valve 204 will open the valve 204 (e.g., the differential pressure being a pressure difference between a relatively higher pressure in the section 202 and a relatively lower pressure in the conduit 206).

With reference to FIG. 2G, the SSSV 200 is illustrated in an open position. When the SSSV 200 is in the open position, the two or more permanent magnets 274 may be fixed in place in the second position, as in FIG. 2G, through the force provided by the two or more electromagnets 254, the force being transferred through the second piston 236 to the translating sleeve assembly 230. The flow tube main body 208 is illustrated as being axially shifted from the first position illustrated in FIGS. 2A and 2D to a second position in FIG. 2G. When the flow tube main body 208 is in the second position, the flow tube shoulder 232 and the translating sleeve shoulder 218 may be in contact and the flow tube main body 208 may have displaced the valve 204 into an open position. The nose spring 212 may be in an uncompressed state, while the power spring 210 may be in a compressed state.

The flow tube main body 208 may be moved from the first position to the second position when the translating sleeve 222 is fixed in place in the second position by the two or more electromagnets 254, as described above. When the translating sleeve 222 is fixed in the second position through the force provided by the two or more electromagnets 254, the nose spring 212 may provide a positive spring force against the flow tube shoulder 232 and the translating sleeve assembly 230. The positive spring force from the nose spring 212 may be transferred through the flow tube main body 208 into the valve 204. The flow tube main body 208 will not move to the second position until differential pressure across the valve 204 is decreased after the translating sleeve 222 is fixed in position. The differential pressure may be decreased by pumping into the conduit 206, thereby increasing the pressure in the conduit 206. The pressure may be increased in the conduit 206 until the differential pressure across the valve 204 is decreased to a point where the positive spring force from the nose spring 212 is greater than the differential pressure across the valve 204. Thereafter, the nose spring 212 may extend and move the flow tube main body 208 into the second position by acting on the translating sleeve assembly 230 and the flow tube shoulder 232. When the flow tube main body 208 is in the second position, fluids such as oil and gas in the lower section 202 may be able to flow into the flow path 214 and to a surface of the wellbore such as to a wellhead. SSSV 200 may remain in the open position defined by the translating sleeve 222 being in the second position and the flow tube main body 208 being in the second position, so long as the two or more electromagnets 254 remain energized.

The SSSV 200 may be moved back to the first closed position, as illustrated in FIG. 2A, de-energizing (e.g. powering off) the two or more electromagnets 254. As previously discussed, the two or more electromagnets 254 may fix the two or more permanent magnets 274 and the flow tube main body 208 in place in the second position when the two or more electromagnets 254 remain energized. When the two or more electromagnets 254 are de-energizing (e.g. powering off), the two or more permanent magnets 274 and the flow tube main body 208 may no longer be fixed in place. Again, the two or more electromagnets 254 may alternate the direction of the wrapping of the coil. Alternating the direction of the wrapping will result in alternating directions of the magnetic field. The result is multiple magnetic reversals in the two or more electromagnets 254 that would magnetically connect with the two or more permanent magnets 274. The power spring 210 may provide a positive spring force against the lower valve assembly 216, the translating the sleeve shoulder 218, and the flow tube shoulder 232, through contact between the translating sleeve shoulder 218 and the flow tube shoulder 232. The positive spring force from the power spring 210 may axially displace the translating sleeve 222 to the first position and the flow tube main body 208 to the first position, thereby returning the SSSV 200 to the first closed position illustrated in FIG. 2A. Positive spring force from the power spring 210 may axially displace the one or more WLRSV coils to the position illustrated in FIG. 2A by transmitting the positive spring force through the second piston 236.

Turning now to FIGS. 3A through 3D, illustrated are different views of a safety valve 300 designed, manufactured and/or operated according to one or more alternative embodiments of the disclosure. The safety valve 300 of FIGS. 3A through 3D, is similar in many respects to the SSSV 200 of FIGS. 2A through 2C. Accordingly, like reference numbers have been used to illustrate similar, if not identical, features. FIGS. 3A through 3D illustrate the safety valve 300 in its operational state, thus each of the first portion 250, the second portion 260 and the third portion 270 are coupled together and fixed within the tubular. For example, as illustrated, a latching mechanism 362 of the second portion 260 axially fixes the second portion 260 within the tubular. Furthermore, the mechanical connecting apparatus 272 of the third portion 270 axially fixes the two or more permanent magnets 274 of the third portion 270 to the flow tube main body 208 of the second portion 260. Thus, any axial movement of the flow tube main body 208, as discussed above, will result in a similar axial movement of the two or more permanent magnets 274.

Turning now to FIGS. 4A through 9D, illustrated are various different installation and/or operational states, each with various different views, of an SSSV 400 designed, manufactured and/or operated according to one or more alternative embodiments of the disclosure. The SSSV 400 of FIGS. 4A through 9D, is similar in many respects to the safety valve 300 of FIGS. 3A through 3D. Accordingly, like reference numbers have been used to illustrate similar, if not identical, features.

Turning to FIGS. 4A through 4D, illustrated is the SSSV 400 in its original run-in-hole state, and thus at this stage the SSSV 400 only includes a WLRSV sub 420 coupled to the TRSV 410. The WLRSV sub 420, in this embodiment, includes the first portion 250 (e.g., having the fluid isolation sleeve 252 and the two or more electromagnets 254 positioned within a housing 425).

Turning to FIGS. 5A through 5D, illustrated is the SSSV 400 of FIGS. 4A through 4D after the TRSV 410 is no longer working properly and/or has failed. Accordingly, the SSSV 400 of FIGS. 5A through 5D additionally includes the second portion 260, for example including the flow tube main body 208 and valve 204, among many of the other features discussed above. In this instance, the latching mechanism 362 axially couples the second portion 260 with the TRSV 410 and the WLRSV sub 420.

Turning to FIGS. 6A through 6D, illustrated is the SSSV 400 of FIGS. 5A through 5D after inserting the third portion 270 therein. In the illustrated embodiment, the third portion 270 includes the mechanical connecting apparatus 272 and the two or more permanent magnets 274. The third portion 270, in this embodiment, axially couples with the flow tube main body 208 of the second portion 260. Accordingly, in the embodiment of FIGS. 6A through 6D, the third portion 270 is coupled to the flow tube main body 208 of the second portion 260, and thus the two or more permanent magnets 274 are axially fixed to the flow tube main body 208. The progression of FIGS. 4A through 6D illustrates how the SSSV 400 could be installed in accordance with one or more embodiments of the disclosure.

Turning now to FIGS. 7A through 9D, illustrated are certain embodiments how the SSSV 400 of FIGS. 6A through 6D could be operated. Specifically, FIGS. 7A through 7D illustrate the SSSV 400 of FIGS. 6A through 6D when the SSSV 400 has tubing pressure below the valve 204. In this instance, the pressure below the valve 204 has compressed the power spring 210 and nose spring 212, and in doing so may have slightly moved the flow tube main body 208 and associated mechanical connecting apparatus 272 and two or more permanent magnets 274 downhole. For example, the flow tube main body 208 has moved downhole into contact with the valve 204. Similarly, the two or more permanent magnets 274 have axially slid downhole so that the two or more electromagnets 254 are substantially aligned with the two or more permanent magnets 274. At this stage, the two or more electromagnets 254 and the two or more permanent magnets 274 are substantially aligned, if not ideally aligned, if not perfectly aligned.

Turning to FIGS. 8A through 8D, illustrated is the SSSV 400 of FIGS. 7A through 7D after the pressure is balanced across the valve 204, and thus the flow tube main body 208 is allowed to move axially down to open the valve 204. If and/or when the two or more electromagnets 254 are energized, the two or more electromagnets 254 will engage with the two or more permanent magnets 274 and axially hold the flow tube main body 208 in this open state.

Turning now to FIGS. 9A through 9D, illustrated is the SSSV 400 of FIGS. 8A through 8D after the two or more electromagnets 254 de-energizing (e.g. powering off), and thus the power spring 210 of the second portion 260 pushes the flow tube main body 208 uphole, allowing the valve 204 to close.

Aspects disclosed herein include:

A. An SSSV, the SSSV including: 1) a housing including a central bore extending axially through the housing, the central bore configured to convey subsurface production fluids there through; 2) a valve disposed proximate a downhole end of the central bore; 3) a flow tube disposed in the central bore and configured to move between a closed state and a flow state to engage or disengage the valve to determine a flow condition of the subsurface production fluids through the central bore; 4) two or more electromagnets fixedly coupled to the housing, a first of the two or more electromagnets having its north pole facing a first electromagnet direction and a second of the two or more electromagnets having is south pole facing the first electromagnet direction; and 5) two or more permanent magnets coupled to the flow tube, a first of the two or more permanent magnets having its south pole facing a first permanent magnet direction and a second of the two or more permanent magnets having its north pole facing the first permanent magnet direction, the two or more permanent magnets configured to axially move with the flow tube such that: a) when the flow tube is in its closed state the first of the two or more electromagnets is misaligned with the first of the two or more permanent magnets and the second of the two or more electromagnets is misaligned with the second of the two or more permanent magnets; and b) when the flow tube is in its flow state the first of the two or more electromagnets is substantially aligned with the first of the two or more permanent magnets and the second of the two or more electromagnets is substantially aligned with the second of the two or more permanent magnets, such that when energized the two or more electromagnets engage with the two or more permanent magnets to hold the flow tube in the flow state.

B. A well system, the well system including: 1) a wellbore extending through one or more subterranean formations; 2) an SSSV positioned within the wellbore, the SSSV including: a) a housing including a central bore extending axially through the housing, the central bore configured to convey subsurface production fluids there through; b) a valve disposed proximate a downhole end of the central bore; c) a flow tube disposed in the central bore and configured to move between a closed state and a flow state to engage or disengage the valve to determine a flow condition of the subsurface production fluids through the central bore; d) two or more electromagnets fixedly coupled to the housing, a first of the two or more electromagnets having its north pole facing a first electromagnet direction and a second of the two or more electromagnets having is south pole facing the first electromagnet direction; and e) two or more permanent magnets coupled to the flow tube, a first of the two or more permanent magnets having its south pole facing a first permanent magnet direction and a second of the two or more permanent magnets having its north pole facing the first permanent magnet direction, the two or more permanent magnets configured to axially move with the flow tube such that: i) when the flow tube is in its closed state the first of the two or more electromagnets is misaligned with the first of the two or more permanent magnets and the second of the two or more electromagnets is misaligned with the second of the two or more permanent magnets; and ii) when the flow tube is in its flow state the first of the two or more electromagnets is substantially aligned with the first of the two or more permanent magnets and the second of the two or more electromagnets is substantially aligned with the second of the two or more permanent magnets, such that when energized the two or more electromagnets engage with the two or more permanent magnets to hold the flow tube in the flow state.

C. A method, the method including: 1) forming a wellbore through one or more subterranean formations; and 2) positioning an SSSV in the wellbore, the SSSV including: a) a housing including a central bore extending axially through the housing, the central bore configured to convey subsurface production fluids there through; b) a valve disposed proximate a downhole end of the central bore; c) a flow tube disposed in the central bore and configured to move between a closed state and a flow state to engage or disengage the valve to determine a flow condition of the subsurface production fluids through the central bore; d) two or more electromagnets fixedly coupled to the housing, a first of the two or more electromagnets having its north pole facing a first electromagnet direction and a second of the two or more electromagnets having is south pole facing the first electromagnet direction; and e) two or more permanent magnets coupled to the flow tube, a first of the two or more permanent magnets having its south pole facing a first permanent magnet direction and a second of the two or more permanent magnets having its north pole facing the first permanent magnet direction, the two or more permanent magnets configured to axially move with the flow tube such that: i) when the flow tube is in its closed state the first of the two or more electromagnets is misaligned with the first of the two or more permanent magnets and the second of the two or more electromagnets is misaligned with the second of the two or more permanent magnets; and ii) when the flow tube is in its flow state the first of the two or more electromagnets is substantially aligned with the first of the two or more permanent magnets and the second of the two or more electromagnets is substantially aligned with the second of the two or more permanent magnets, such that when energized the two or more electromagnets engage with the two or more permanent magnets to hold the flow tube in the flow state.

Aspects A, B, and C may have one or more of the following additional elements in combination: Element 1: wherein the two or more electromagnets is four or more oppositely poled electromagnets, and the two or more permanent magnets is four or more oppositely poled permanent magnets. Element 2: wherein the two or more electromagnets is six or more oppositely poled electromagnets, and the two or more permanent magnets is six or more oppositely poled permanent magnets. Element 3: wherein the first and second electromagnets are oppositely wound electromagnets. Element 4: wherein a magnetic flux of the two or more permanent magnets is orthogonal to a central axis of the central bore. Element 5: wherein a magnetic flux of the two or more permanent magnets is at an angle ranging from +15 degrees to +75 degrees or −15 degrees to −75 degrees relative to a central axis of the central bore. Element 6: wherein a magnetic flux of the two or more permanent magnets is at an angle ranging from +30 degrees to +60 degrees or −30 degrees to −60 degrees relative to a central axis of the central bore. Element 7: wherein a magnetic flux of the two or more permanent magnets is at an angle of +45 degrees or −45 degrees relative to a central axis of the central bore. Element 8: wherein the two or more electromagnets are configured to receive power from a single conductor. Element 9: wherein the SSSV is a WLRSV, the WLRSV including: a first portion, the first portion formed at least in part from the housing and the two or more electromagnets, the first portion configured to be run-in-hole with a TRSV; a second portion, the second portion formed at least in part from the flow tube and the valve, the second portion configured to be run-in-hole after the first portion; and a third portion, the third portion formed at least in part from a mechanical connecting apparatus having the two or more permanent magnets coupled thereto, the third portion configured to be run-in-hole after the second portion, and further wherein the mechanical connecting apparatus is configured to engage with the flow tube to axially fix the two or more permanent magnets and the flow tube together. Element 10: wherein the first electromagnet direction is radially inward and the first permanent magnet direction is radially outward.

Those skilled in the art to which this application relates will appreciate that other and further additions, deletions, substitutions and modifications may be made to the described embodiments.

What is claimed is:

1. An SSSV, comprising:
   a housing including a central bore extending axially through the housing, the central bore configured to convey subsurface production fluids there through;
   a valve disposed proximate a downhole end of the central bore;
   a flow tube disposed in the central bore and configured to move between a closed state and a flow state to engage or disengage the valve to determine a flow condition of the subsurface production fluids through the central bore;
   two or more electromagnets fixedly coupled to the housing, a first of the two or more electromagnets having its north pole facing a first electromagnet direction and a second of the two or more electromagnets having its south pole facing the first electromagnet direction;
   two or more permanent magnets coupled to the flow tube, a first of the two or more permanent magnets having its south pole facing a first permanent magnet direction and a second of the two or more permanent magnets having its north pole facing the first permanent magnet direction, the two or more permanent magnets configured to axially move with the flow tube such that:
      when the flow tube is in its closed state the first of the two or more electromagnets is misaligned with the first of the two or more permanent magnets and the second of the two or more electromagnets is misaligned with the second of the two or more permanent magnets; and
      when the flow tube is in its flow state the first of the two or more electromagnets is substantially aligned with the first of the two or more permanent magnets and the second of the two or more electromagnets is substantially aligned with the second of the two or more permanent magnets, such that when energized the two or more electromagnets engage with the two or more permanent magnets to hold the flow tube in the flow state;
   a first portion, the first portion formed at least in part from the housing and the two or more electromagnets, the first portion configured to be run-in-hole with the housing;
   a second portion, the second portion formed at least in part from the flow tube and the valve, the second portion configured to be run-in-hole after the first portion; and
   a third portion, the third portion formed at least in part from a mechanical connecting apparatus having the two or more permanent magnets coupled thereto, the third portion configured to be run-in-hole after the second portion, and further wherein the mechanical connecting apparatus is configured to engage with the flow tube to axially fix the two or more permanent magnets and the flow tube together.

2. The SSSV as recited in claim 1, wherein the two or more electromagnets is four or more oppositely poled electromagnets, and the two or more permanent magnets is four or more oppositely poled permanent magnets.

3. The SSSV as recited in claim 1, wherein the two or more electromagnets is six or more oppositely poled electromagnets, and the two or more permanent magnets is six or more oppositely poled permanent magnets.

4. The SSSV as recited in claim 1, wherein the first and second electromagnets are oppositely wound electromagnets.

5. The SSSV as recited in claim 1, wherein a magnetic flux of the two or more permanent magnets is orthogonal to a central axis of the central bore.

6. The SSSV as recited in claim 1, wherein a magnetic flux of the two or more permanent magnets is at an angle ranging from +15 degrees to +75 degrees or −15 degrees to −75 degrees relative to a central axis of the central bore.

7. The SSSV as recited in claim 1, wherein a magnetic flux of the two or more permanent magnets is at an angle ranging from +30 degrees to +60 degrees or −30 degrees to −60 degrees relative to a central axis of the central bore.

8. The SSSV as recited in claim 1, wherein a magnetic flux of the two or more permanent magnets is at an angle of +45 degrees or −45 degrees relative to a central axis of the central bore.

9. The SSSV as recited in claim 1, wherein the two or more electromagnets are configured to receive power from a single conductor.

10. The SSSV as recited in claim 1, wherein the first electromagnet direction is radially inward and the first permanent magnet direction is radially outward.

11. A well system, comprising:
a wellbore extending through one or more subterranean formations;
an SSSV positioned within the wellbore, the SSSV including:
a housing including a central bore extending axially through the housing, the central bore configured to convey subsurface production fluids there through;
a valve disposed proximate a downhole end of the central bore;
a flow tube disposed in the central bore and configured to move between a closed state and a flow state to engage or disengage the valve to determine a flow condition of the subsurface production fluids through the central bore;
two or more electromagnets fixedly coupled to the housing, a first of the two or more electromagnets having its north pole facing a first electromagnet direction and a second of the two or more electromagnets having its south pole facing the first electromagnet direction;
two or more permanent magnets coupled to the flow tube, a first of the two or more permanent magnets having its south pole facing a first permanent magnet direction and a second of the two or more permanent magnets having its north pole facing the first permanent magnet direction, the two or more permanent magnets configured to axially move with the flow tube such that:
when the flow tube is in its closed state the first of the two or more electromagnets is misaligned with the first of the two or more permanent magnets and the second of the two or more electromagnets is misaligned with the second of the two or more permanent magnets; and
when the flow tube is in its flow state the first of the two or more electromagnets is substantially aligned with the first of the two or more permanent magnets and the second of the two or more electromagnets is substantially aligned with the second of the two or more permanent magnets, such that when energized the two or more electromagnets engage with the two or more permanent magnets to hold the flow tube in the flow state;
a first portion, the first portion formed at least in part from the housing and the two or more electromagnets, the first portion configured to be run-in-hole with the housing;
a second portion, the second portion formed at least in part from the flow tube and the valve, the second portion configured to be run-in-hole after the first portion; and
a third portion, the third portion formed at least in part from a mechanical connecting apparatus having the two or more permanent magnets coupled thereto, the third portion configured to be run-in-hole after the second portion, and further wherein the mechanical connecting apparatus is configured to engage with the flow tube to axially fix the two or more permanent magnets and the flow tube together.

12. The well system as recited in claim 11, wherein the two or more electromagnets is four or more oppositely poled electromagnets, and the two or more permanent magnets is four or more oppositely poled permanent magnets.

13. The well system as recited in claim 11, wherein the two or more electromagnets is six or more oppositely poled electromagnets, and the two or more permanent magnets is six or more oppositely poled permanent magnets.

14. The well system as recited in claim 11, wherein the first and second electromagnets are oppositely wound electromagnets.

15. The well system as recited in claim 11, wherein a magnetic flux of the two or more permanent magnets is orthogonal to a central axis of the central bore.

16. The well system as recited in claim 11, wherein a magnetic flux of the two or more permanent magnets is at an angle ranging from +15 degrees to +75 degrees or −15 degrees to −75 degrees relative to a central axis of the central bore.

17. The well system as recited in claim 11, wherein a magnetic flux of the two or more permanent magnets is at an angle ranging from +30 degrees to +60 degrees or −30 degrees to −60 degrees relative to a central axis of the central bore.

18. The well system as recited in claim 11, wherein a magnetic flux of the two or more permanent magnets is at an angle of +45 degrees or −45 degrees relative to a central axis of the central bore.

19. The well system as recited in claim 11, wherein the two or more electromagnets are configured to receive power from a single conductor.

20. The well system as recited in claim 11, wherein the first electromagnet direction is radially inward and the first permanent magnet direction is radially outward.

21. A method, comprising:
   forming a wellbore through one or more subterranean formations; and
   positioning an SSSV in the wellbore, the SSSV including:
   a housing including a central bore extending axially through the housing, the central bore configured to convey subsurface production fluids there through;
   a valve disposed proximate a downhole end of the central bore;
   a flow tube disposed in the central bore and configured to move between a closed state and a flow state to engage or disengage the valve to determine a flow condition of the subsurface production fluids through the central bore;
   two or more electromagnets fixedly coupled to the housing, a first of the two or more electromagnets having its north pole facing a first electromagnet direction and a second of the two or more electromagnets having is south pole facing the first electromagnet direction;
   two or more permanent magnets coupled to the flow tube, a first of the two or more permanent magnets having its south pole facing a first permanent magnet direction and a second of the two or more permanent magnets having its north pole facing the first permanent magnet direction, the two or more permanent magnets configured to axially move with the flow tube such that:
      when the flow tube is in its closed state the first of the two or more electromagnets is misaligned with the first of the two or more permanent magnets and the second of the two or more electromagnets is misaligned with the second of the two or more permanent magnets; and
      when the flow tube is in its flow state the first of the two or more electromagnets is substantially aligned with the first of the two or more permanent magnets and the second of the two or more electromagnets is substantially aligned with the second of the two or more permanent magnets, such that when energized the two or more electromagnets engage with the two or more permanent magnets to hold the flow tube in the flow state;
   a first portion, the first portion formed at least in part from the housing and the two or more electromagnets, the first portion configured to be run-in-hole with the housing;
   a second portion, the second portion formed at least in part from the flow tube and the valve, the second portion configured to be run-in-hole after the first portion; and
   a third portion, the third portion formed at least in part from a mechanical connecting apparatus having the two or more permanent magnets coupled thereto, the third portion configured to be run-in-hole after the second portion, and further wherein the mechanical connecting apparatus is configured to engage with the flow tube to axially fix the two or more permanent magnets and the flow tube together.

* * * * *